(12) United States Patent
MacDonald et al.

(10) Patent No.: US 12,242,423 B1
(45) Date of Patent: Mar. 4, 2025

(54) ONLINE SOFTWARE PLATFORM (OSP) CHECKING DOMAIN FOR PRIOR ACTIONS OF DELIVERING DATA TO DOMAIN ON BEHALF OF PRIMARY ENTITY, TO PREVENT INADVERTENT DUPLICATION OF SUCH DELIVERING ACTION

(71) Applicant: Avalara, Inc.

(72) Inventors: Nichol A. MacDonald, Chapel Hill, NC (US); Renai Bell, Portland, OR (US); Naveen Kumar Agrawal, Bellevue, WA (US); Nandan Rao, Bangalore (IN); Gregory T. Kavounas, Bellevue, WA (US)

(73) Assignee: Avalara, Inc., Seattle, WA (US)

( * ) Notice: Subject to any disclaimer, the term of this patent is extended or adjusted under 35 U.S.C. 154(b) by 0 days.

(21) Appl. No.: 18/403,567

(22) Filed: Jan. 3, 2024

(51) Int. Cl.
| | | |
|---|---|---|
| G06F 16/00 | (2019.01) | |
| G06F 9/54 | (2006.01) | |
| G06F 16/17 | (2019.01) | |
| G06F 16/174 | (2019.01) | |
| G06F 16/28 | (2019.01) | |
| G06F 16/953 | (2019.01) | |

(52) U.S. Cl.
CPC ......... *G06F 16/1734* (2019.01); *G06F 9/542* (2013.01); *G06F 16/1748* (2019.01); *G06F 16/288* (2019.01); *G06F 16/953* (2019.01)

(58) Field of Classification Search
CPC ............. G06F 16/1734; G06F 16/1748; G06F 16/288; G06F 16/953; G06F 9/542
See application file for complete search history.

(56) References Cited

U.S. PATENT DOCUMENTS

| | | | |
|---|---|---|---|
| 7,783,536 B2 | 8/2010 | William et al. | |
| 7,933,803 B1 | 4/2011 | Nadler et al. | |
| 8,620,578 B1 | 12/2013 | Brown et al. | |
| 8,725,407 B2 | 5/2014 | Hurley et al. | |
| 9,591,066 B1 * | 3/2017 | Katyal | H04L 67/1095 |
| 9,760,915 B2 | 9/2017 | Pavlou et al. | |
| 10,332,216 B2 | 6/2019 | Barsade et al. | |
| 10,445,818 B1 | 10/2019 | Chowdhary | |
| 10,769,611 B2 | 9/2020 | McNeel | |
| 10,872,100 B1 | 12/2020 | Shefferman et al. | |
| 11,176,620 B1 | 11/2021 | Lubczynski et al. | |

(Continued)

*Primary Examiner* — Diedra McQuitery
(74) *Attorney, Agent, or Firm* — Nicholson, De Vos, Webster & Elliott, LLP

(57) ABSTRACT

In embodiments, computer systems, computer-readable media, and methods perform operations such as deliver, on behalf of a primary entity, data reports to domains. However, before delivering, they check to see if such a data report has already taken delivered, perhaps inadvertently, in case the primary entity had given duplicative instructions for the delivery. The checking can start either directly with a domain online space of the domain itself, or by exploring a partner online space of a partner entity. In each case, the primary entity provides credentials for access to an online space, and of course permission. Access to the online space is accomplished via the credentials, an inquiry is transmitted to the online space, and inquiry results are received in response to the transmitted inquiry. The inquiry results are analyzed and, if it is determined that such a delivery has taken place, the primary entity is notified.

24 Claims, 46 Drawing Sheets

(56) References Cited

U.S. PATENT DOCUMENTS

| | | |
|---|---|---|
| 11,238,542 B1 | 2/2022 | Wixted et al. |
| 2002/0138765 A1 | 9/2002 | Fishman et al. |
| 2007/0136158 A1 | 6/2007 | Rawlings et al. |
| 2007/0136159 A1 | 6/2007 | Rawlings et al. |
| 2009/0187500 A1 | 7/2009 | Wilson et al. |
| 2013/0013471 A1 | 1/2013 | Fishman |
| 2014/0172656 A1 | 6/2014 | Shaw |
| 2014/0351105 A1 | 11/2014 | Hamm |
| 2016/0042466 A1 | 2/2016 | Herndon et al. |
| 2016/0140668 A1 | 5/2016 | Maguire et al. |
| 2016/0179822 A1* | 6/2016 | Gupta .................. G06F 16/955 707/755 |
| 2019/0114609 A1 | 4/2019 | Burton et al. |
| 2020/0045519 A1* | 2/2020 | Raleigh ................ G06F 3/0482 |
| 2021/0158456 A1 | 5/2021 | Morgan et al. |
| 2022/0012750 A1* | 1/2022 | Bowers .................. G06F 21/31 |

\* cited by examiner

291 SCREEN

200 UI

* [YOUR ONLINE SERVICE PROVIDER] *

Continue on-boarding:

|  | Enter your: | or click if it is: |
|---|---|---|
| Company Name: | ... | [COMPANY_NAME] |
| Co. HQ Address 1: | ... | [CO_HQ_ADDR1] |
| Co. HQ Address 2: | ... | [CO_HQ_ADDR2] |
| Co. HQ City: | ... | [CO_HQ_CITY] |
| Co. HQ State: | ... | [CO_HQ_STATE] |
| Co. HQ Zip Code: | ... | [CO_HQ_ZIP] |

So, we will be producing resource values for you.

In addition, for your relationship instances, for which you will be delivering data reports, check if you want us to also:
[v] prepare such data reports for you, and/or
[v] deliver the data reports to the appropriate domains, and/or
[v] make transfers of resources consonant with the data reports.

— 255

In addition, before we deliver such a data report, do you want us to be checking whether one has been inadvertently already been delivered for you, perhaps by someone like one of your users or a partner?
[v] Yes, please check.
[ ] No, do not bother, thanks

*UI ABOUT OPENING CLIENT ONLINE ACCOUNT, ON-BOARDING, & SETTING TO SEARCH FOR FILED DATA REPORT*

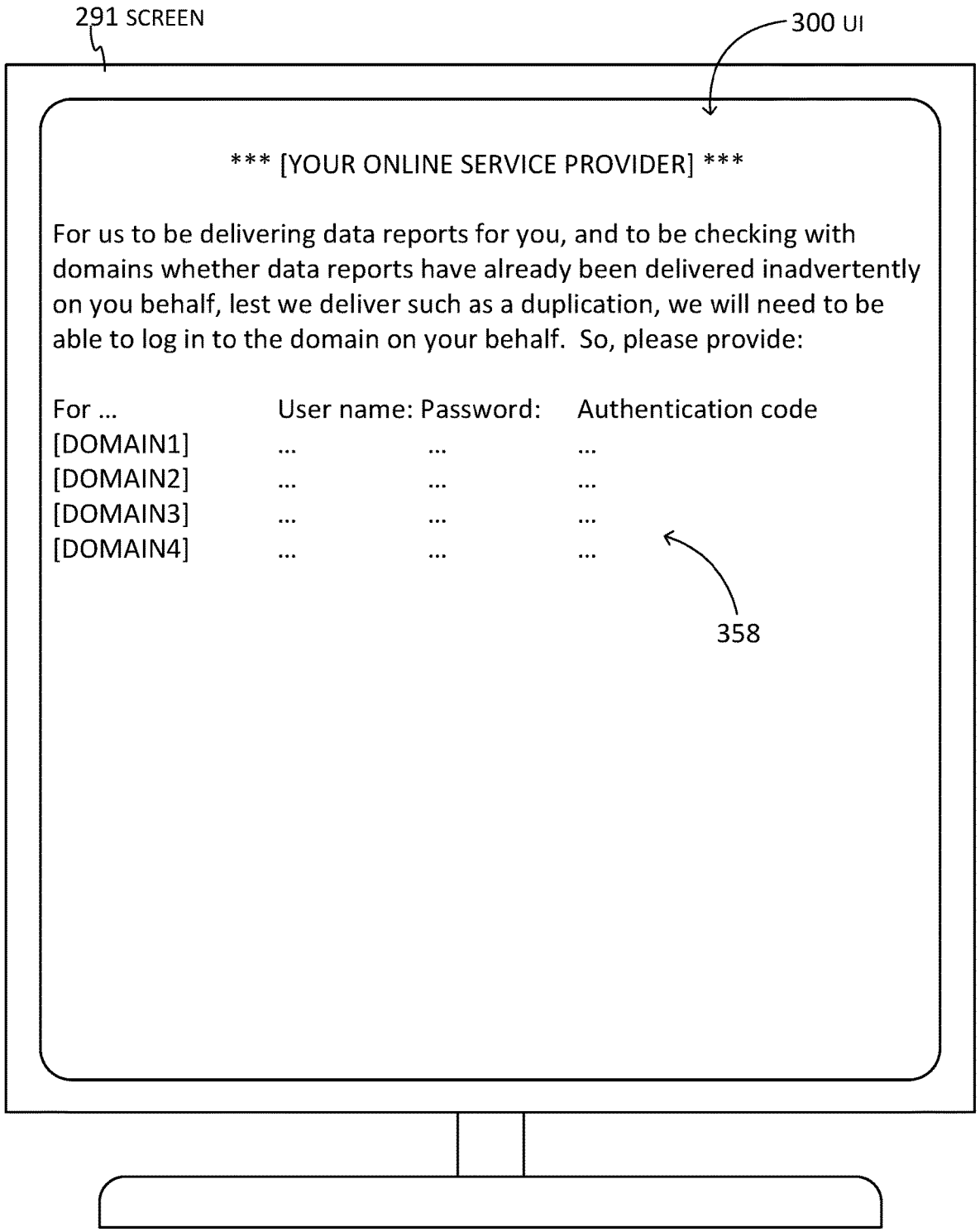
FIG. 3 — USER INTERFACE (UI), ABOUT SEARCHING FOR FILED DATA REPORT

DATA REPORTS, RELATIONSHIPS & ELEMENTS

FIG. 10     USER INTERFACE (UI)

SAMPLE CHEKING OF OLDER RESOURCE
FOR ACCURACY

USER INTERFACE (UI), WHEN NO DATA REPORT WAS FOUND

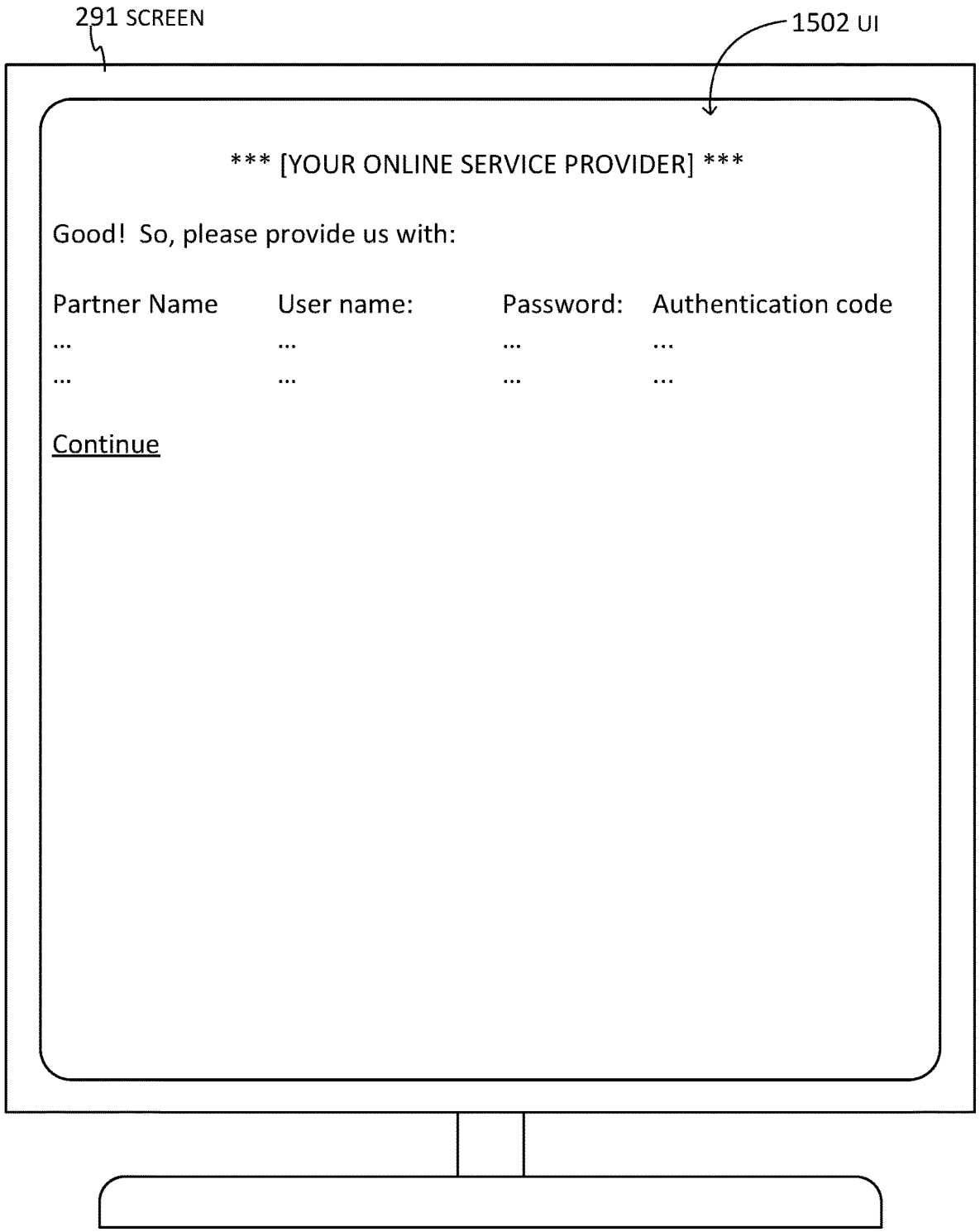
FIG. 15B — USER INTERFACE (UI), ABOUT SEARCHING FOR FILED DATA REPORT

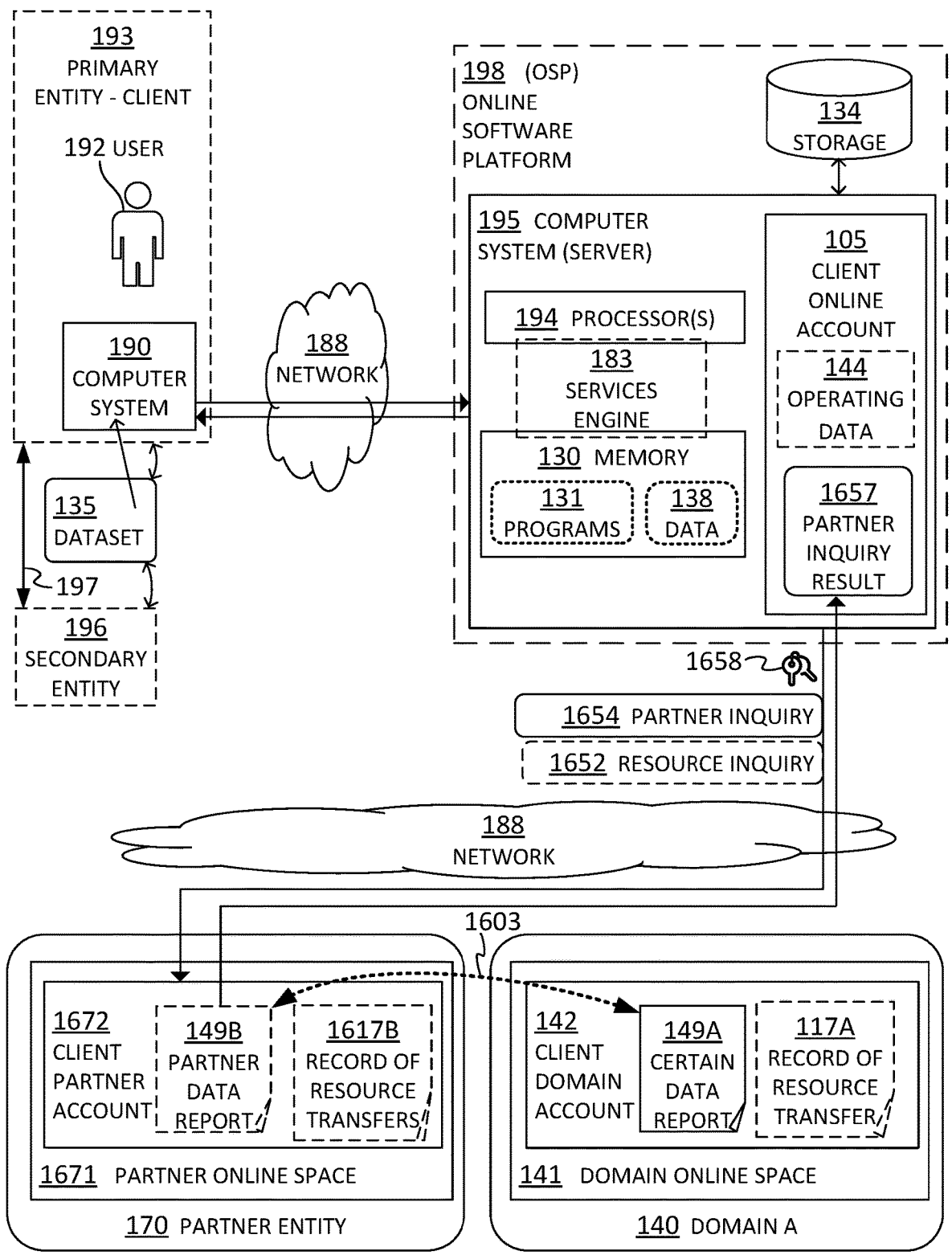
FIG. 16   RESEARCHING WHETHER IT WAS PARTNER WHO FILED THE CERTAIN DATA REPORT

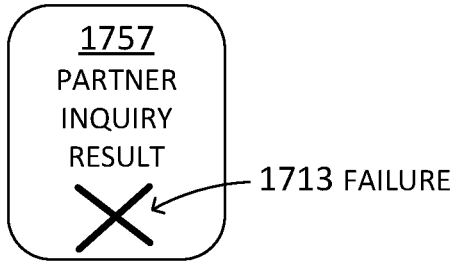
FIG. 17
FIG. 18
| 1957 PARTNER INQUIRY RESULT 1977 | | | |
|---|---|---|---|
| PARTNER DATA REPORT LISTING | TIME PERIOD | SIGNED? | DELIVERED TO DOMAIN? |
| 1949 "PARTNER DATA REPORT A" | N-1 | YES | YES |
| 1962 "PARTNER DATA REPORT B" | N-2 | YES | YES |
| 1963 "PARTNER DATA REPORT C" | N-3 | YES | YES |
| ... | ... | ... | ... |
FIG. 19

VALIDATING DOCUMENTS FOUND AS THE PARTNER INQUIRY RESULT

SAMPLE CONFIRMATION CRITERIA
TO VALIDATE
FOUND PARTNER DOCUMENTS
AS PARTNER DATA REPORTS

USER INTERFACE (UI)

METHODS

FIG. 26     USER INTERFACE (UI)

FIG. 28     *METHODS*

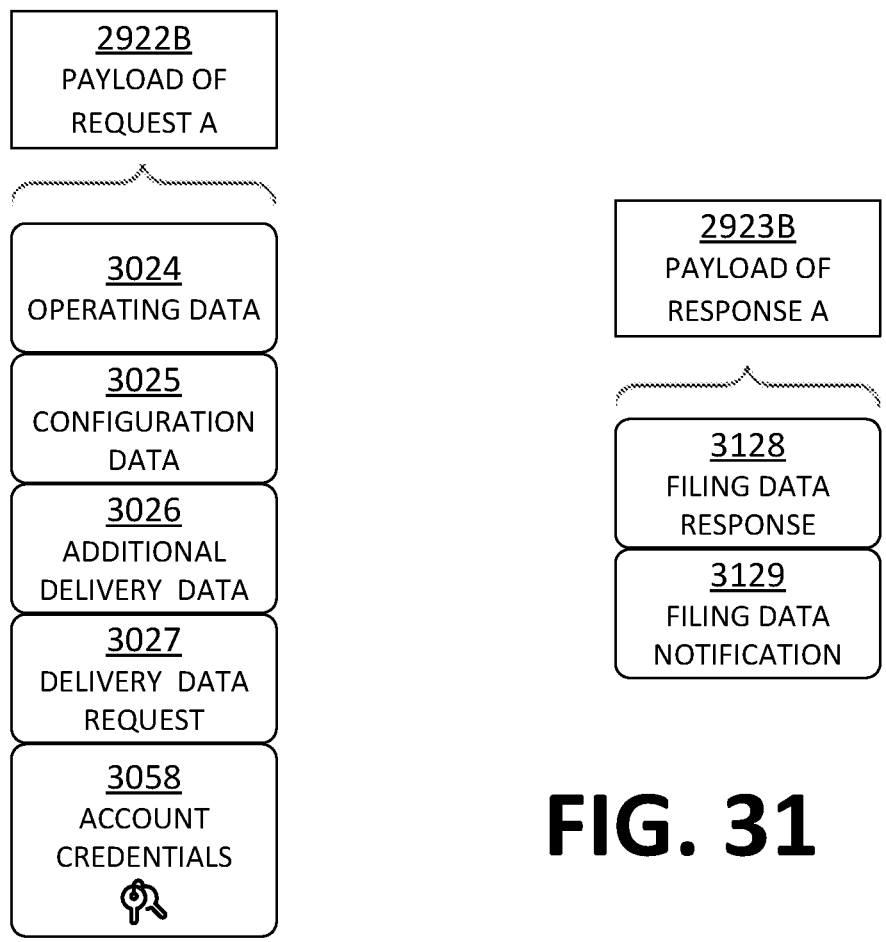
FIG. 30
FIG. 31
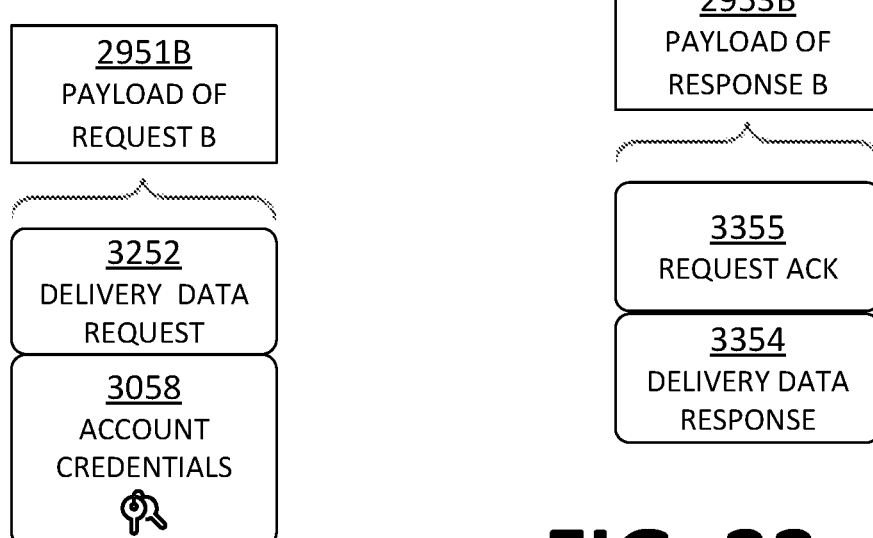
FIG. 32
FIG. 33

| A) SITUATION – WHAT HAPPENED | B) DETERMINE OCCURRENCE | C) OSP RECOMMENDS REMEDIES |
|---|---|---|
| 1) A third party was supposed to deliver a specific data report for the OSP client | Not delivered, and due | The OSP recommends delivering, before due date |
| 2) The OSP client was under impression that the liability for relationship instances has already been reported by a third party | Not delivered, delinquent | The OSP recommends the amendment process as suggested by the domain and also recommends actions for OSP client's third-party which missed delivering this |
| 3) The liability was correctly filed either by OSP client or the third party OSP client was in business with | Delivered, timely | The OSP recommends not to deliver again |
| 4) Operating data from one or group of relationship instances is missing | Partially delivered | The OSP finds the missing operating data and recommends the party liable to deliver |
| 5) Data reports included operating data, but without appropriate context or other requested information by domain | Parts missing | The OSP evaluated the missing information and suggests the amendment process and additionally supplies the information in desired format to parties liable for delivery |
| 6) The operating data was reported both by a third party and by OSP client themselves | Double delivered / overreported | The OSP finds more than one delivery for certain operating data, and suggests course correction |
| 7) The operating data was reported by a party which shouldn't have reported it | Wrong party filed and possibly also transferred resources | The OSP finds the operating data was reported by a party which was not supposed to, and hence supplies the information and recommends corrective actions |

FIG. 34

FIG. 38 — *USER INTERFACE (UI), ABOUT SEARCHING FOR FILED DATA REPORT*

*TAX RETURNS, RELATIONSHIPS & ELEMENTS*

SAMPLE CHEKING OF OLDER TAX
AMOUNT FOR ACCURACY

FIG. 44 — RESEARCHING WHETHER IT WAS PARTNER WHO FILED THE CERTAIN DATA REPORT

SAMPLE CONFIRMATION CRITERIA
TO VALIDATE
FOUND PARTNER DOCUMENTS
AS PARTNER DATA REPORTS

FIG. 48     METHODS

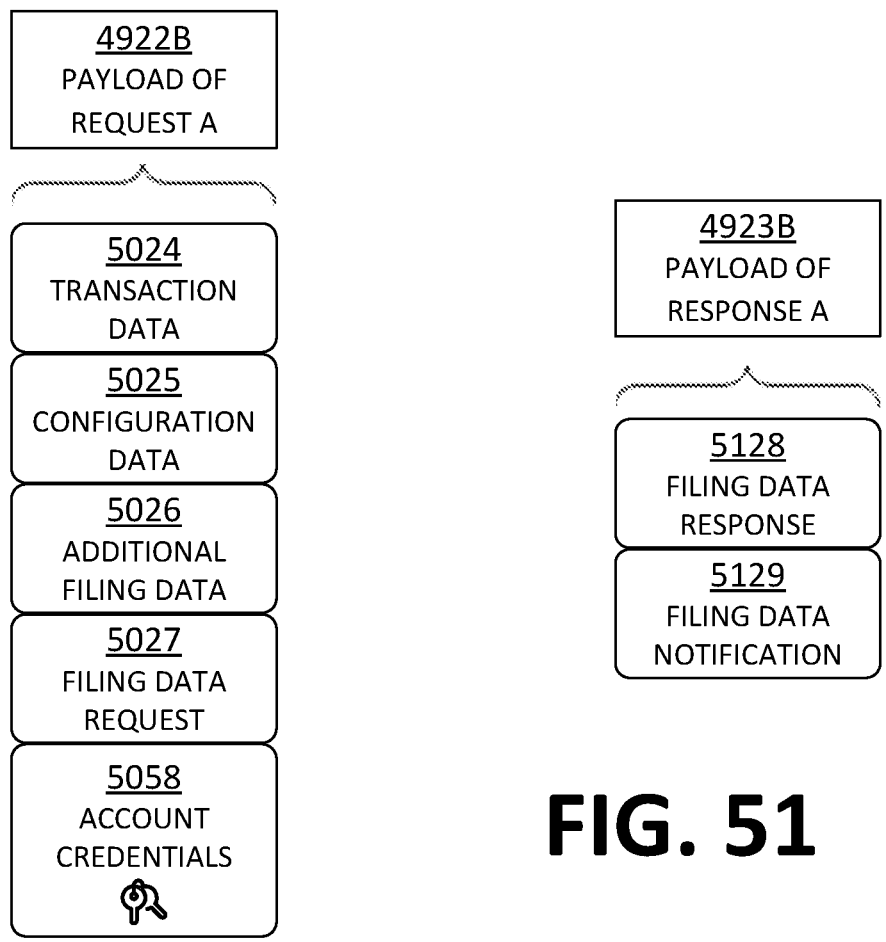
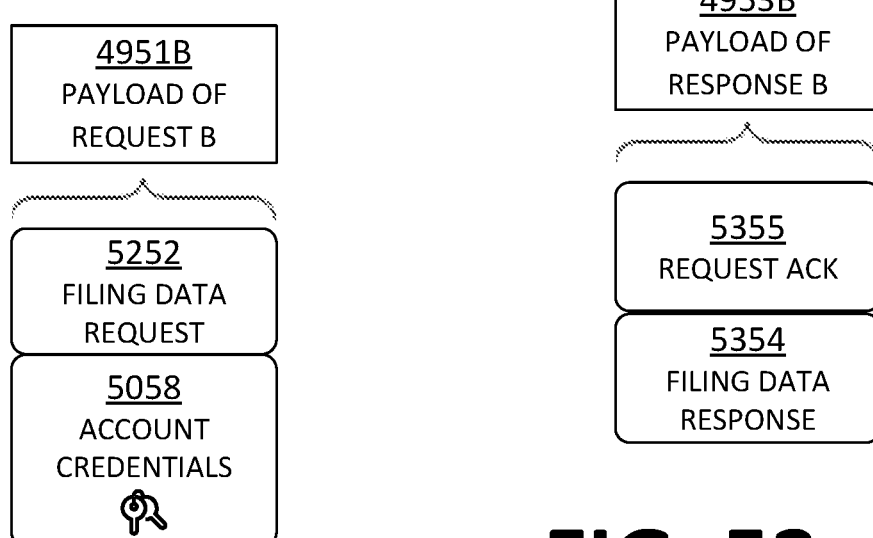

| A) THE USE CASE – WHAT HAPPENED | B) DETERMINE OCCURRENCE | C) OSP RECOMMENDS REMEDIES |
|---|---|---|
| 1) A third party was supposed to file a specific tax liability for the OSP client | Not filed, and due | The OSP recommends filing the liability due before due date |
| 2) The OSP client was under impression that the liability on a transaction has already been reported by a third party | Not filed, delinquent | The OSP recommends the amendment process as suggested by tax authority and also recommends actions for OSP client's third-party which missed filing this |
| 3) The liability was correctly filed either by OSP client or the third party OSP client was in business with | Filed, timely | The OSP recommends not to file again |
| 4) A transaction or set of transactions are missing | Partially filed | The OSP finds & recommends the missing transactions and the party liable to file & remit |
| 5) Transactions were filed without sufficient information e.g. exemption certificate mention or any other requested information by tax authorities | Parts missing | The OSP evaluated the missing information and suggests the amendment process and additionally supplies the information in desired format to parties liable for transmitting the information |
| 6) The transaction was reported both by a third party such as a marketplace and by OSP client themselves | Double filed/ overreported | The OSP finds more than one filing for one transaction or set of transactions for whole filing period or the filing itself and suggests the course correction to all involved parties |
| 7) The transaction was reported by a party which shouldn't have reported it | Wrong party filed and possibly also remitted | The OSP finds the transactions was reported by a party which was not supposed to and hence supplies the information and recommends corrective actions |
| 8) The transaction was reported by a third party by mistake and then later amended filing was done by the third party which resulted in refunding of the taxes | Wrong party refunded, Status back to Not filed, and due | The OSP assesses the audit risk in such a scenario and recommends corrective actions and generates evidence for OSP client to present to tax authorities and allow them to take corrective actions |

FIG. 54

ONLINE SOFTWARE PLATFORM (OSP) CHECKING DOMAIN FOR PRIOR ACTIONS OF DELIVERING DATA TO DOMAIN ON BEHALF OF PRIMARY ENTITY, TO PREVENT INADVERTENT DUPLICATION OF SUCH DELIVERING ACTION

BACKGROUND

Online software platforms (OSPs) communicate with devices of clients over computer networks, receive data from the clients, perform computations for the clients, make determinations for the clients, and even upload data to other computers on behalf of the clients.

All subject matter discussed in this Background section of this document is not necessarily prior art, and may not be presumed to be prior art simply because it is presented in this Background section. Plus, any reference to any prior art in this description is not, and should not be taken as, an acknowledgement or any form of suggestion that such prior art forms parts of the common general knowledge in any art in any country. Along these lines, any recognition of problems in the prior art discussed in this Background section or associated with such subject matter should not be treated as prior art, unless expressly stated to be prior art. Rather, the discussion of any subject matter in this Background section should be treated as part of the approach taken towards the particular problem by the inventors. This approach in and of itself may also be inventive.

SUMMARY

The present disclosure provides instances of computer systems, computer-readable media, and methods that perform operations such as deliver, on behalf of a primary entity, data reports to domains, but first check to see if such a data report has already taken delivered, perhaps inadvertently, due to duplicate, redundant instructions by the client.

In some embodiments, the checking is done first with a domain online space of the domain itself. Relevant operations include inputting domain-identifying information, identifying the domain from a plurality of domains based on the domain-identifying information, inputting client account credentials for a client domain account that the primary entity has with the domain online space of the domain, accessing the client domain account by using the client account credentials, and causing a delivery inquiry to be transmitted to the domain online space in a context of the accessed client domain account. The delivery inquiry inquires as to whether or not a certain data report has already been delivered to the domain on behalf of the primary entity. In response to the transmitted delivery inquiry, a delivery inquiry result is inputted and parsed. Based on the delivery inquiry result showing all is well, a new data report is delivered to the domain online space, else an alerting message is transmitted to an agent of the primary entity.

Additional optional operations include that, if the inquired—for certain data report is not found, generating a new data report for delivering it. Else, if the certain data report is indeed found, receiving a copy of it, forwarding it to the primary entity, checking it for discrepancies and reporting on them, and even exploring whether a similar data report is found in an online partner of the primary entity, which means duplicative instructions have been given.

Therefore, these embodiments of computer systems, computer-readable media, and methods help prevent duplicate deliveries, which helps prevent the problem of technical errors from arising when such duplicate deliveries are attempted without checking first the domain online space, thus improving the functioning of computer hardware and the technology of Enterprise Resource Planning (ERP) software applications, and enabling tasks to be performed with less latency and/or preserving more resources for use in performing other tasks or additional instances of the same task.

In other embodiments, the checking is done first by exploring domain online spaces of online partners. As such, the online software platform (OSP) checks a partner entity of the primary entity for prior actions indicating delivery of data reports by the partner entity to a domain on behalf of the primary entity, to lessen a chance of duplication of such delivery.

In particular, relevant operations include inputting, about the partner entity, partner information that includes partner account credentials for a client partner account in a partner online space, accessing the client partner account by using the partner account credentials, and causing a partner inquiry to be transmitted to the partner online space in a context of the client partner account. The partner inquiry inquires as to whether or not a partner data report has been created on behalf of the primary entity. In response to the transmitted partner inquiry, a partner inquiry result is inputted and parsed. Based on the partner inquiry result showing that such a partner data report has been created, a partner report message is caused to be transmitted to an agent of the primary entity.

Additional optional operations include parsing documents of the primary entity that are found in the client partner account of the partner online space, to determine whether they are the explored—for partner data report. The determination is made according to confirmation criteria, and so on.

Therefore, these further embodiments of computer systems, computer-readable media, and methods help prevent duplicate deliveries, which helps prevent the problem of technical errors from arising when such duplicate deliveries are attempted without checking first the partner online space, thus improving the functioning of computer hardware and the technology of ERP software applications, and enabling tasks to be performed with less latency and/or preserving more resources for use in performing other tasks or additional instances of the same task.

As such, it will be appreciated that embodiments have utility, and in fact may cause results that are larger than the sum of their individual parts.

These and other features and advantages of the claimed invention will become more readily apparent in view of the embodiments described and illustrated in this specification, namely in this written specification and the associated drawings.

BRIEF DESCRIPTION OF THE DRAWINGS

FIG. 2 shows a view of a sample User Interface (UI) according to an embodiment.

FIG. 3 shows a view of a sample User Interface (UI) according to an embodiment.

FIG. 15B shows a view of a sample User Interface (UI) according to an embodiment, which may result from when a user makes a specific selection in the UI of FIG. 15A.

FIG. 16 is a diagram of a sample aspects of embodiments, where a partner inquiry is launched to explore whether a certain data report that has already been found to have already been delivered to a domain online space perhaps could have been originated by a partner of a primary entity.

FIG. 17 depicts a first possible partner inquiry result that may be inputted by an OSP in response to a partner inquiry such as that of FIG. 16, according to embodiments.

FIG. 18 depicts a second possible partner inquiry result that may be inputted by an OSP in response to a partner inquiry such as that of FIG. 16, according to embodiments.

FIG. 19 depicts a third possible partner inquiry result that may be inputted by an OSP in response to a partner inquiry such as that of FIG. 16, according to embodiments.

FIG. 30 is a diagram of a sample request payload in the architecture of FIG. 29.

FIG. 31 is a diagram of a sample response payload in the architecture of FIG. 29.

FIG. 32 is a diagram of a sample request payload in the architecture of FIG. 29.

FIG. 33 is a diagram of a sample response payload in the architecture of FIG. 29.

FIG. 34 is a table listing sample potential problems diagnosed by embodiments.

FIG. 50 is a diagram of an operational example of a request payload in the use case of FIG. 49.

FIG. 51 is a diagram of an operational example of a response payload in the use case of FIG. 49.

FIG. 52 is a diagram of an operational example of a request payload in the use case of FIG. 49.

FIG. 53 is a diagram of an operational example of a response payload in the use case of FIG. 49.

FIG. 54 is a table listing sample potential problems diagnosed in use cases of embodiments.

DETAILED DESCRIPTION

As has been mentioned, the present description is about computer systems, computer-readable media, and methods that perform operations. Particulars are now described.

Figure 1:
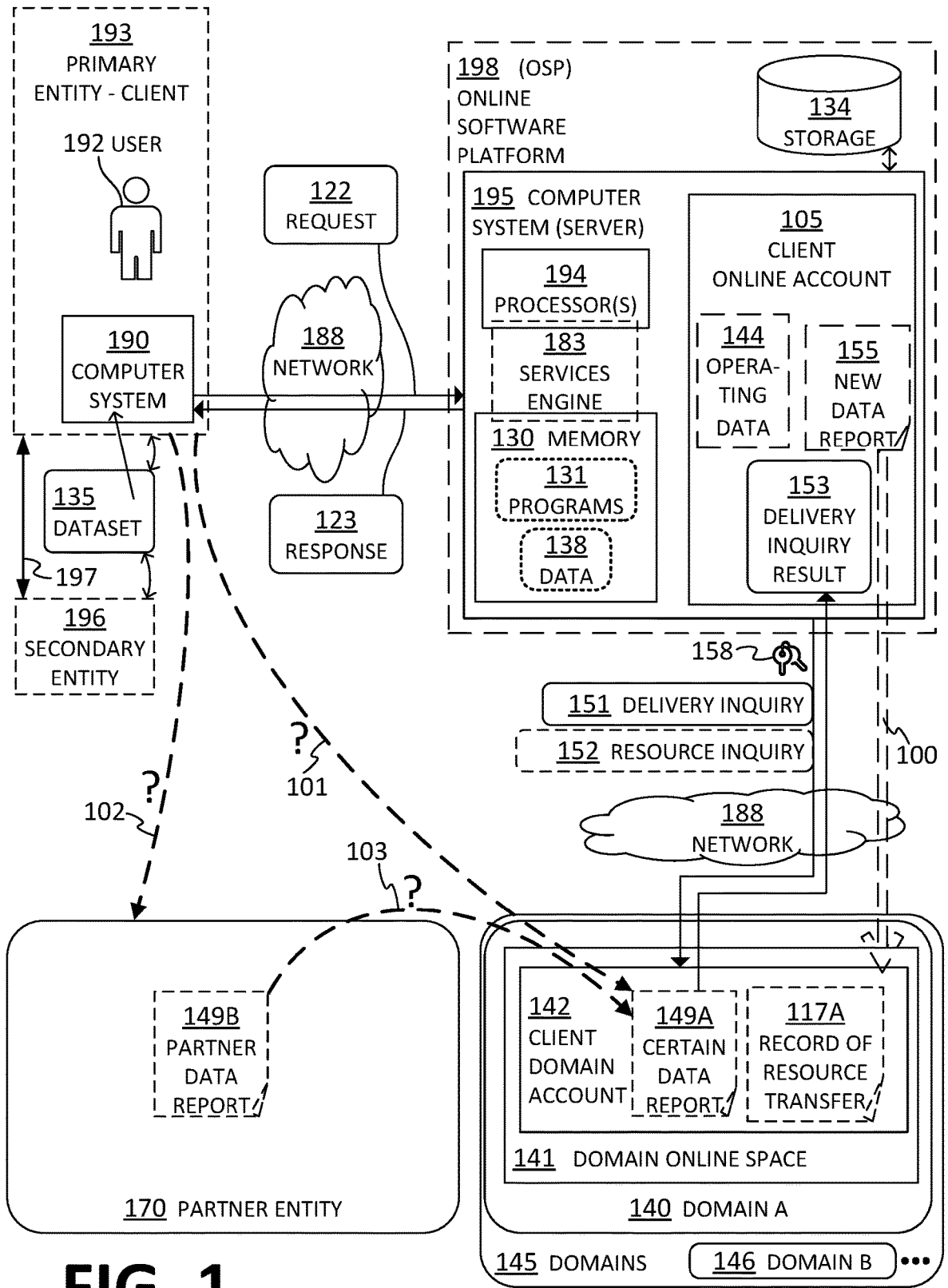
FIG. 1 is a diagram of a sample aspects of embodiments, which are improvements in automated computerized systems.

FIG. 1 is a diagram showing sample aspects of embodiments. A sample computer system 195 according to embodiments is shown, which may be implemented by a server. The computer system 195 has one or more processors 194 and a memory 130. The memory 130 stores programs 131 and data 138. The one or more processors 194 and the memory 130 of the computer system 195 thus implement a services engine 183.

The computer system 195 can be located in "the cloud," which is a term used from the point of view of client computers. The computer system 195, however, is typically implemented in earthbound ways. The computer system 195 may optionally be implemented as part of an Online Software Platform (OSP) 198, which is also referred to as the computer system 195 being hosted by the OSP 198. A database storage 134 may be accessed by the computer system 195. The database storage 134 could be part of the OSP 198, or outside it.

The computer system 195 can be configured to perform one or more predefined services, for example via operations of the services engine 183. Such services can be searches, determinations, computations, verifications, notifications, the transmission of specialized information, including data that effectuates transfer of resources, the generation of documents, the online accessing of other systems to deliver documents, such as by uploading, and so on, including what is described in this document. Such services can be provided in the form of Software as a Service (SaaS). As such, the OSP 198 can be an online service provider.

A user 192 may be standalone. The user 192 may use a computer system 190. The computer system 190 may have a screen, which is not shown separately, and on which User Interfaces (UIs) may be shown. In embodiments, the user 192 and the computer system 190 are considered part of a primary entity 193, which could be an organization, an institution, and so on. In such instances, the user 192 can be an agent of the primary entity 193, and even within a physical site of the entity 193, although that is not necessary. In embodiments, the computer system 190 or other device of the user 192 can be client devices for the computer system 195. The user 192 or the primary entity 193 can use the services of the OSP 198, and thus also be a client. For instance, the user 192 may log into the computer system 195 by using credentials, such as a user name, a password, a token, and so on.

The computer system 190 may access the computer system 195 via a communications network 188, such as the internet. In particular, the entities and associated systems of FIG. 1 may communicate via physical and logical channels of the communications network 188. For example, information may be communicated as data using the Internet Protocol (IP) suite over a packet-switched network such as the Internet or other packet-switched network, which may be included as part of the communications network 188. The communications network 188 may include many different types of computer networks and communication media, including those used by various different physical and logical channels of communication, now known or later developed. Non-limiting media and communication channel examples include one or more, or any operable combination of: fiber optic systems, satellite systems, cable systems, microwave systems, Asynchronous Transfer Mode ("ATM") systems, frame relay systems, Digital Subscriber Line ("DSL") systems, Radio Frequency ("RF") systems, telephone systems, cellular systems, other wireless systems, and the Internet. In various embodiments the communications network 188 can be or include any type of network, such as a Local Area Network (LAN), a Metropolitan Area Network (MAN), a Wide Area Network (WAN), or the internet. Accordingly, from certain perspectives, the OSP 198 is in the cloud.

Accessing, downloading and/or uploading, and so on may be permitted among these computer systems. Such can be performed, for instance, with manually delivering or uploading files, like spreadsheet files, etc. Such can also be performed automatically as shown in the example of FIG. 1, with computer systems exchanging requests and responses. A sample request 122 and a sample response 123 are shown, which implement embodiments described in this document, and have their handshakes defined, and so on. A single request 122 and a single response 123 are shown for what could be multiple transmissions.

In embodiments, the user 192 and/or the primary entity 193 have instances of relationships with secondary entities. Only one such secondary entity 196 is shown. The secondary entity 196 can be an organization, a person, and so on. In some embodiments, the secondary entity 196 has an electronic device such as a cellphone, tablet, laptop, desktop computer system and so on. In this example, the primary entity 193 has a relationship instance 197 with the secondary entity 196. In fact, the secondary entity 196 may have used a device to create the relationship instance 197. The primary entity 193 and/or the secondary entity 196 may be referred to as simply entities. One of these entities may have one or more attributes. Such an attribute of such an entity may be any one of its name, type of entity, a physical or geographical location such as an address, a contact information element, an affiliation, a characterization of another entity, a characterization by another entity, an association or relationship with another entity (general or specific instances), an asset of the entity, a declaration by or on behalf of the entity, a specific domain that the entity belongs in a context of multiple domains that are defined in terms of the above, and so on.

In some instances, the user 192 and/or the primary entity 193 obtain data about one or more secondary entities, for example as necessary for conducting the relationship instances with them. The obtained data can be about attributes of the entities, or of the relationship instances. An individual sample dataset 135 is shown, which may be formed from such data. More about such datasets is described later in this document. Operating data 144 may be generated from one or more of such individual datasets. Such operating data 144 may be stored in the computer system 190, in the OSP 198, and so on.

In embodiments, the computer system 195 may be further designed or programmed to input domain-identifying information. In the example of FIG. 1, at the bottom right, a set of domains 145 is shown, which includes a plurality of domains. These include at least a Domain A 140, a Domain B 146, and possibly other domains as indicated by the dot-dot-dot.

The domain-identifying information is input by being received in a number of ways. In some embodiments, the domain-identifying information is received directly from the primary entity 193. In other embodiments, the domain-identifying information is received indirectly from another, such as a partner, on behalf of the primary entity 193. The partner may be the partner entity 170, or another.

In embodiments, the computer system 195 may be further designed or programmed to identify, from the domain-identifying information, a domain from a plurality of domains. In this example, the Domain A 140 is identified from the domain-identifying information.

The Domain A 140 has a domain online space 141 in an OSP, which can be the OSP 198 or another OSP. The primary entity 193 has a client domain account 142 in the domain online space 141. In this example, the primary entity 193 has had relationship instances with secondary entities. In the example of FIG. 1, some of these secondary entities, including the secondary entity 196, are associated with the Domain A 140.

The domain may be identified from the domain-identifying information in a number of ways. For instance, the domain-identifying information can be directly the name of the domain. Or, the domain-identifying information can be data from which the name of the domain can be parsed or looked up from further data and/or rules, as also seen later in this document. For instance, the domain-identifying information may include operating data 144 from the relationship instances of the primary entity 193 with those of the secondary entities that are associated with the Domain A 140, and the Domain A 140 can be identified from the operating data 144. In fact, the operating data 144 can be one or more datasets, such as the dataset 135, or data derived from such datasets, and so on.

Sometimes the primary entity 193 delivers a certain data report 149A to the Domain A 140, by delivering it to the domain online space 141. The certain data report 149A may relate to the relationship instances of the primary entity 193 with those of the secondary entities that are associated with the Domain A 140. In FIG. 1, as in many of the drawings of this document, such reports and records are depicted with the icon of a document, but that is for convenience only and not necessary. Indeed, such a report and record can be in a document format, such as .pdf or xml format, and its delivery can be performed by uploading. Alternately, such reports and records can be files that are assembled from responses received by a user who is responding to a series of queries. These responses may even include a signature, whether as an image, and/or as an electronic signature, and/or as an affirmation to a specific query, and so on.

Sometimes the primary entity 193 further makes one or more transfers of resources to the Domain A 140. The transfers may be consonant with the certain data report 149A. In such embodiments, there may be a record 117A of such resource transfers. In some embodiments, the record 117A is part of the certain data report 149A, while in other times a separate record, which is accessed by a separate resource inquiry 152. Or, the resource inquiry 152 can be part of the delivery inquiry 151.

In embodiments, the primary entity 193 engages the OSP 198 for a number of actions. These can include for the OSP 198 to deliver a new data report 155 to the Domain A 140. The delivery is shown as a delivery arrow 100. These can even include for the OSP 198 to prepare the new data report 155. As such, the OSP 198 would be performing these actions, instead of the primary entity 193 doing these actions.

For such engaging, in embodiments, in the OSP 198 a client online account 105 is opened for the primary entity 193. For instance, the computer system 195 may be further designed or programmed to receive, from a remote device via a communications network, initial instructions on behalf of the primary entity 193, and to open responsive to the initial instructions, in the OSP 198 the client online account 105 for the primary entity 193. These initial instructions may be received directly by the primary entity 193, or by another entity on behalf of the primary entity 193. In fact, the operating data 144 may be stored in the client online account 105.

In the context of opening the client online account 105, the primary entity 193 then typically on-boards with the OSP. This means that the user 192 logs into their client online account 105 and enters their data such as contact information, their selected options for services, and so on. They often do this via User Interfaces (UIs). Examples are now described.

FIG. 2 shows a screen 291, which could be the screen of the computer system 190 that is seen by the user 192. FIG. 2 also shows a sample UI 200 on the screen 291. In embodiments, the primary entity 193 further requests from the OSP 198 the service of preparing and delivering data reports, instead of the primary entity 193 having to do that. In the example of FIG. 2, the option 255 can be accordingly selected. If it is, then the option 251 becomes meaningful, and can be also selected.

Responsive to the option 255 having been selected, and also referring to FIG. 1, the OSP 198 will, in embodiments, prepare the intended new data report 155, for instance from the operating data 144, and deliver it per the delivery arrow 100. Before that, however, and responsive to the option 251 having been selected, the OSP 198 will first check the domain online space 141 to see whether the certain data report 149A has already delivered. It will be appreciated that the option 251 is an opt-in feature, which may be implemented with additional consent, and so on.

The checking according to the selected option 251, therefore, solves the problem that the intended new data report 155 may be attempted to be delivered as a duplication, if the certain data report 149A has already been delivered previously on behalf of the primary entity 193. From the language of the option 251, such previous delivery could have been direct or indirect. Referring also to FIG. 1, for one example, the primary entity 193 may have already, by itself, directly created and delivered such a certain data report, namely the certain data report 149A. That delivery would be according to a delivery arrow 101. The delivery arrow 101 is shown with a question mark, because the OSP 198 does not know whether it has taken place. For another example, the primary entity 193 may have in directly engaged a partner entity 170. And further, it is possible that the primary entity 193 has also tasked the partner entity 170 to prepare a partner data report 149B according to an instruction arrow 102, and to deliver the data report as the certain data report 149A according to a delivery arrow 103. Again, the instruction arrow 102 and the delivery arrow 103 are shown with question marks, because the OSP 198 does not know whether they have taken place.

Still referring also to FIG. 1, the checking according to the selected option 251 may be performed by the OSP 198 using client account credentials 158. In embodiments, the computer system 195 may be further designed or programmed to input the client account credentials 158 for the client domain account 142. An example is now described.

FIG. 3 shows the screen 291, after the option 251 has been selected during on-boarding. A UI 300 issues requests 358 for client account credentials for the applicable domains that have been identified. The client account credentials are input by the user 192 responding to the requests 358.

Returning to FIG. 1, the client account credentials 158 may be input also in other ways. For instance, the domain-identifying information may include the client account credentials, and the OSP 198 may parse the client account credentials 158 from the domain-identifying information. Or, the client domain account 142 may be established on behalf of the primary entity 193 by the OSP 198 or by a partner, and such establishing may generate the client account credentials 158 in the process.

In embodiments, the computer system 195 may be further designed or programmed to access, using the client account credentials 158 and via a communications network 188, the client domain account 142 in the domain online space 141.

In embodiments, the computer system 195 may be further designed or programmed to cause a delivery inquiry 151 to be transmitted to the domain online space 141 in a context of the accessed client domain account 142. The delivery inquiry 151 may inquire, in computer terms of course, as to whether or not a certain data report 149A has already been delivered to the Domain A 140 on behalf of the primary entity 193. The context would be that the certain data report 149A relates to the primary entity 193 for which the client domain account 142 is maintained, regardless of whether or not the certain data report 149A itself is actually stored in the client domain account 142. In this case, the certain data report 149A would be relating to the relationship instances of the primary entity 193 with those of the secondary entities that are associated with the Domain A 140. As such, the delivery inquiry may be generated for the identified Domain A 140. While only one such certain data report 149A is shown in FIG. 1, there could be multiple such data reports for different time periods. Examples are now described.

Figure 4:
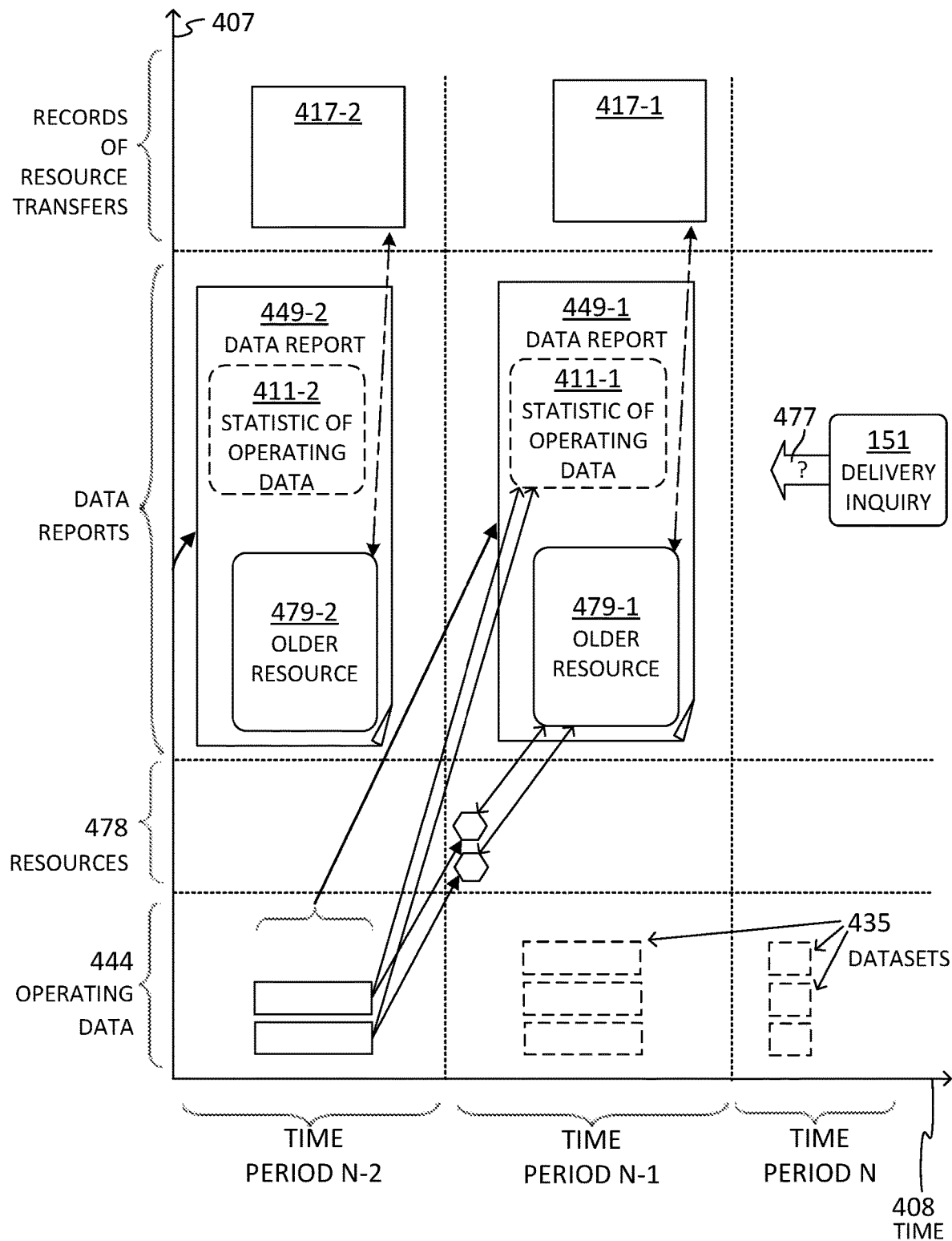
FIG. 4 shows sample data reports that may be available in response to a delivery inquiry, along with some of their relationships and some of their elements, in embodiments.

FIG. 4 has a vertical element axis 407 and a horizontal time axis 408. The horizontal time axis 408 shows sample consecutive time periods, for showing time relationships. A time period N can be thought of as a reference, and it could be for the present time.

FIG. 4 shows a sample data report 449-1 in the time period N-1, meaning one before N, and a sample data report 449-2 in the time period N-2, going back in time even farther. These may be inquired about by the delivery inquiry 151, according to an inquiry arrow 477.

As such, in embodiments, the delivery inquiry 151 can be caused to be transmitted at a time that belongs in a first time period, and the certain data report relates to the relationship instances of the primary entity with the secondary entities associated with the domain during a second time period, which occurs immediately before the first time period.

FIG. 4 also shows sample operating data 444. In this particular example, these are made from assemblies of individual datasets 435, which are shown at their time periods. In embodiments, the individual datasets 435 themselves include a time indication as one of their parameters, from which their time period can be determined.

The data reports 449-1, 449-2 have been made from the operating data 444. In particular, the data report 449-1 may include a statistic 411-1 of the operating data 444 of its previous time period. Similarly, the data report 449-2 may include a statistic 411-2 of the operating data 444 of its previous time period.

The data report 449-1 also includes an older resource 479-1 that is distinct from the statistic 411-1. Similarly, the data report 449-2 also includes an older resource 479-2 that is distinct from the statistic 411-2. In embodiments, the older resource has been produced from the statistic, in each of these data reports, whether or not the statistic is included in the data reports. The name "older" for these resource values is chosen from the perspective of the OSP 198 to differentiate between such resource values that may be appearing in potential previous reports by others, from aggregate resources that may be produced afterwards by the computer system 195.

FIG. 4 further shows resources 478, and when they were transferred, in relation to operating data and/or the older resource 479-1 in the data report 449-1. Of course, all may have been transferred in a single operation. FIG. 4 further shows a record 417-1 of resources transferred, and another record 417-2 of resources transferred. The resource inquiry 152 may similarly inquire about the records 417-1 and 417-2.

Returning to FIG. 1, in embodiments, the computer system 195 may be further designed or programmed to input, responsive to the transmitted delivery inquiry 151, a delivery inquiry result 153. The delivery inquiry result 153 is shown by an arrow as received from the domain online space 141, and in particular from the certain data report 149A itself, as can be sometimes the case. In fact, and as will be seen later in this document, the delivery inquiry result 153 can be deduced from a failure, such as a failure of handshake. Moreover, the delivery inquiry result 153 is shown as being within the client online account 105, although that is not necessary for all embodiments.

In some embodiments, the delivery inquiry result 153, or an aspect of it, provides the answer to what is inquired by the delivery inquiry 151, namely whether or not a certain data report 149A has already been delivered to the Domain A 140 on behalf of the primary entity 193. In other embodiments, it does not provide the answer. In some embodiments, the computer system 195 may be further designed or programmed to determine whether an aspect of the delivery inquiry result 153 indicates that the certain data report 149A has or has not already been delivered to the Domain A 140. Examples of both are now described.

Figure 5:
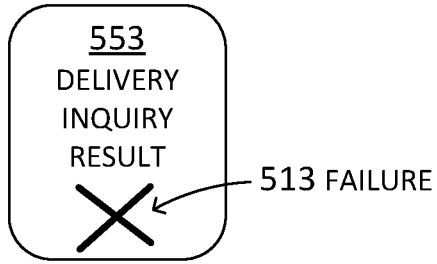
FIG. 5 depicts a first possible delivery inquiry result that may be inputted by an OSP in response to a delivery inquiry, according to embodiments.

FIG. 5 depicts a possible delivery inquiry result 553, which includes a failure 513. The failure 513 could be the aspect of the delivery inquiry result 553. The failure 513 may arise for a number of reasons. These include that the delivery inquiry 151 is not compatible with how the domain online space 141 can respond, and there is no resulting successful handshake. As such, in some embodiments, no aspect of the delivery inquiry result 553 indicates whether or not such a certain data report, namely the certain data report 149A, has already been delivered to Domain A 140 by indicating the failure 513. When that happens, different handshakes may be explored, an error message should be generated for the user 192, and so on. Importantly, the failure 513 does not necessarily prove that there was no certain data report 149A. For instance, there could have been one, but the delivery inquiry 151 failed to find it, for reasons of lack of compatibility in the handshake.

In some instances, the aspect of the delivery inquiry result expressly indicates that the certain data report has already been delivered to the domain. Two examples are now described.

Figure 6:
FIG. 6 depicts a second possible delivery inquiry result that may be inputted by an OSP in response to a delivery inquiry, according to embodiments.

FIG. 6 depicts a possible delivery inquiry result 653, which includes an aspect 677. The delivery inquiry result 653, or the aspect 677, expressly indicates that such a certain data report, namely the certain data report 149A has already been delivered to the Domain A 140. The indication is provided expressly as information. In embodiments, the aspect of the delivery inquiry result expressly indicates that the certain data report has not already been delivered to the Domain A 140, which can be implemented similarly with what is shown in FIG. 6.

Figure 7:
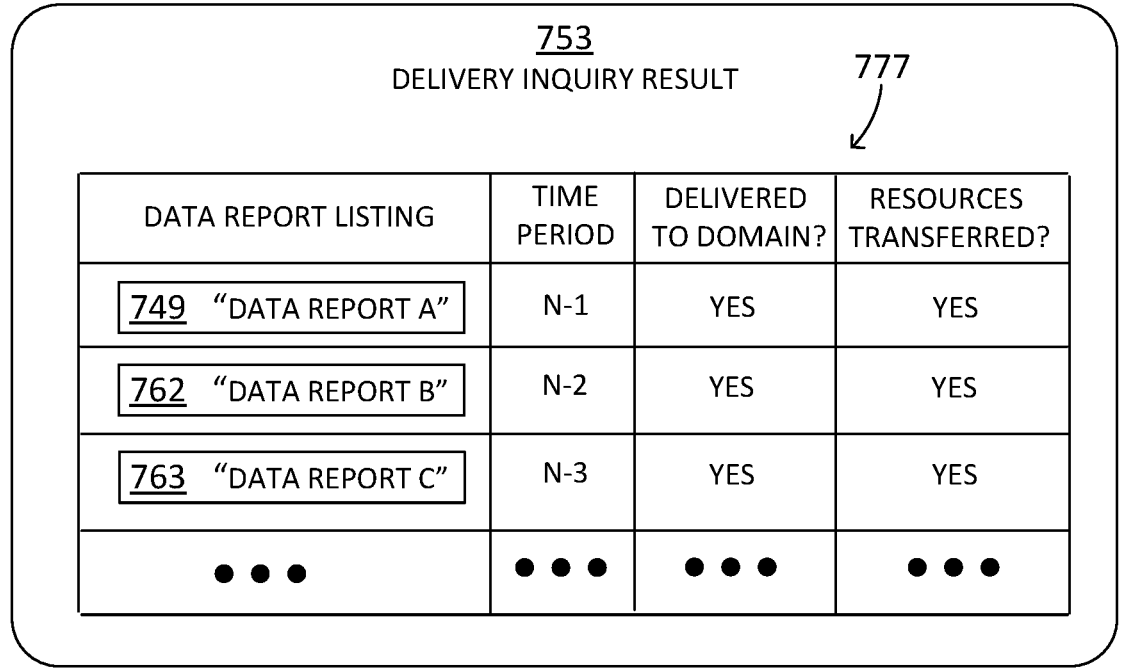
FIG. 7 depicts a third possible delivery inquiry result that may be inputted by an OSP in response to a delivery inquiry, according to embodiments.

FIG. 7 depicts a possible delivery inquiry result 753, which includes an aspect. The aspect is a table 777 that has columns. The first column is a listing of links 749, 762, 763. These links show assigned names of the data reports to which the links lead to. In this example, the link 749 could lead to the certain data report 149A.

In this example, the second column for the table 777 is for the time period these reports are for. Such time periods can be seen in FIG. 4. The third column is for whether or not the report has been delivered to the domain. The fourth column is for whether or not the resources associated with the report have been delivered to the domain, as described later in this document. With proper programming, the computer system 195 may be able to parse the table 777.

In embodiments, the certain data report is explored for by its expected filename. An example is now described.

Figure 8:
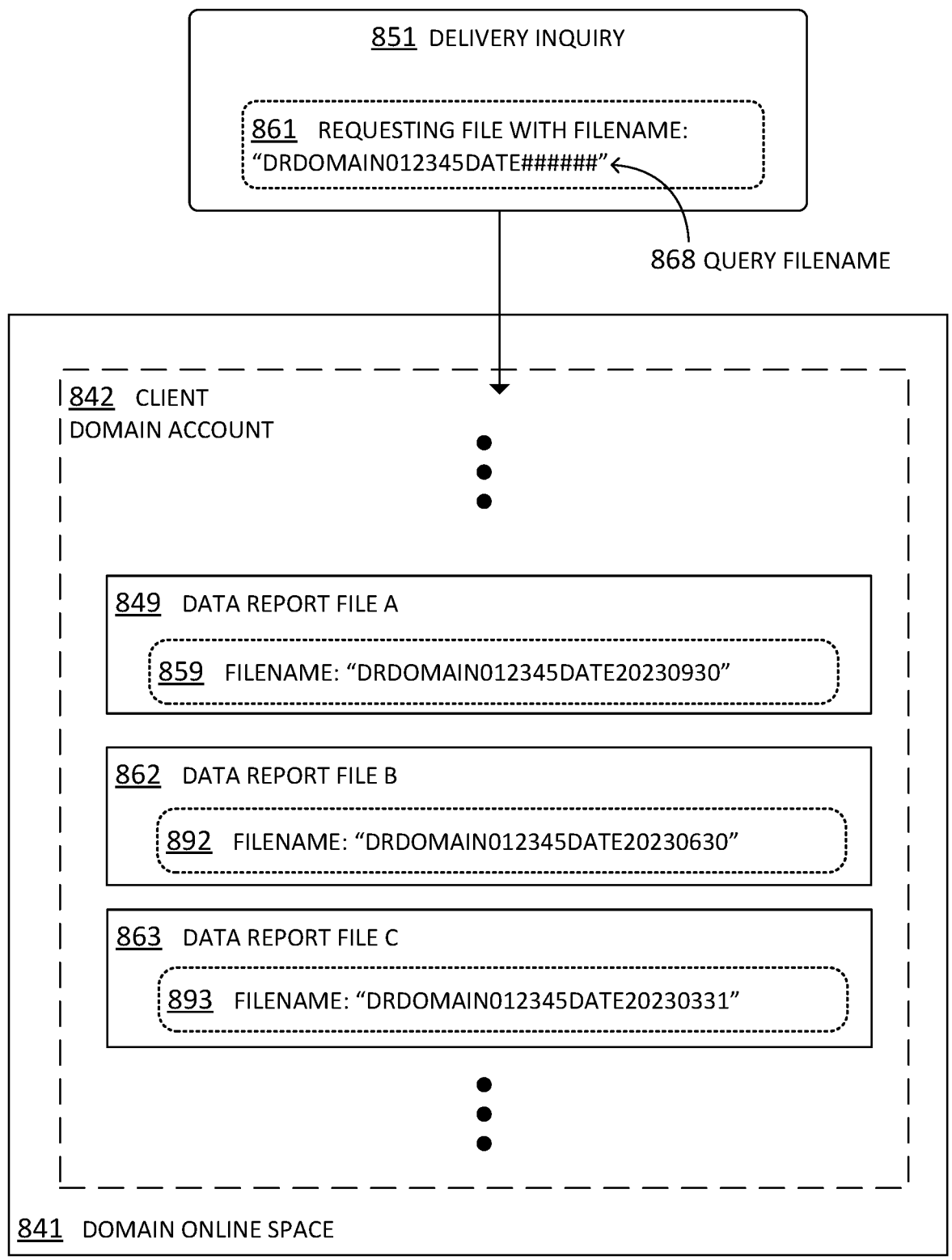
FIG. 8 is a diagram showing sample embodiments where a delivery inquiry requests a certain data report by its expected filename.

FIG. 8 shows a delivery inquiry 851 and data reports . . . , 849, 862, 863, . . . . The data reports 849, 862, 863 are stored in a sample domain online space 841 in the context of a sample client domain account 842 as data report files. As such, these data reports may be stored in the client domain account 842, or be indexable from it, and so on.

The three shown data report files have respective filenames 859, 892, 893, which can be read from the diagram. In some embodiments, these filenames are set according to a convention, so that it is easier for the delivery inquiry 151, 851 to inquire about them. The convention in this example is a short name for the type of file, i.e. that it is a data report file, followed by a designation "DOMAIN" that a domain number will follow, followed by a six digit number assigned to the Domain A 140, followed by a designation "DATE" indicating that a date will follow, and then followed by a date in the year-month-day number format.

In the example of FIG. 8, the delivery inquiry 851 includes a feature 861. The feature 861 requests the certain data report by a query filename 868. The query filename 868, which can be read on FIG. 8, can be such that it invokes the certain filename. In this example, the query filename 868 uses the "hash" character (#) for any character in the certain filename.

In embodiments, the query filename 868 can be looked up from filenames known to be used by the Domain A 140 in the domain online space 141. This looking up can take place from an advance mapping exercise, preparing look up tables for use, such as in connectors and so on.

In some embodiments, the delivery inquiry result 153 includes a listing of filenames of documents that are candidates to be the certain data report 149A. In the example of FIG. 8, the query that uses the hash character could produce a listing that includes all the filenames shown in FIG. 8. Then the aforementioned aspect of the delivery inquiry result 153 can be a filename of one of the documents, for instance if it matches the expected filename of the certain data report 149A. Such matching can be explored by specific criteria, by Artificial Intelligence (AI), and so on.

All of what was mentioned above for exploring for the certain data report 149A can apply also for the record 117A of resource transfer.

In embodiments, such as those of FIG. 6 or FIG. 7 of FIG. 8, the certain data report 149A has been found. As such, following the instruction to deliver a data report creates the risk of duplicative deliveries. Indeed, if the OSP 198 were to deliver a new data report as requested, there would be duplication, or an error or a failure arising from a "collision" of the new data report with the certain data report 149A. When that would happen, it cannot necessarily be blamed on the user 192 of the primary entity 193 as a mistake. Indeed, different OSPs provide different services, and primary entity 193 may have different users, with inadvertently overlapping responsibilities, and so on.

In such embodiments, the computer system 195 may be further designed or programmed to cause, responsive to an aspect of the delivery inquiry result indicating that the certain data report has already been delivered to the domain, an alerting message to be communicated to an agent of the primary entity, such as the user 192. The alerting message may report on the delivery inquiry result. An arrangement is now shown.

Figure 9:
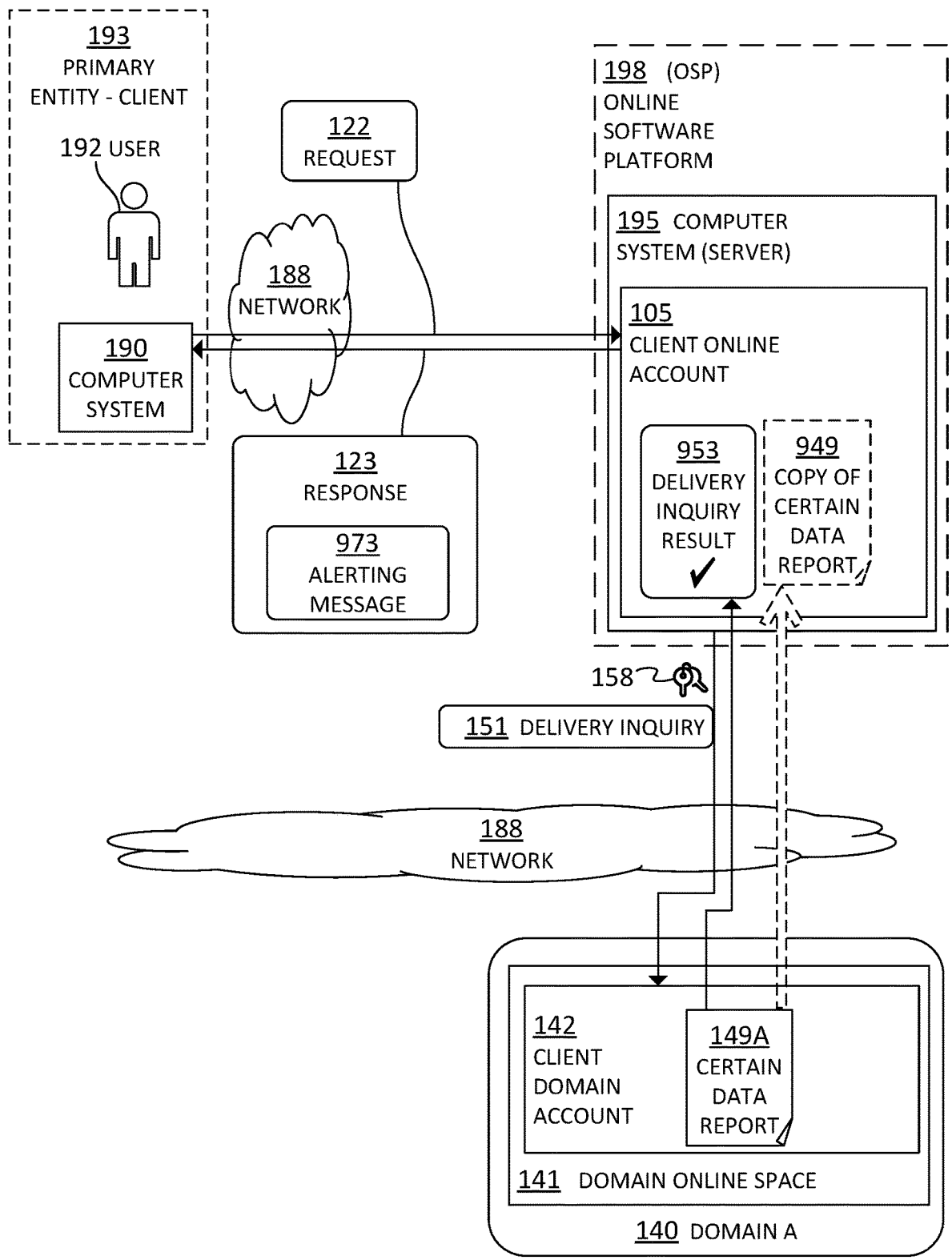
FIG. 9 is a diagram of sample aspects of embodiments where a suspected certain data report is found, for instance as shown in FIG. 6 or FIG. 7, and then reported by a delivery inquiry result.

FIG. 9 is a diagram that repeats many elements of FIG. 1. However, the certain data report 149A that was suspected in FIG. 1, and which was presented in FIG. 1 in dashed lines, is now known to exist, from a delivery inquiry result 953. As such, the certain data report 149A is shown in FIG. 9 in solid lines. As part of the handshake between the request 122 and the response 123, an alerting message 973 can be sent to the computer system 190 for the user 192.

In some embodiments, the computer system 195 may be further designed or programmed to receive a copy 949 of the certain data report 149A, responsive to the aspect of the delivery inquiry result indicating that the certain data report has already been delivered to the domain. The computer system 195 may be further designed or programmed to place the received copy 949 into the client online account 105. This way the copy 949 can be reviewed, parsed, and even forwarded to the primary entity 193. In some embodiments, the copy 949 may be thus received as an attachment, for instance as part of the delivery inquiry result 953.

The alerting message 973 can be about what is found and further options. An example is now described.

Figure 10:
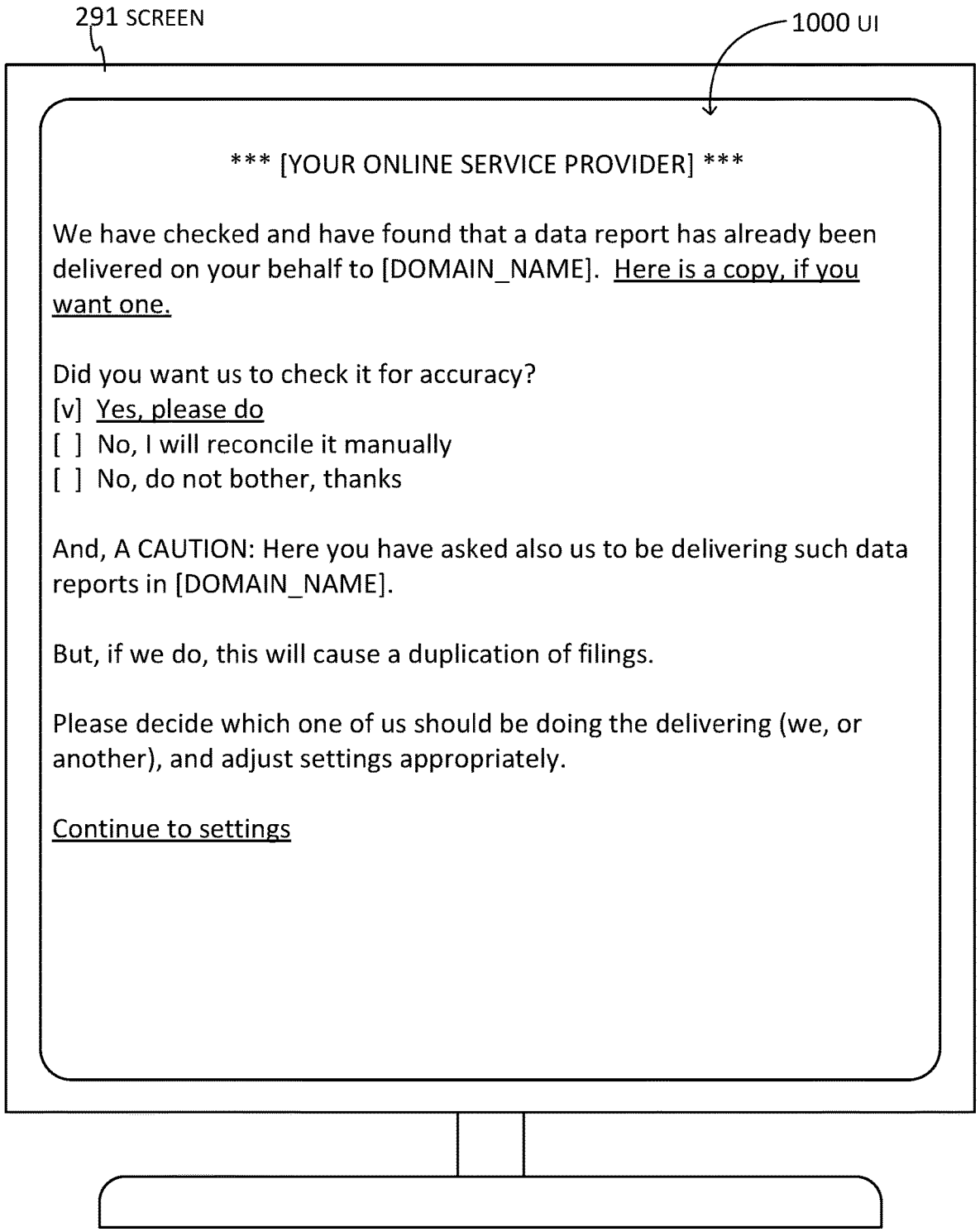
FIG. 10 shows a view of a User Interface (UI) with a sample alerting message for the situation of FIG. 9, according to an embodiment.

FIG. 10 shows a view of the screen 291, with a sample UI 1000 for the alerting message. The UI 1000 shows language that speaks about the conflicting requests based on the discovered previously delivered certain data report 149A, and so on.

The example of FIG. 10 is further for instances where the domain-identifying information includes operating data from the relationship instances of the primary entity with those of the secondary entities that are associated with the domain. As such, the computer system 195 is further capable to check for accuracy the older resource 479-1 of the discovered previously delivered certain data report 149A. In embodiments, it offers to do so, by the user 192 checking a box in the UI 1000 as shown. An example is now described for implementing such embodiments.

Figure 11:
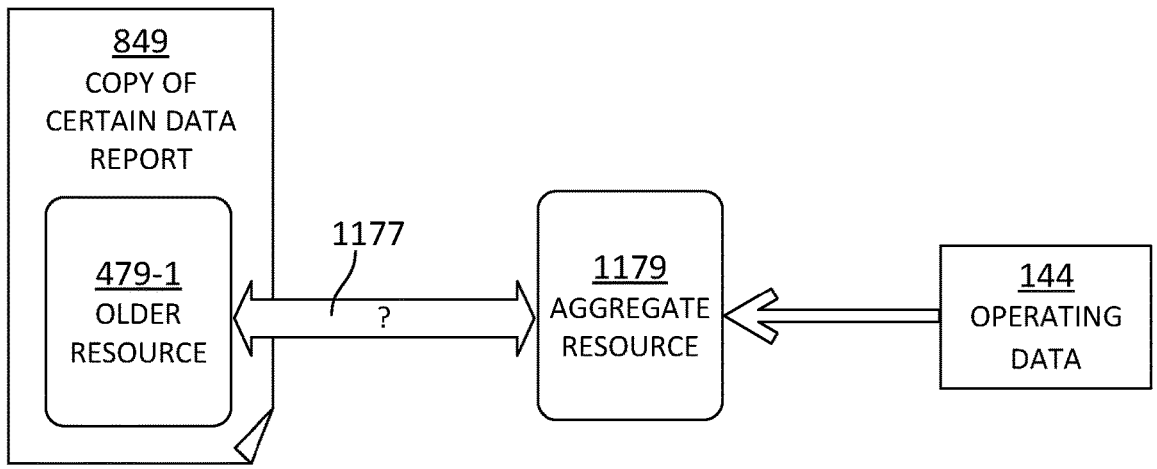
FIG. 11 is a diagram of a sample aspects of embodiments, where a previously determined resource is checked for accuracy.

FIG. 11 is a diagram of a sample aspects of embodiments. In the event that the checking of FIG. 10 is requested, the computer system 195 may be further designed or programmed to parse, from the copy 949 of the certain data report, an older resource such as the older resource 479-1. Moreover, it may input the operating data 144. For instance, it may receive, from a remote device via a communications network, the operating data 144.

The computer system 195 may be further designed or programmed to produce an aggregate resource 1179 from the operating data 144, and in particular from the operating data 144 from those of the relationship instances of the primary entity that are with those of the secondary entities that are associated with the domain. Details of how the aggregate resource 1179 may be produced are provided later in this document.

The computer system 195 may be further designed or programmed to make a comparison 1177 of the aggregate resource 1179 and the older resource 479-1. The comparison 1177 is further indicated with a question mark. The comparison 1177 may reveal a match or a lack of match of the compared quantities. The OSP 198 may treat a lack of match as a discovered inaccuracy. Of course, before thus pronouncing someone else's result to be erroneous, the OSP 198 may have taken very substantial measures to assure their own accuracy. Sometimes the OSP 198 may even offer to pay for their own inaccuracies.

Moreover, the computer system 195 may be further designed or programmed to cause, responsive to the comparison 1177 indicating a lack of match, a notice of inaccuracy to be communicated to an agent of the primary entity. An example of such a notice is now described.

Figure 12:
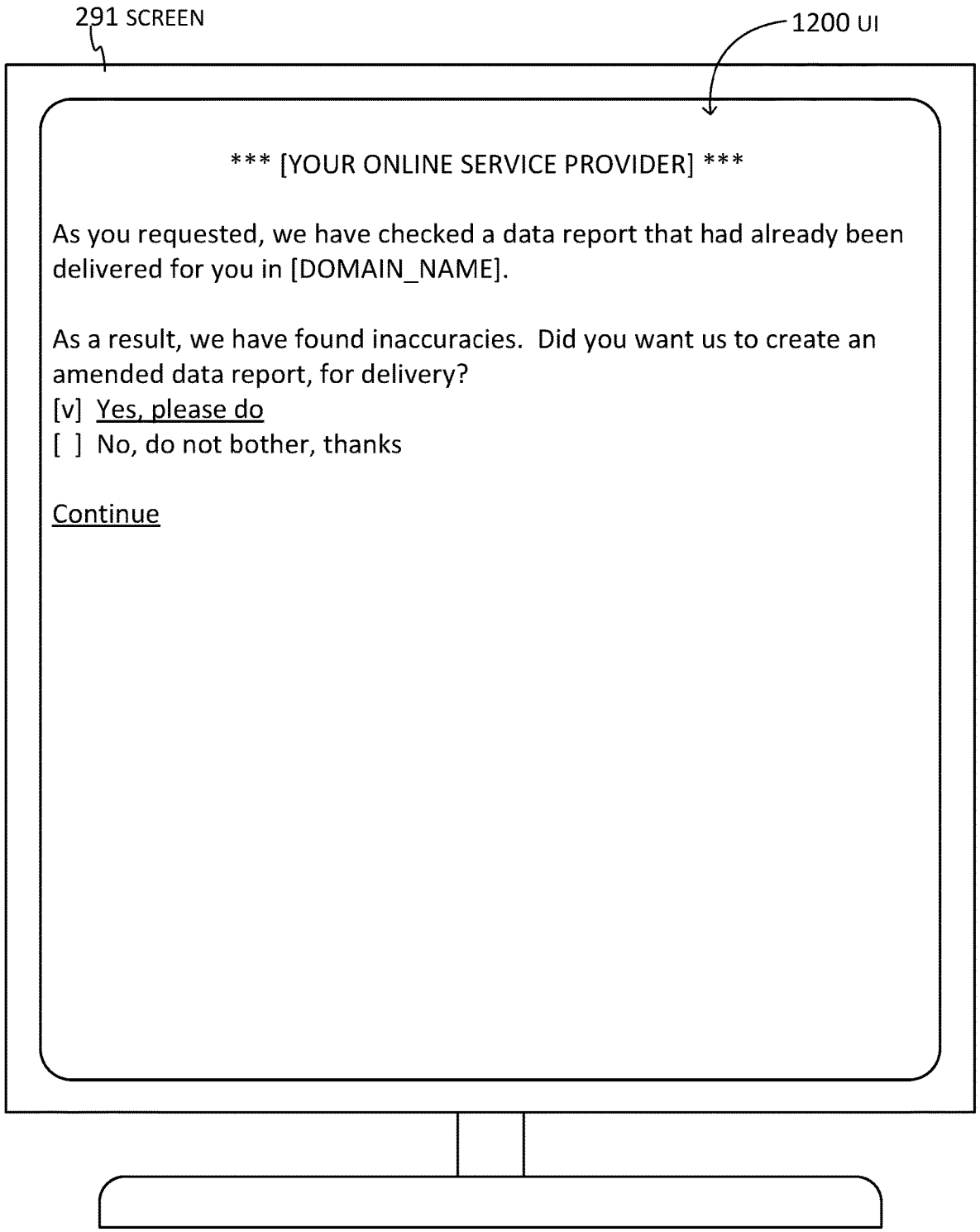
FIG. 12 shows a view of a sample User Interface (UI) according to an embodiment where a notice of inaccuracy is communicated responsive to a comparison of FIG. 11 indicating a lack of match.

FIG. 12 shows a view of the screen 291, with a UI 1200. The UI 1200 reports the inaccuracy of the previous data report that was found by the comparison of FIG. 11. The UI 1200 further offers to produce an amended data report, for delivery.

In other embodiments, a new data report is produced because everything worked fine! In particular, it is possible that no duplicative deliveries have been requested, no certain data report 149A has been found in the cautionary operating for checking for it, and such has been communicated to the computer system 195 via the delivery inquiry result 153. For example, the delivery inquiry result may expressly indicate that a certain data report, such as the certain data report 149A, has not already been delivered to the domain. For instance, this could be the case if the table 777 of FIG. 7 instead indicates one or more of the recent data reports as not already delivered, as expected. Therefore, there would be no collision of data reports by preparing and delivering a new data report at this time, even though settings may still need to be checked for the future. An arrangement is now shown for preparing and delivering such a new report.

Figure 13:
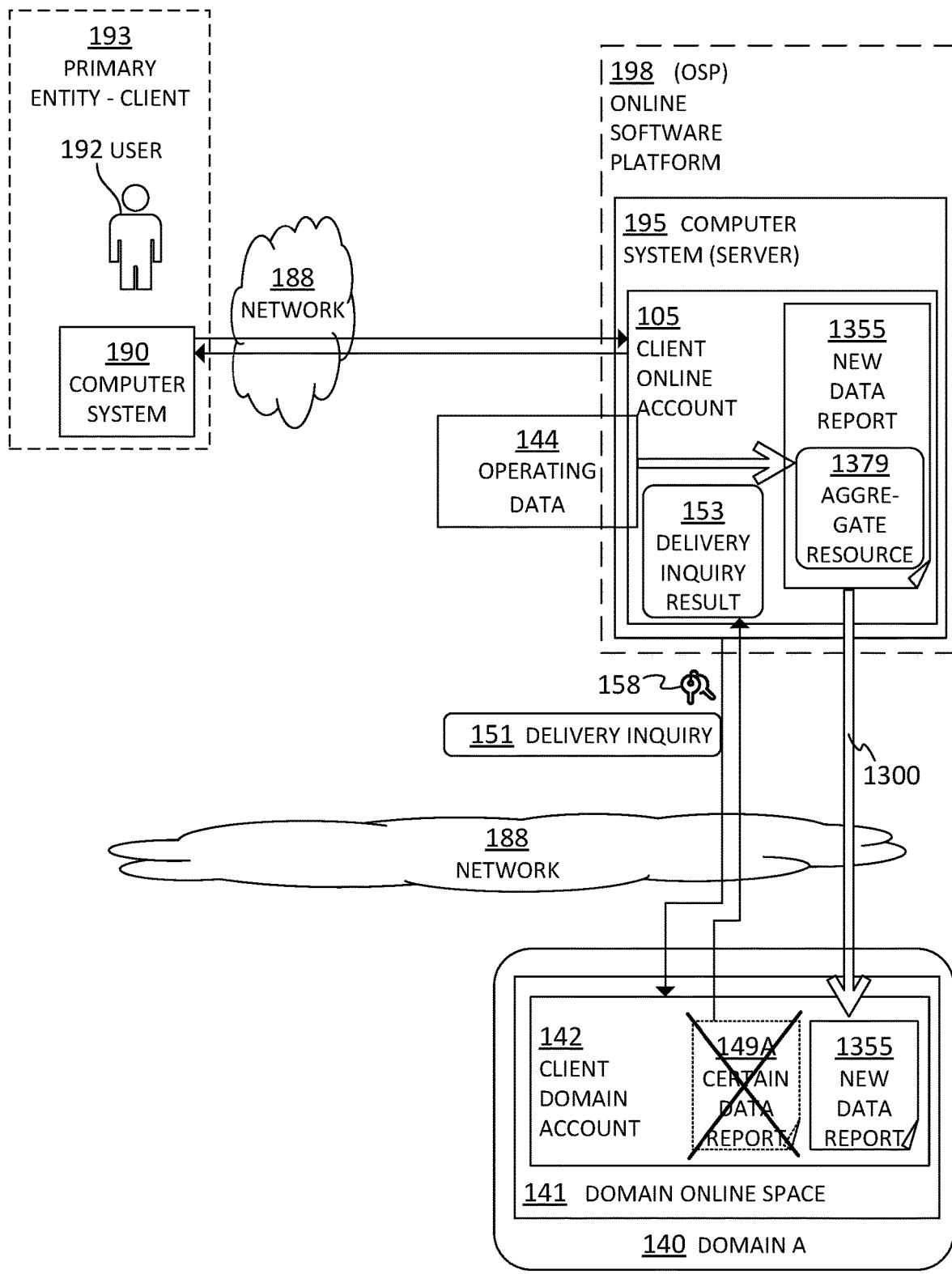
FIG. 13 is a diagram of a sample aspects of embodiments, where a new data report is delivered to a domain online space.

FIG. 13 repeats many elements of FIG. 1. In addition the certain data report 149A that was suspected in FIG. 1, and which was presented in FIG. 1 in dashed lines, is now known to not exist. As such, the certain data report 149A is shown in FIG. 13 both in dotted lines and expressly crossed out. In embodiments, the computer system 195 may be further designed or programmed to cause, responsive to the delivery inquiry result 153 indicating that such a certain data report, namely the certain data report 149A, has not already been delivered to the Domain A 140, a new data report 1355 to be inputted. In the example of FIG. 13, the inputted new data report 1355 is shown within the client online account 105.

In embodiments, the computer system 195 may be further designed or programmed to generate the new data report 1355, for the inputting. In this example, the new data report 1355 includes the aggregate resource 1379. For that, in embodiments, the computer system 195 may be further designed or programmed to produce an aggregate resource 1379 from the operating data 144 of those of the relationship instances of the primary entity that are with those of the secondary entities that are associated with the domain. For that, it may input the operating data 144. Again, for the inputting of the operating data 144, the computer system 195 may receive the operating data 144 from a remote device via a communications network. Examples are described below.

Then the new data report 1355 can be caused to become delivered via the communications network 188 to the domain online space 141 in the context of the client domain account 142. The delivery is according to the delivery arrow 1300, which can be by uploading or other action as described in this document. Prior to that, the customer may have reviewed it manually, approved it, even signed it, and so on. An auto-approval configuration may be offered as a configurable option, in this case, and also where a previous data report is corrected by an amended data report, and so on.

It should be noted that the computer system 195 may be designed or programmed to produce an aggregate resource regardless of whether or not the certain data report 149A is found or not. If it is not found, the aggregate resource 1379 can be used to generate the new data report 1355. And, if it is found, the aggregate resource 1179 can be used for the comparison 1177. And, if the comparison reveals a lack of match, a new data report may be generated anyway.

Embodiments are now described for producing an aggregate resource. As can be seen in FIG. 4, in some embodiments the operating data 144, 444 include individual datasets 435. In such embodiments, the computer system 195 may be further designed or programmed to produce individual resources from the individual datasets 435. In such embodiments, the aggregate resource 1179, 1379 is produced from the individual resources. Notably, these individual resources could be different from the individual resources 478, and the aggregate resource 1379 could be different from the older resource 479-1, as seen by the comparison of FIG. 11. The differences could be because the individual datasets 435 may have been processed by an entity other than the OSP 198, using different digital rules and/or parameter values. Plus, the OSP 198 may have advanced capabilities.

Figure 14:
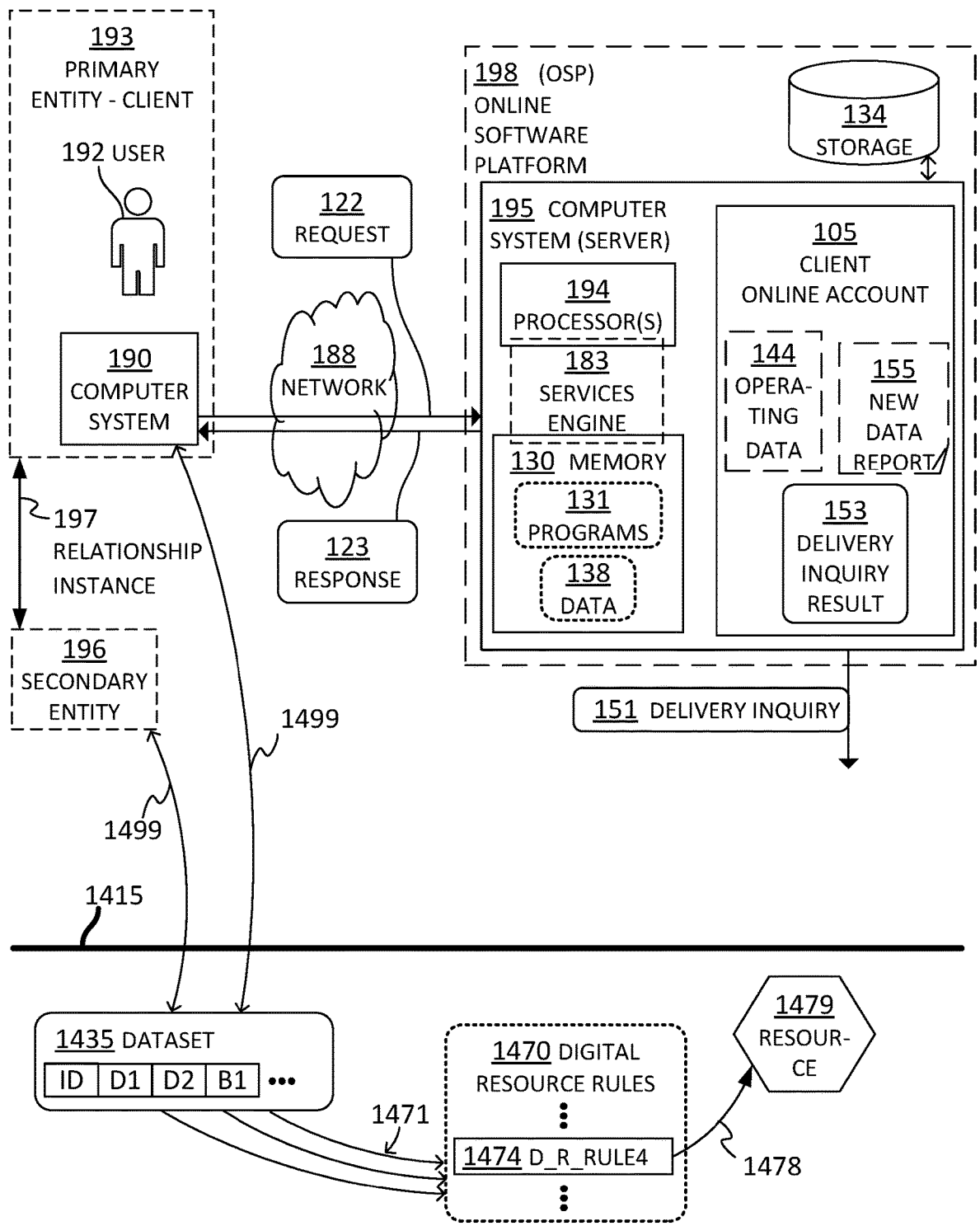
FIG. 14 is a diagram showing sample aspects of embodiments for producing resources.

The individual datasets 435 have dataset parameters. A certain one of the individual datasets has dataset parameters, and at least some of the dataset parameters having respective dataset values. For producing the aggregate resource 1179, 1379, these can be processed as described now:

FIG. 14 is a diagram showing sample aspects of embodiments. A thick horizontal line 1415 separates this diagram, although not completely or rigorously. Everything above the line 1415 has been described already. Below the line 1415 are shown elements with emphasis mostly on processing of data that takes place to produce individual resources, from which aggregate resources can be produced.

In some instances, the user 192 and/or the primary entity 193 obtain data about one or more secondary entities, for example as necessary for conducting the relationship instances with them. The obtained data can be about attributes of the entities, or of the relationship instances themselves.

In embodiments, the computer system 195 receives one or more datasets, in a number of ways. In some embodiments, one or more requests may be received by the computer system 195 via a network. In this example, a request 122 is received by the computer system 195 via the communications network 188. The request 122 has been transmitted by the remote computer system 190. The received one or more requests, as well as responses, can carry payloads. The payload is the part of the data transmitted over the network 188 that is the actual intended message, the content for the recipient device to receive and consume. For actually effectuating the transmission of the payload to the destination, the requests and the responses can also have additional control data, such as headers and metadata. In such embodiments, the one or more payloads may be parsed by the computer system 195 to extract the dataset. Additional computers may be involved with the communications network 188, some beyond the control of the user 192 or of the OSP 198, and some within such control.

A sample received dataset 1435 is shown below the line 1415. The dataset 1435 is an example of one or more of the individual datasets 435. In embodiments, the dataset 1435 has parameters that can also be called dataset parameters. At least some of the dataset parameters have respective values that can also be called dataset values. The dataset values can be numerical, alphanumeric, Boolean, and so on, as needed for what the parameters characterize. For example, the value of an identity parameter ID may indicate an identity of the dataset 1435, so as to differentiate it from other such datasets. At least one of the dataset values may characterize an attribute of a certain one of the entities 193 and 196, as indicated by correspondence arrows 1499. For instance, a parameter D1 may have the value of a name of the certain entity, a parameter D2 may have a value of relevant data of the entity, and so on. Plus, an optional dataset parameter B1 may have a numerical base value. The base value B1 can be for an aspect of the dataset, and so on. The aspect of the dataset may be the aspect of a value that characterizes the attribute, an aspect of the reason that the dataset was created in the first place, an aspect of the relationship instance 197, and so on. The dataset 1435 may further have additional dataset parameters, as indicated by the horizontal dot-dot-dot in the right side of the dataset 1435. In embodiments, the dataset values characterize attributes of both the primary entity 193 and the secondary entity 196, but that is not required.

In embodiments, the computer system 195 may identify, responsive to the characterized attribute, a domain for the dataset, as the dataset is part of the domain-identifying information. This identifying may be performed by one or more associations of the characterized attribute with domains, properties of domains, lists of what domains include, and so on. Some times the characterized attribute may even be the name of a domain, such as a component of a mailing address. The identified domain may be associated with the certain entity, which can be the primary entity 193 or the secondary entity 196.

In embodiments, digital resource rules 1470 are provided for use by the OSP 198. In the example of this diagram, only one sample digital resource rule is shown explicitly, namely rule D_R_RULE4 1474, while other such rules are indicated by the vertical dot-dot-dots. These rules 1470 are digital in that they are implemented for use by software. For example, these rules 1470 may be implemented within the programs 131 and/or the data 138. The data portion of these rules 1470 may alternately be stored in memories, local or in other places that can be accessed by the computer system 195, such as the storage 134. The storing can be in the form of a spreadsheet, a database, etc. One or more digital rules may be provided for a domain. Different sets of rules may be provided for different domains.

In embodiments, the computer system 195 may access the stored digital resource rules 1470 of the domain that was identified. This accessing may be performed responsive to the computer system 195 receiving one or more datasets, such as the dataset 1435.

Then the computer system 195 may select a certain one of the accessed digital resource rules 1470. In this example, the rule D_R_RULE4 1474 is thus selected as the certain digital resource rule. The computer system 195 may thus select the certain rule D_R_RULE4 1474 responsive to one or more of the dataset values of the dataset parameters of the dataset 1435, as per the arrows 1471. The selection of this particular rule is indicated also by the fact that an arrow 1478 begins from that rule. The selected rule may be associated with the identified domain. In fact, the whole set of these rules 1470 may be associated with the identified domain, while other sets (not shown) may be associated with different domains.

Then the computer system 195 may produce a resource for the dataset 1435, such as the resource 1479. The computer system 195 may thus produce the resource by applying the certain digital resource rule, which was previously selected, responsive to at least one of the dataset values of the dataset parameters of the dataset 1435. In the example of FIG. 14, the resource 1479 is produced for the dataset 1435 by the computer system 195 applying the certain digital resource rule D_R_RULE4 1474, as indicated by the arrow 1478. The impact of the dataset 1435 in producing the resource 1479 is indicated by at least one of the arrows 1471. The produced resource can be a document, a determination, a computational result, etc., made, created or prepared for the user 192, and/or the primary entity 193, and/or the secondary entity 196, etc. As such, in some embodiments, the resource is produced by processing and/or a computation. In some embodiments, therefore, the resource is produced on the basis of a characterized attribute of the primary entity 193 and/or the secondary entity 196.

The resource may be produced in a number of ways. For instance, at least one of the dataset values can be a numerical base value, e.g. B1, as mentioned above. In such cases, applying the certain digital resource rule may include performing a mathematical operation on the base value B1. For example, applying the certain digital resource rule may include multiplying the numerical base value B1 with a number indicated by the certain digital resource rule. Examples of small such numbers include 0.015, 0.03, 0.05, and so on, but the numbers need not be small or only positive. Such a number can be indicated directly by the certain rule, or be stored in a place indicated by the certain rule, or by the dataset 1435, and so on.

In some embodiments two or more digital main rules may be applied to produce the resource. For example, the computer system 195 may select, responsive to one or more of the dataset values, another one of the accessed digital resource rules 1470. These one or more dataset values can be the same as, or different than, the one or more dataset values responsive to which the first selected rule was selected. In such embodiments, the resource can be produced by the computer system 195 also applying the other selected digital resource rule to at least one of the dataset values. For instance, where the base value B1 is used, applying the first selected rule may include multiplying the numerical base value B1 with a first number indicated by the first selected rule, so as to compute a first product. In addition, applying the second selected rule may include multiplying the numerical base value B1 with a second number indicated by the second selected rule, so as to compute a second product. And, a value of the resource may be produced by summing the first product and the second product. And, as mentioned above, an aggregate resource may be produced from such individual resources.

The digital resource rules 1470 include the rule D_R_RULE4 1474 that is eventually selected and applied. In some embodiments, the rules 1470 are implemented by simple rules. As a result of an initial search, then, the digital resource rule D_R_RULE4 1474 is selected, and then its consequent is applied to produce the resource.

In some embodiments, the rules 1470 further include additional digital resource rules that select that digital resource rule D_R_RULE4 1474 in the first place, for ultimately applying it. In such embodiments, the rules 1470 can be implemented as simple rules or as complex rules. Complex rules may have more than one conditions, and/or more than one consequents. Complex rules may be implemented as individual single rules with complex coding. Alternatively, a complex rule may be implemented in part by more than one simpler individual rules, which can have hierarchical relationships among them, e.g. from one rule's application or execution leading to another, and so on. As a result of the initial search, then, rules are found which, when applied, select that certain rule in the first place.

Referring back to FIG. 1, and as mentioned above, when the certain data report 149A is found, the OSP 198 does not know whether it was created by the primary entity 193 and delivered per the delivery arrow 101, or by the partner entity 170 and delivered by the delivery arrow 103. In embodiments, the OSP 198 may explore whether the latter is true. For that, it may ask the primary entity 193 for permission. An example is now described.

Checking the Partner Entity after Checking the Domain

Figure 15A:
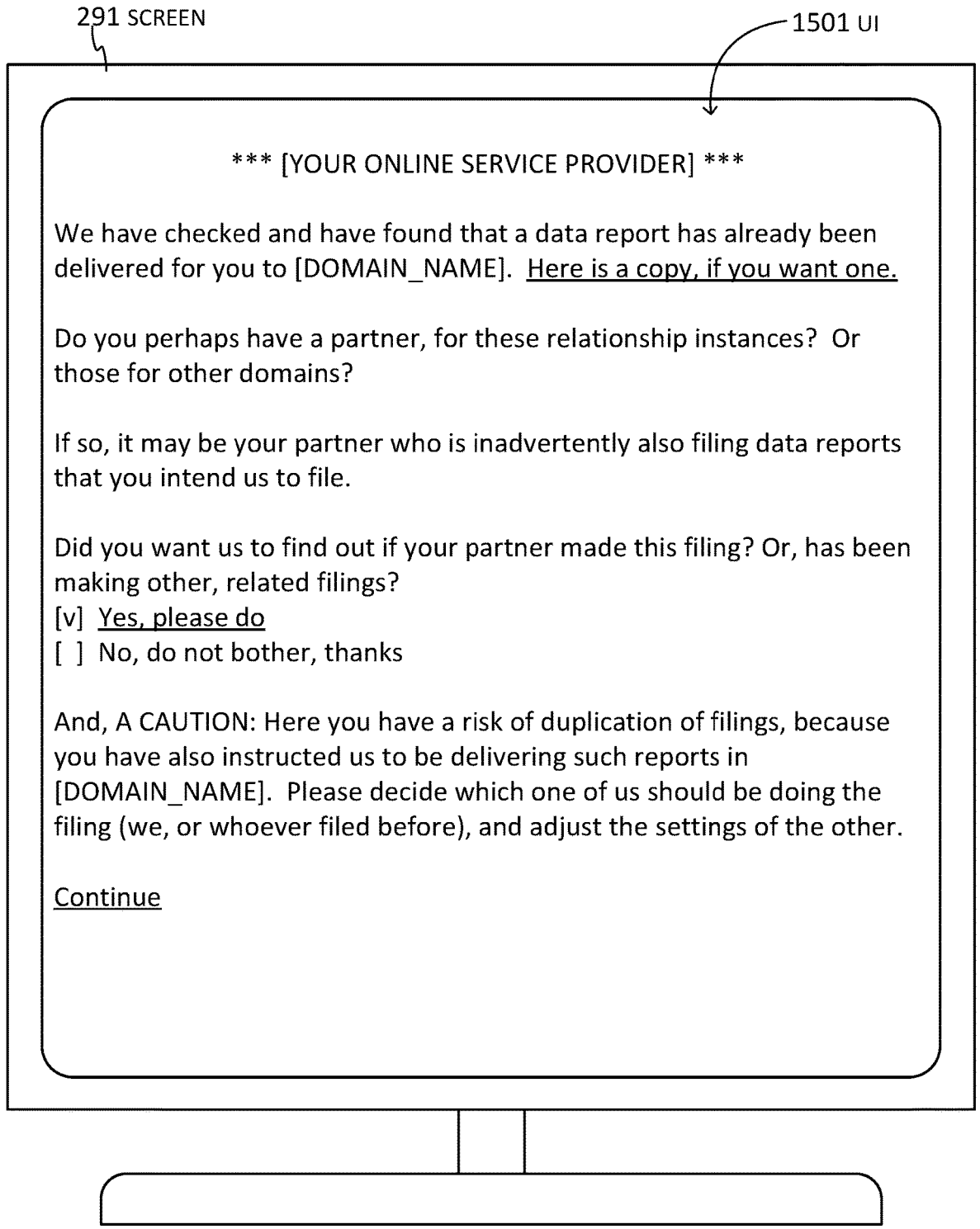
FIG. 15A shows a view of a sample User Interface (UI) according to an embodiment.

FIG. 15A shows the screen 291, with another a sample UI 1501. In embodiments, upon sending the alerting message that the certain data report 149A was found, the computer system 195 also inquires whether the primary entity 193, or the user 192, wants to research whether the certain data report 149A was originated by a partner. In the example of FIG. 15A, the user 192 may check a box if they want that to happen.

Alternately, the UI 1501 may be presented to the user 192 upon on-boarding. Even when it does, however, it is a good idea to present the UI 1501 again upon finding the certain data report 149A, because the partner entities may have changed by then.

FIG. 15B shows the screen 291, with another a sample UI 1502, which may be provided if the user 192 selects the option of the UI 1501. In the example of FIG. 15B, the user 192 provides partner information and partner account credentials before continuing.

FIG. 16 is a diagram that repeats many elements of FIG. 1. However, the certain data report 149A is now known to exist and is therefore shown in solid lines, just like with FIG. 9. Being a partner to the primary entity 193, the partner entity 170 has previously exchanged data with the primary entity 193.

Thanks to the UI 1502, the OSP 198 has learned about the partner entity 170. The OSP 198 wants to explore whether a partner data report 149B has been created on behalf of the primary entity 193 by the partner entity 170. The OSP 198 may infer that, If such has been created, it may be the one that is already delivered, or intended to be delivered, per an arrow 1603.

In embodiments, the partner entity 170 has a partner online space 1671 in an OSP, which could be different or the same as the OSP 198. The primary entity 193 has a client partner account 1672 in the partner online space 1671. The partner data report 149B will be searched for in the client partner account 1672. Together with it, there may be a record 1617B of resource transfers.

For this exploring, in embodiments the computer system 195 may be further designed or programmed to input partner information about the partner entity 170. The partner information may include partner account credentials 1658 for the client partner account 1672, as was done with the latter columns of the UI 1502.

In embodiments, the computer system 195 may be further designed or programmed to access, via the communications network 188, the client partner account 1672 in the partner online space 1671. Such access can be by using the partner account credentials 1658, which are depicted as keys.

In embodiments, the computer system 195 may be further designed or programmed to cause a partner inquiry 1654 to be transmitted to the partner online space 1671 in a context of the client partner account 1672.

The partner inquiry 1654 may inquire as to whether or not a partner data report has been created on behalf of the primary entity 193, regardless of domain. A general inference may be drawn that, if such a partner data report has been created, it would be for the purpose of delivering it to any of a set of domains, which could result in duplication of deliveries. Of that set, only the domain 140 is shown in FIG. 16.

In some embodiments, the partner inquiry 1654 inquires as to whether or not a partner data report has been created on behalf of the primary entity 193, the partner data report relating to the relationship instances of the primary entity 193 with those of the secondary entities that are associated with the identified Domain A 140. A more specific inference may be drawn that, if such a partner data report has been created, it would be for the purpose of delivering it specifically to the Domain A 140, and therefore such a partner data report would be the partner data report 149B. Again, such would be due to duplicate instruction for such deliveries, and would specifically result in duplication when the new data report 1355 would be delivered, as requested, per the delivery arrow 1300.

In conjunction with the partner inquiry 1654, or later, the computer system 195 may further cause a resource inquiry 1652 to be also communicated, for identifying the record 1617B.

In embodiments, the computer system 195 may be further designed or programmed to input, responsive to the transmitted partner inquiry 1654, a partner inquiry result 1657. Again, the partner inquiry result 1657 is shown by an arrow as received from the partner online space 1671, and in particular from the partner data report 149B itself, as can be sometimes the case. That, however, is not always the case, similarly the delivery inquiry result 153. Moreover, the partner inquiry result 1657 is shown as being within the client partner account 1672, although that is not necessary.

In some embodiments, the computer system 195 may be further designed or programmed to determine whether an aspect of the partner inquiry result 1657 indicates that the partner data report has or has not been created.

In embodiments, the computer system 195 may be further designed or programmed to cause, responsive to the aspect of the partner inquiry result 1657 indicating that the partner data report has been created, a partner report message to be communicated to an agent of the primary entity 193, such as the user 192. The partner report message may report on the partner inquiry result 1657.

In embodiments, the partner inquiry result 1657, or the aspect of it, provides the answer to what is inquired by the partner inquiry 1654, namely whether or not a partner data report 149B has already been created on behalf of the primary entity 193. In other embodiments, it does not provide the answer. Examples of both are now described.

FIG. 17 depicts a possible partner inquiry result 1757, which includes a failure 1713. The failure 1713 could be the aspect of the partner inquiry result 1757. The failure 1713 may arise for a number of reasons, similarly with the failure 513. Again, such a failure 1713 by itself does not prove that such a partner data report 149B has not been created.

In some instances, the partner inquiry result expressly indicates that the certain data report has been created. Two examples are now described.

FIG. 18 depicts a possible partner inquiry result 1857, which includes an aspect 1877. The partner inquiry result 1857, or the aspect 1877, expressly indicates that such a partner data report has been created. The indication is provided expressly as information. In embodiments, the aspect of the partner inquiry result expressly indicates that the partner data report has not been created, which can be implemented similarly with what is shown in FIG. 18.

FIG. 19 depicts a possible partner inquiry result 1957, which includes an aspect. The aspect is a table 1977 that has columns. The first column is a listing of links 1949, 1962, 1963. These links show assigned names of the partner reports to which the links lead to. In this example, the link 1949 could lead to the partner data report 149B.

In this example, the second column for the table 1977 is for the time period these reports are for. Such time periods can be seen in FIG. 4. The third column is for whether or not the report has been signed. The fourth column is for whether or not the report has been delivered to the domain. In the example of FIG. 19, no column indicates whether or not any associated resources have been delivered to the domain. With proper programming, the computer system 195 may be able to parse the table 1977.

In embodiments, the partner data report is explored for by its expected filename. An example is now described.

Figure 20:
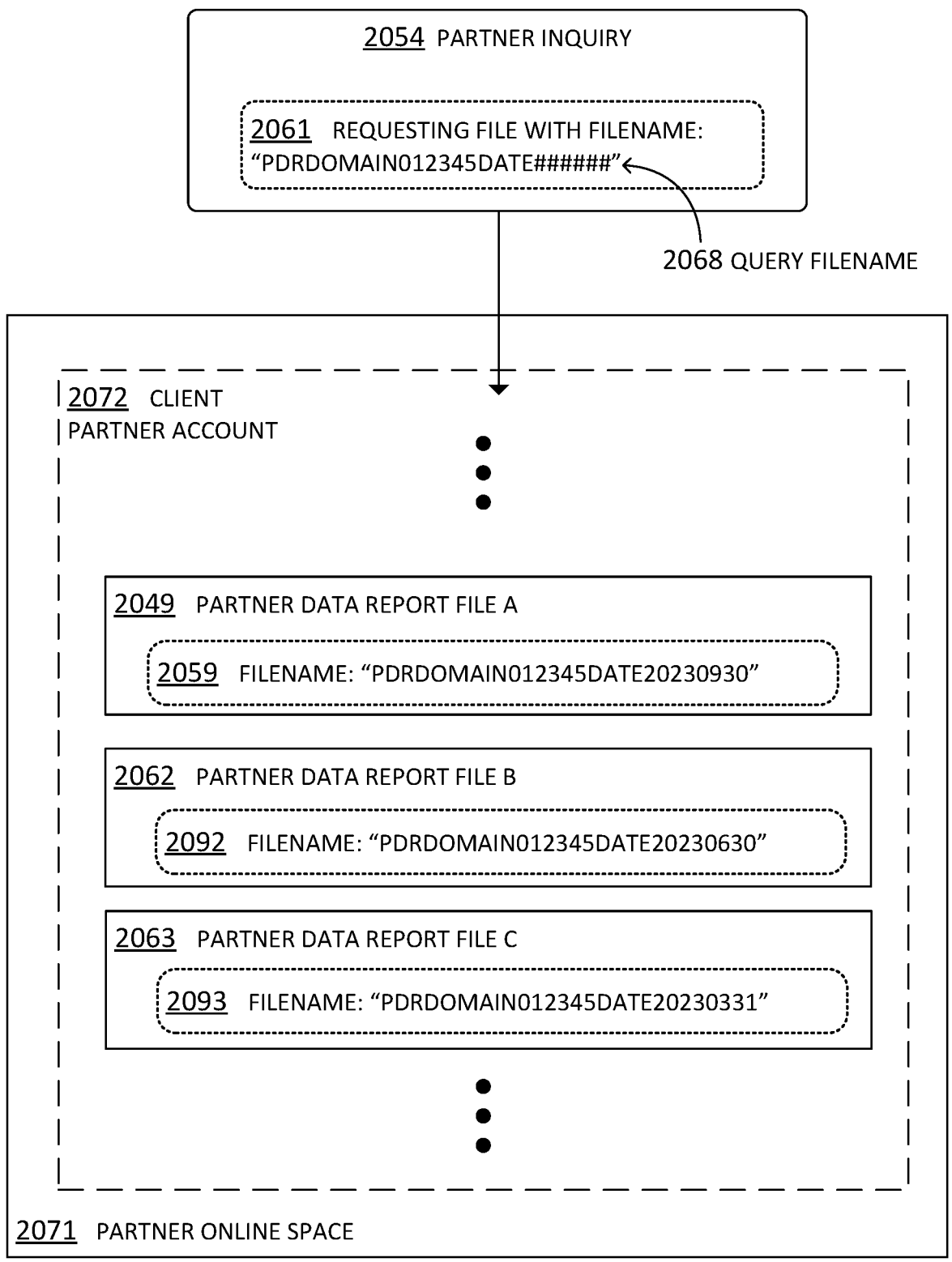
FIG. 20 is a diagram showing sample embodiments where a partner inquiry requests a certain partner data report by its expected filename.

FIG. 20 shows a partner inquiry 2054 and partner data reports . . . , 2049, 2062, 2063, . . . The partner data reports 2049, 2062, 2063 are stored in a sample partner online space 2071 in the context of a sample client partner account 2072 as partner data report files. As such, these partner data reports may be stored in the client partner account 2072, or be indexable from it, and so on.

The three shown partner data report files have respective filenames 2059, 2092, 2093, which can be read from the diagram. In some embodiments, these filenames are set according to a convention, so that it is easier for the partner inquiry 1654, 2054 to inquire about them. The convention in this example is analogous to what was described in FIG. 8.

In the example of FIG. 20, the partner inquiry 2054 includes a feature 2061. The feature 2061 requests the partner data report by a query filename 2068, with a format similar to the query filename 868. The query filename 2068, which can be read on FIG. 20, can be such that it invokes the certain filename.

In embodiments, the query filename 2068 can be looked up from filenames known to be used by the partner entity 170 in the partner online space 1671. This looking up can take place from an advance mapping exercise, preparing look up tables for use, and so on.

In some embodiments, the partner inquiry result 1657 includes a listing of filenames of documents that are candidates to be the partner data report 149B. Then the aforementioned aspect of the partner inquiry result 1657 can be a filename of one of the documents, for instance if it matches the expected filename of the partner data report 149B. Such matching can be explored by specific criteria, by Artificial Intelligence (AI), and so on.

All of what was mentioned above for exploring for the partner data report 149B can apply also for the record 1617B of resource transfers.

In embodiments, such as those of FIG. 18, or FIG. 19, or FIG. 20, the partner data report 149B has been found. This creates the risk of duplicative delivery instructions, as per the above.

If the partner data report 149B has been found, more can be implemented. For instance, in embodiments, the computer system 195 may be further designed or programmed to receive a copy of the partner data report 149B, and even place the received copy of the partner data report into the client online account 105. Receiving can be responsive to the aspect of the partner inquiry result 1657 indicating that the partner data report 149B has already been created, and so on.

In some embodiments, it is clear that a document that is found is indeed the partner data report 149B, and that is reflected in the partner report message. In other embodiments, that is not so clear, and validation is performed according to embodiments, prior to transmitting the partner report message.

As mentioned above, in some instances documents are found as the partner inquiry result 1657. In embodiments, such found documents are validated first, to confirm that they are actually the inquired-about partner data report 149B, the record 1617B of resource transfers, and other such data reports. Examples are now described.

Figure 21:
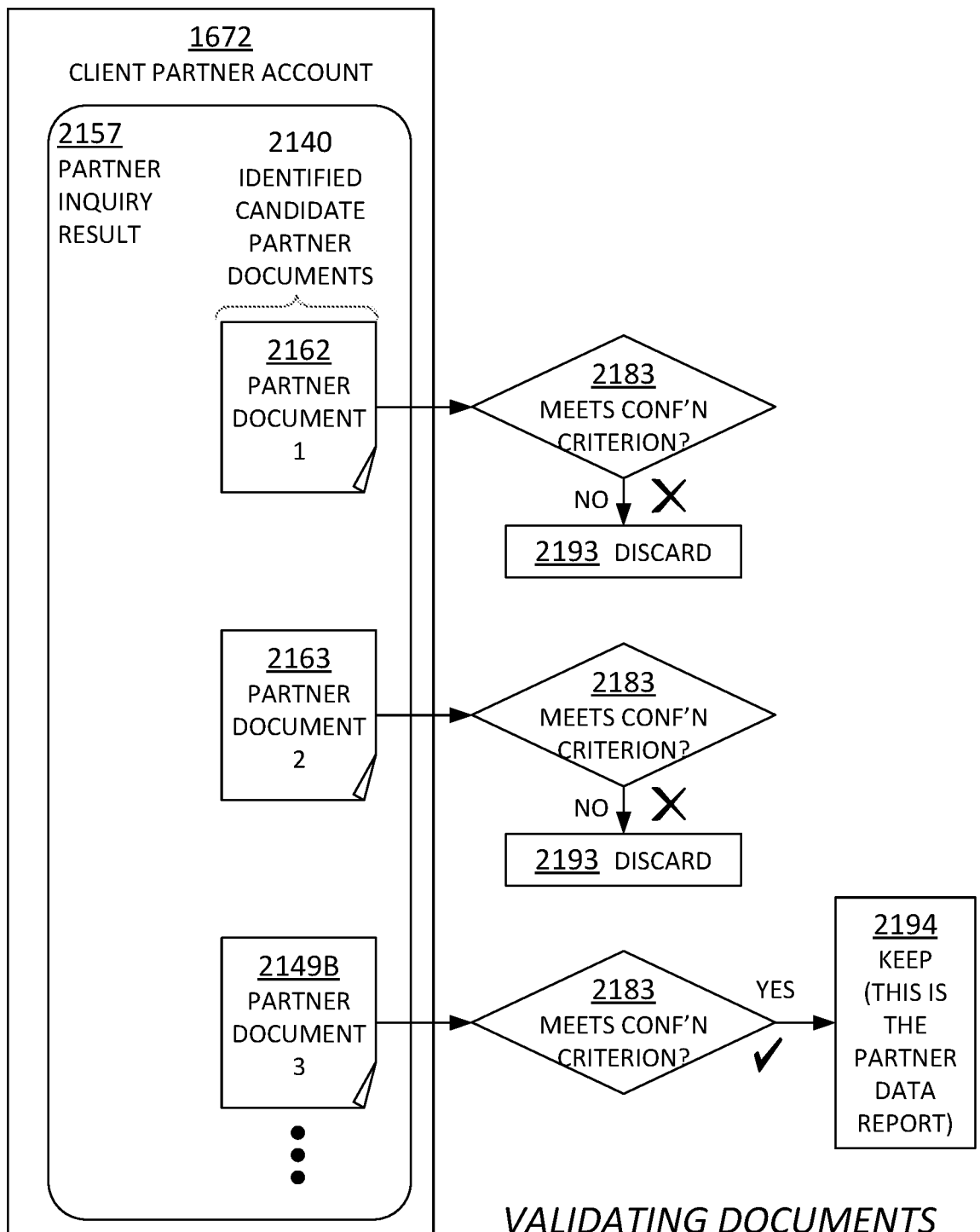
FIG. 21 is a diagram of sample aspects of embodiments where a partner inquiry result has found candidate partner documents, and which are subsequently validated by being tested to confirm whether they are indeed a requested partner data report.

FIG. 21 is a diagram of sample aspects of embodiments where a partner inquiry result finds candidate partner documents, and which are subsequently tested to confirm whether they are indeed a requested partner data report.

In some embodiments, the partner inquiry result 1657 includes an identified candidate partner document. In the example of FIG. 21, a partner inquiry result 2157 includes a set 2140 of identified candidate partner documents 2162, 2163, 2149B, . . . .

In embodiments, the computer system 195 may be further designed or programmed to test to determine whether or not the candidate partner document meets a confirmation criterion. In such embodiments, the partner report message is caused to be communicated responsive to a result of the testing.

In the example of FIG. 21, a testing diamond operation 2183 implements this testing. In particular, the candidate partner document 1 2162 is tested according to a testing diamond operation 2183, and the determination is NO. As such, according to another operation 2193, the candidate partner document 1 2162 is therefore discarded, and not treated as one of the inquired-about reports.

Also, the candidate partner document 2 2163 is tested according to the testing diamond operation 2183 (shown a second time), and the determination is NO. As such, according to the operation 2193 (shown a second time), the candidate partner document 2 2163 is therefore discarded, and not treated as one of the inquired-about reports. Moreover, the candidate partner document 3 2149B is tested according to the testing diamond operation 2183 (shown a third time), and the determination is YES. As such, according to an operation 2194, the candidate partner document 3 2149B is kept, and recognized as the inquired-about partner data report 149B.

Figure 22:
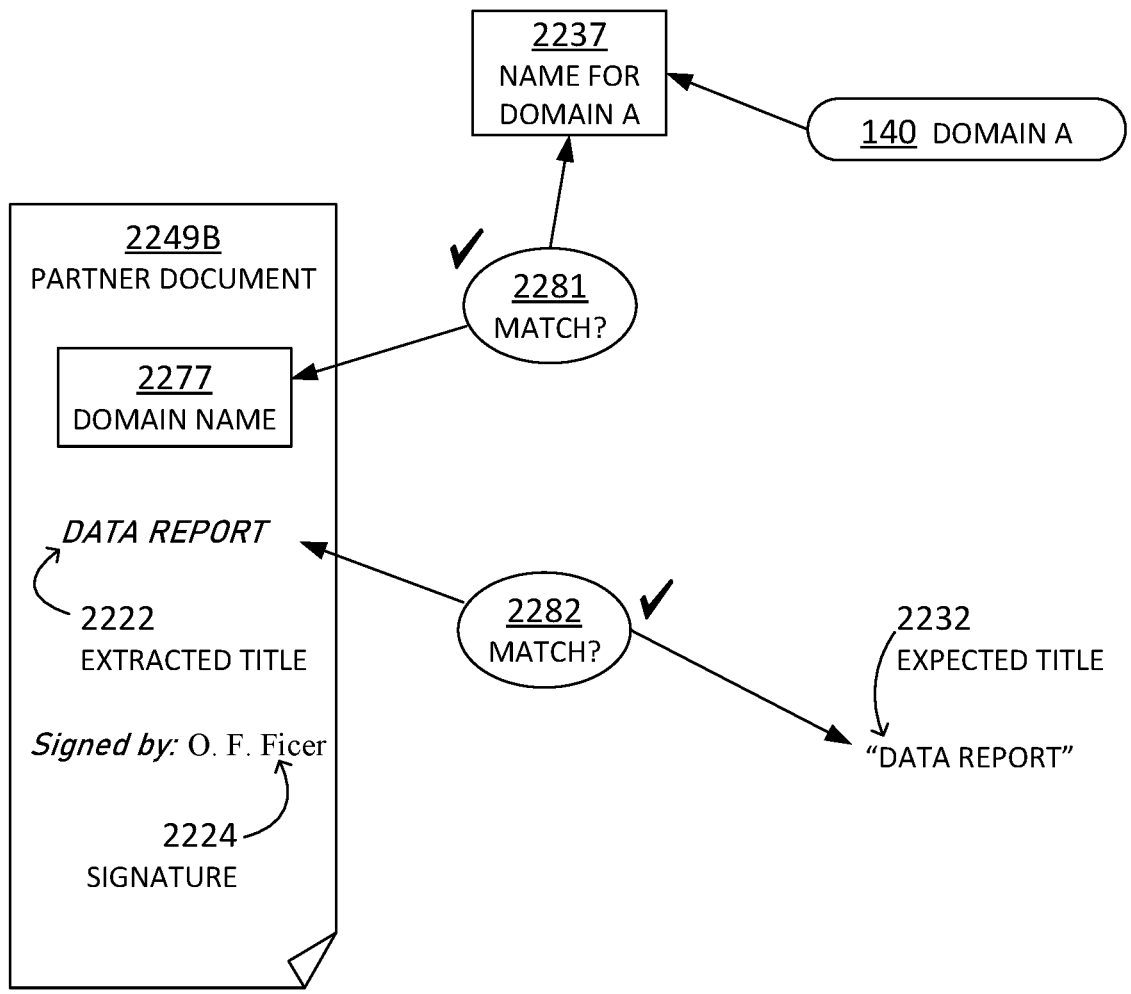
FIG. 22 is a diagram of sample confirmation criteria for of the validation testing indicated in FIG. 21, according to embodiments.

Referring now to FIG. 22, a number of different confirmation criteria can be tested by the testing diamond operation 2183. Examples are now described of at least some criteria, while even more can be used. Any one criterion may be used, or a combination of such criteria, and so on. FIG. 22 shows a sample candidate partner document 2249B, which could be the candidate partner document 3 2149B and the partner data report 149B.

In embodiments, the confirmation criterion can be a domain name. In particular, the computer system 195 may be further designed or programmed to input a name for the identified domain. It should be kept in mind that something, such as a domain, is not necessarily the same thing as its name, which is a string of characters. For example, the domain may be identified as shown in FIG. 20, while its proper name can be different. In the example of FIG. 22, a name 2237 for the Domain A 140 is inputted.

In such embodiments, the testing may include parsing, by the computer system, the candidate partner document so as to extract a domain name. Such may appear typically near the top of the candidate partner document 2249B. In FIG. 22, the testing includes parsing the candidate partner document 2249B so as to extract a domain name 2277. And, the confirmation criterion can be whether or not the extracted domain name is the inputted name for the identified domain. In FIG. 22, a confirmation criterion 2281 is whether or not the extracted domain name 2277 is the inputted name 2237.

In embodiments, the confirmation criterion can be a title of a document. In particular, the computer system 195 may be further designed or programmed to input an expected title of the partner data report. In FIG. 22, an expected title 2232 is input. In the example of FIG. 22, the expected title 2232 is "DATA REPORT". Again, a document is not the same thing as its title, which is a string of characters.

In such embodiments, the testing may include parsing, by the computer system, the candidate partner document so as to extract a title of the candidate partner document. Again, a title may appear typically near the top of the candidate partner document 2249B. In FIG. 22, the testing includes parsing the candidate partner document 2249B so as to extract a title 2222. In this example, the extracted title 2222 is also "DATA REPORT". And, the confirmation criterion can be whether or not the extracted title is the expected title. In FIG. 22, a confirmation criterion 2282 is whether or not the extracted title 2222 is the expected title 2232.

In embodiments, similarly but without showing in FIG. 22, the confirmation criterion can be a date. In particular, the computer system 195 may be further designed or programmed to an expected date of the partner data report. In such embodiments, the testing may include parsing, by the computer system, the candidate partner document so as to extract a date of the candidate partner document. And, the confirmation criterion can be whether or not the extracted date is the expected date, for instance if it is within a certain time range. Examples of such dates, but used in filenames, were shown in FIG. 20.

For the example of FIG. 22, the candidate partner document 2249B can be further parsed to extract a signature 2224. Ideally the name of the signer is also extracted. And that can be also reported to the primary entity 193, as part of the partner report message. An example is now described.

Figure 23:
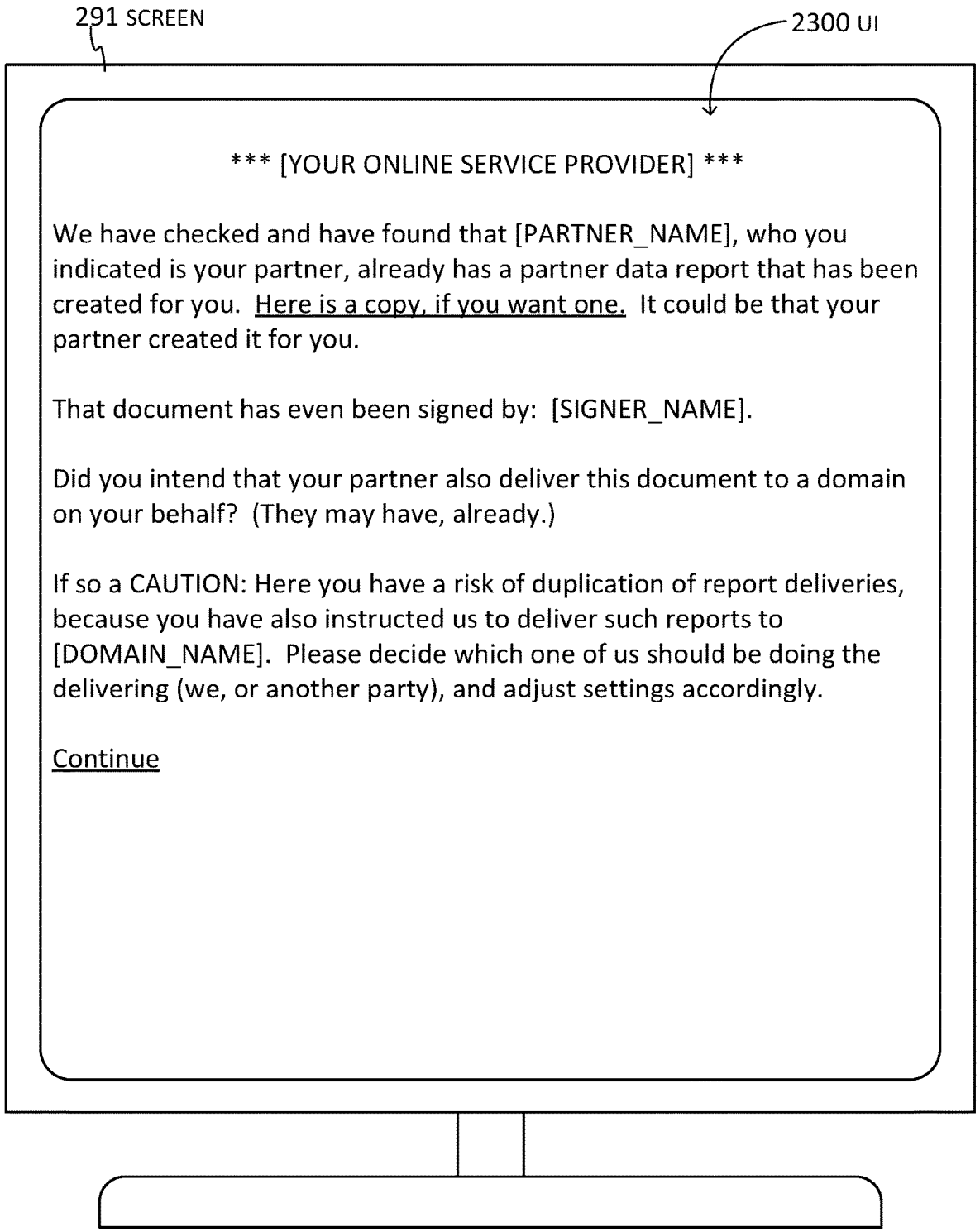
FIG. 23 shows a view of a sample User Interface (UI) according to an embodiment.

FIG. 23 shows the screen 291, and a sample UI 2300 on the screen 291. The UI 2300 reports to the user 192 that a partner data report has been found in the partner entity 170, and in fact indicates who signed that report. This may explain why duplication of instructions has apparently taken place, and therefore duplication of delivery can be avoided better in the future.

Figure 24:
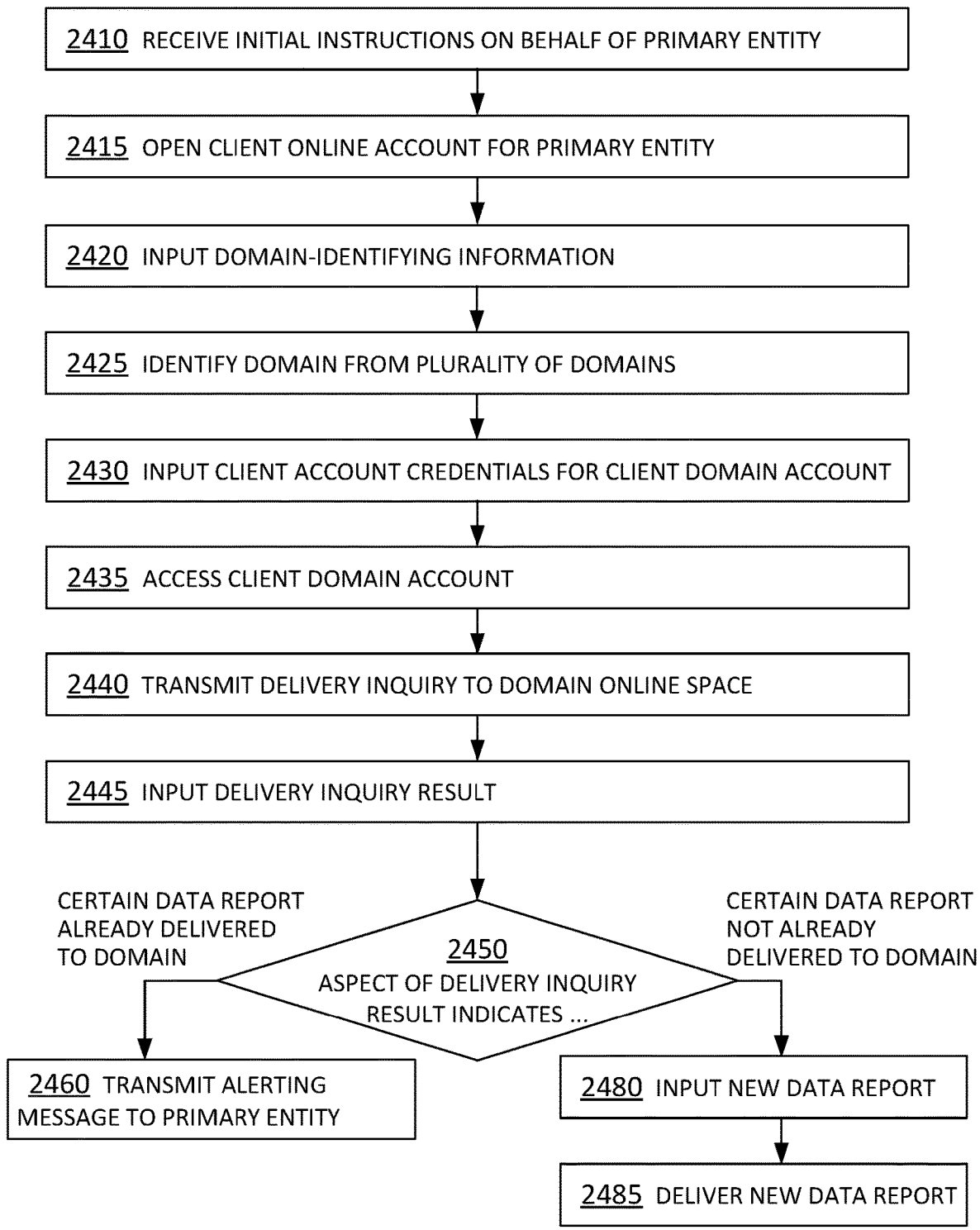
FIG. 24 is a flowchart for illustrating sample methods according to embodiments, which are improvements in automated computerized systems.

FIG. 24 shows a flowchart 2400 for describing methods according to embodiments. According to an operation 2410, initial instructions may be received, by a computer system from a remote device via a communications network. These initial instructions may be on behalf of a primary entity. The computer system may be hosted by an Online Software Platform (OSP).

According to another operation 2415, a client online account may be opened in the OSP for the primary entity by the computer system, responsive to the initial instructions.

According to another operation 2420, domain-identifying information may be inputted by the computer system.

According to another operation 2425, a domain may be identified, from a plurality of domains, by the computer system and from the domain-identifying information. The domain may have a domain online space in an OSP. The primary entity may have a client domain account in the domain online space. The primary entity may have had relationship instances with secondary entities associated with the domain.

According to another operation 2430, client account credentials for the client domain account may be inputted by the computer system.

According to another operation 2435, the client domain account in the domain online space may be accessed by the computer system, using the client account credentials and via a communications network.

According to another operation 2440, a delivery inquiry may be caused by the computer system to be transmitted to the domain online space, in a context of the accessed client domain account. The delivery inquiry may inquire as to whether or not a certain data report has already been delivered to the domain on behalf of the primary entity. The certain data report may relate to the relationship instances of the primary entity with those of the secondary entities that are associated with the domain.

According to another operation 2445, a delivery inquiry result may be inputted by the computer system, responsive to the transmitted delivery inquiry.

According to another operation 2450, it can be determined, by the computer system, whether an aspect of the delivery inquiry result indicates that the certain data report has or has not already been delivered to the domain.

According to another operation 2460, an alerting message can be caused to be transmitted to an agent of the primary entity by the computer system, responsive to the aspect of the delivery inquiry result indicating that the certain data report has already been delivered to the domain. The alerting message may report on the aspect of the delivery inquiry result.

According to another operation 2480, a new data report can be caused to be inputted by the computer system, responsive to the delivery inquiry result indicating that the certain data report has not already been delivered to the domain. According to another operation 2485, the new data report can be caused to become delivered via a communications network to the domain online space in the context of the client domain account.

Returning to FIG. 1, descriptions above regarding the partner entity 170 where focused more on the situation of where the certain data report 149A is found, is thus known to have been delivered by someone other than the requested OSP 198, and the partner entity 170 is then further explored as a possible cause of the delivery. Different embodiments are now described.

Checking the Partner Entity Before Checking the Domain

Figure 25:
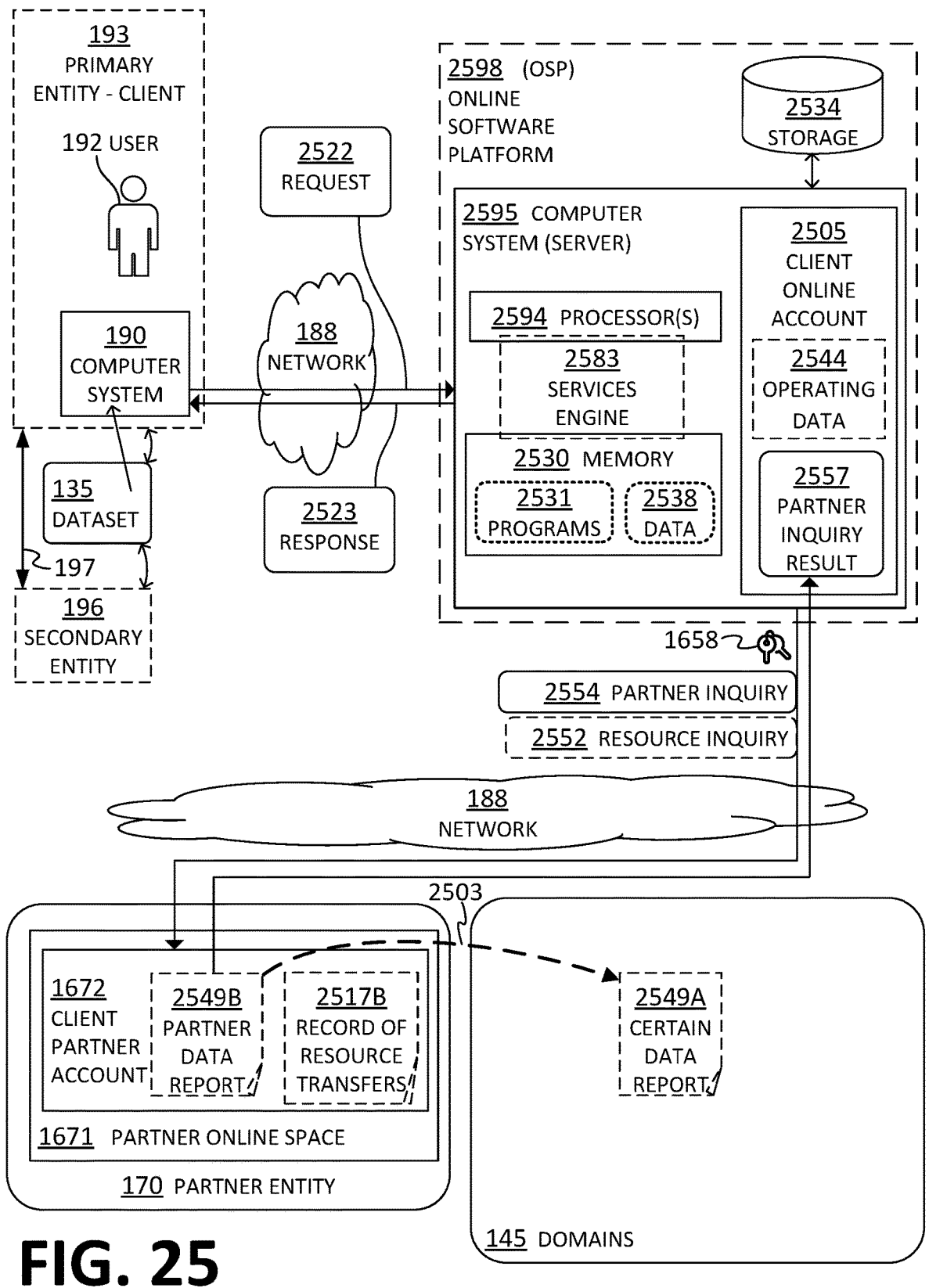
FIG. 25 is a diagram of a sample aspects of embodiments, where a partner inquiry is launched to research whether a partner has originated a partner data report that might also be found as a certain data report in a domain online space in the future.

Referring now to FIG. 25, some of the shown elements are the same or similar to those of FIG. 1 and FIG. 16. In fact, many of the operations of the embodiments of FIG. 25 can be performed as described above. And, it is possible that embodiments in all these drawings may perform even all of the operations described in this document.

In FIG. 25, an OSP 2598 hosts a computer system 2595. The computer system 2595 has one or more processors 2594 and a memory 2530 that together implement a services engine 2583. The memory 2530 stores programs 2531 and data 2538, and so on. The computer system 2595 may cooperate with a database storage 2534. The computer system 2595 may exchange, with the computer system 190, one or more requests 2522 and one or more responses 2523.

In embodiments, the computer system 2595 may be designed or programmed to receive initial instructions on behalf of the primary entity 193, and open a client online account 2505 for the primary entity 193. This may be performed as described above for the operations 2410 and 2415.

The computer system 2595 may input partner information about the partner entity 170, for instance via the one or more requests 2522. The partner information may include the partner account credentials 1658 for the client partner account 1672 in the partner online space 1671 of the partner entity 170.

The computer system 2595 may be further designed or programmed to access, using the partner account credentials 1658 and via the communications network 188, the client partner account 1672.

The computer system 2595 may be further designed or programmed to cause a partner inquiry 2554 to be transmitted to the partner online space 1671 in a context of the client partner account 1672. The partner inquiry 2554 may inquire as to whether or not a partner data report 2549B has been created on behalf of the primary entity 193. This inquiry is the first attempt at guessing whether or not a certain data report 2549A has been delivered to any one of the domains. Such a delivery would have been according to a delivery arrow 2503.

As such, the partner data report 2549B may relate to at least some of the relationship instances, but not necessarily those relating to the Domain A 140. In some embodiments, however, the partner data report 2549B does relate to the relationship instances of the primary entity 193 with those of the secondary entities that are associated with the Domain A 140. In such instances, the computer system 2595 may be further designed or programmed to input domain-identifying information, for instance as in the operation 2420, and to identify, from the domain-identifying information, a domain from a plurality of domains, for instance as in the operation 2425.

In embodiments, the computer system 2595 may be further designed or programmed to input, responsive to the transmitted partner inquiry 2554, a partner inquiry result 2557. The computer system 2595 may further determine whether an aspect of the partner inquiry result 2557 indicates that the partner data report 2549B has or has not been created. In addition, the computer system 2595 may cause, responsive to the aspect of the partner inquiry result 2557 indicating that the partner data report has been created, a partner report message to be transmitted to an agent of the primary entity 193, such as the user 192. The partner report message may report on the aspect of partner inquiry result.

Many things written above may apply similarly to these embodiments. For instance, the aspect of the partner inquiry result may expressly indicate that the partner data report has been created. Or, it may expressly indicate that the partner data report has not been created. It may include a listing which indicates that the partner data report has been created.

Such a partner data report may be discovered by being searched for in the partner online space 1671 in the context of the accessed client partner account 1672. It may be a partner data report file that has a certain filename, and so on, similarly as per what is written above. Or, the partner inquiry result 2557 may include a listing of filenames of documents that are candidates to be the partner data report, and so on per the above.

In embodiments, the computer system 2595 may be further designed or programmed to receive a copy of the partner data report 2549B responsive to the aspect of the partner inquiry result 2557 indicating that the partner data report 2549B has already been created. The computer system 2595 may further place the received copy of the partner data report 2549B into the online account 2505.

And, again, the partner inquiry result may include an identified candidate partner document, and the computer system 2595 may be further designed or programmed to test to determine whether or not the candidate partner document meets a confirmation criterion, and so on with the confirmation criteria.

All of what was written above can be further used to query about any transmitted resources. For instance, a separate resource inquiry 2552 can be transmitted about any record 2517B of any resources transfer.

The operations described with reference to FIG. 25 may even be performed upon on-boarding, automatically. In some instances, the client maybe asked whether they are to happen. An example is now described.

Figure 26:
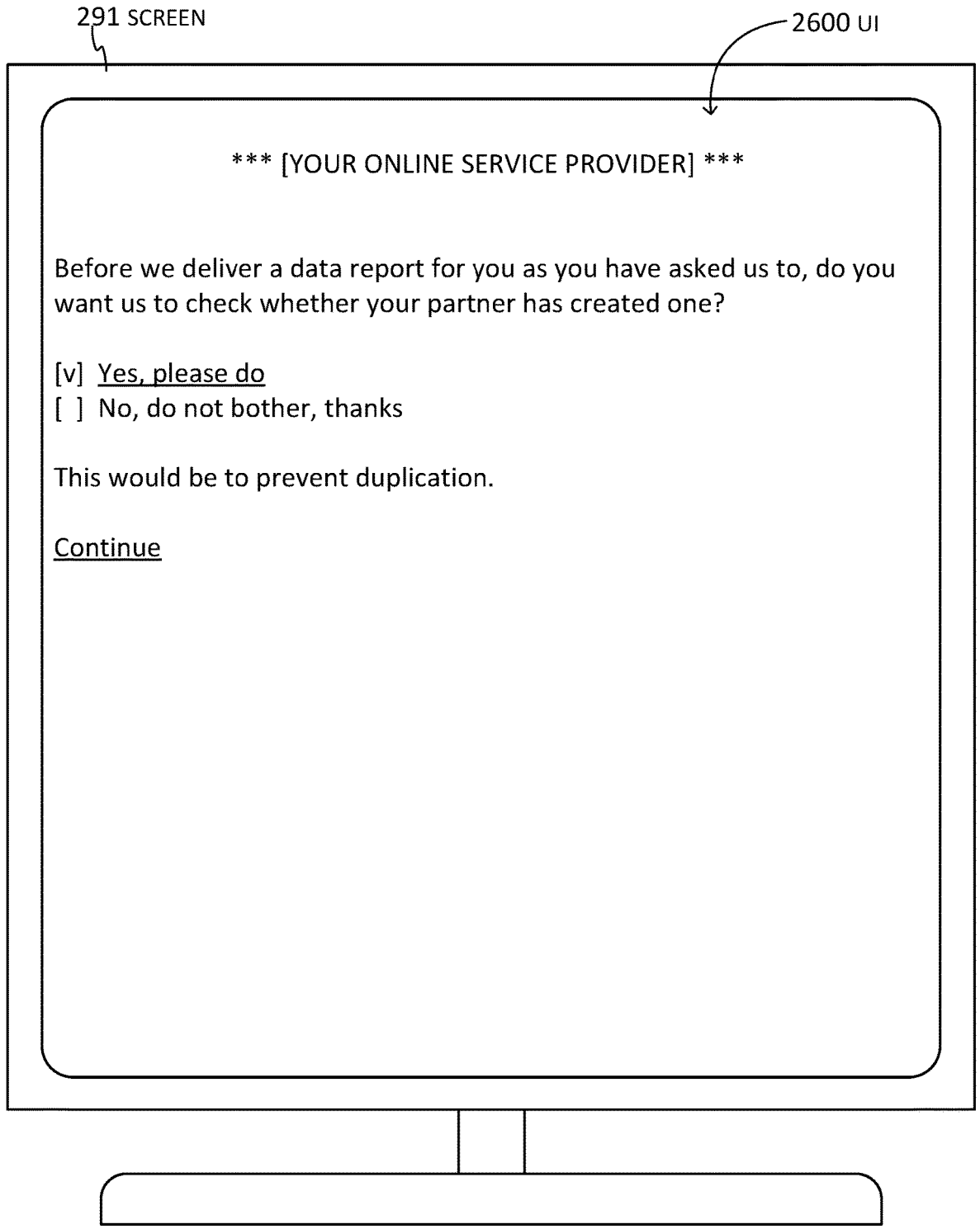
FIG. 26 shows a view of a sample User Interface (UI) according to an embodiment.

FIG. 26 shows the screen 291, with another a sample UI 2600 that implements the asking. The UI 2600 can be implemented in lieu of the UI 300, or after it. In some embodiments, a third party or even the partner entity 170 is the one that provides the data of FIG. 3. In embodiments, if the user 192 has checked yes in the UI 2600, then upon clicking to "Continue", they may be transported to the UI 1502, and so on. Then, the UI 2600 can be extended, and so on.

Figure 27:
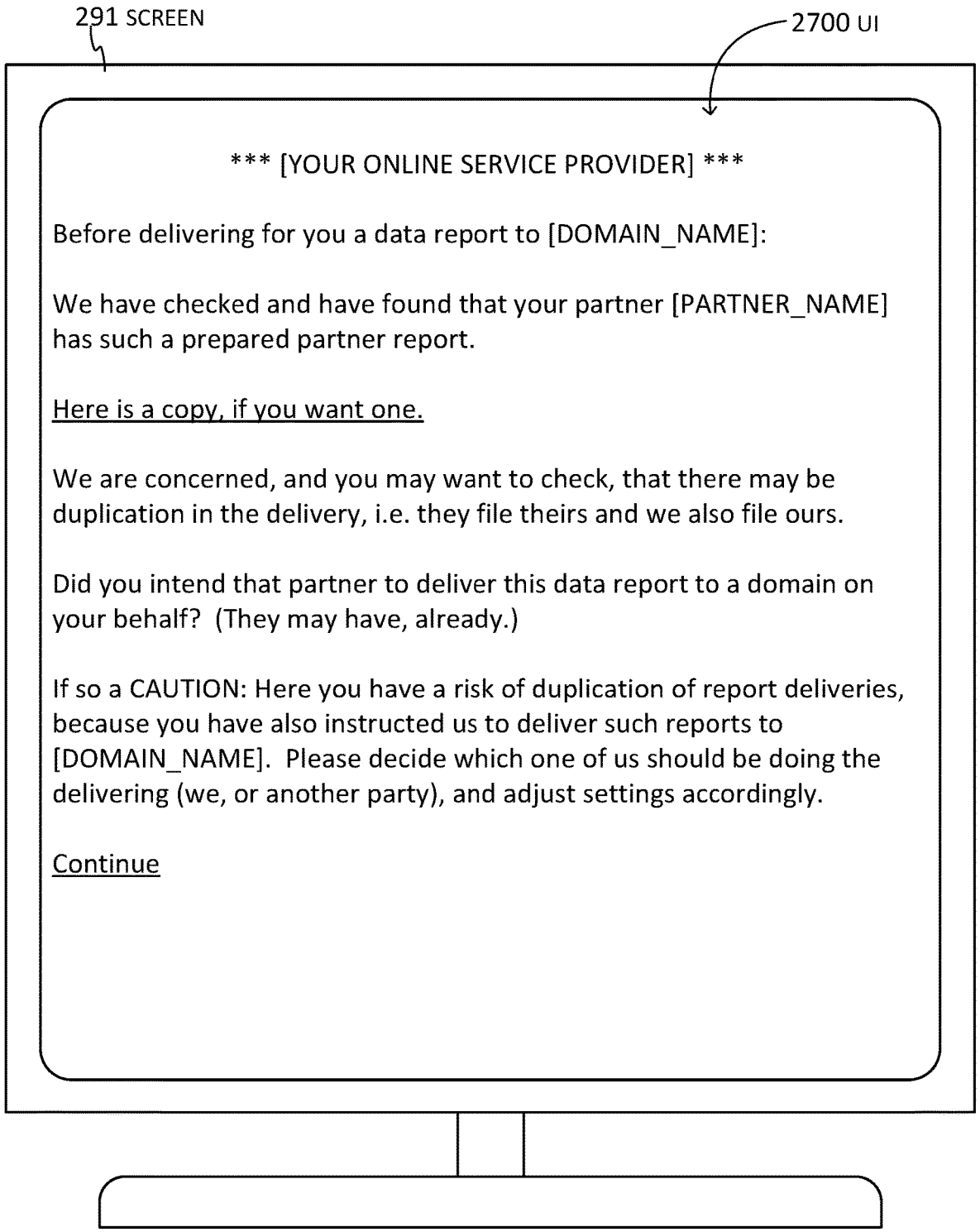
FIG. 27 shows a view of a sample User Interface (UI) according to an embodiment.

FIG. 27 shows the screen 291, with another a UI 2700. The UI 2700 is an example of a partner report message.

Figure 28:
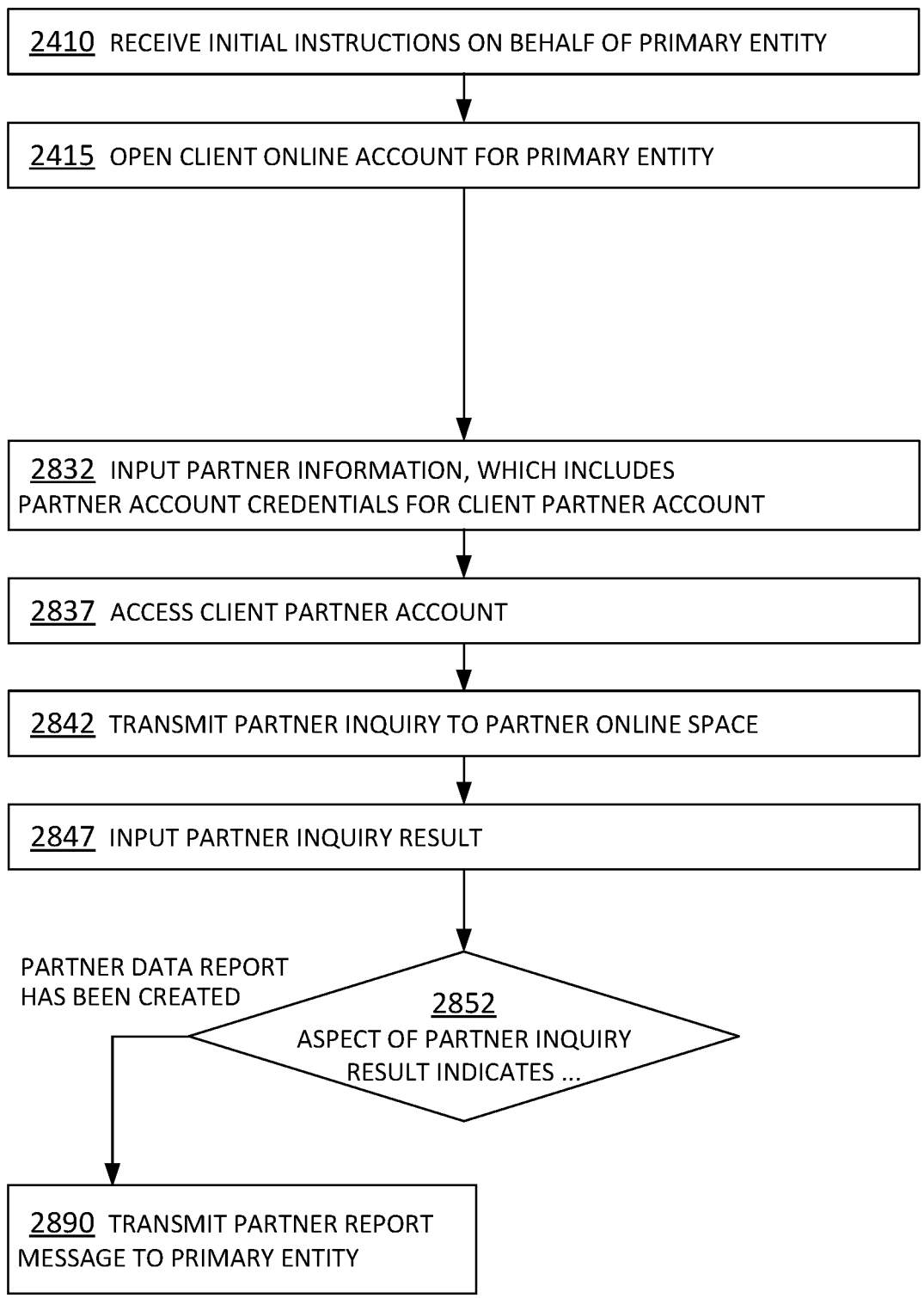
FIG. 28 is a flowchart for illustrating sample methods according to embodiments, which are improvements in automated computerized systems.

FIG. 28 shows a flowchart 2800 for describing methods according to embodiments. The flowchart 2800 starts with the operations 2410, 2415, which are described above.

According to another operation 2832, partner information may be inputted by the computer system. The partner information may be received, for instance, as shown in FIG. 15B. The partner information may be about a partner entity that has previously exchanged data with the primary entity. The partner entity may have a partner online space in an OSP, and the primary entity may have a client partner account in the partner online space. The partner information may include partner account credentials for the client partner account.

According to another operation 2837, the client partner account may be accessed by the computer system, using the partner account credentials and via a communications network.

According to another, operation 2842, a partner inquiry may be caused by the computer system to be transmitted to the partner, in a context of the accessed client partner account. The partner inquiry may inquire as to whether or not a partner data report has been created on behalf of the primary entity. The partner data report may relate to at least some of the relationship instances.

According to another operation 2847, a partner inquiry result may be inputted by the computer system, responsive to the transmitted partner inquiry.

According to another operation 2852, it can be determined, by the computer system, whether an aspect of the partner inquiry result indicates that the partner data report has or has not been created.

According to another, operation 2890, a partner report message can be caused to be transmitted to an agent of the primary entity by the computer system, responsive to the aspect of the partner inquiry result indicating that the partner data report has been created. The partner report message reporting on the aspect of partner inquiry result.

Sample Embodiments for Implementation

Figure 29:
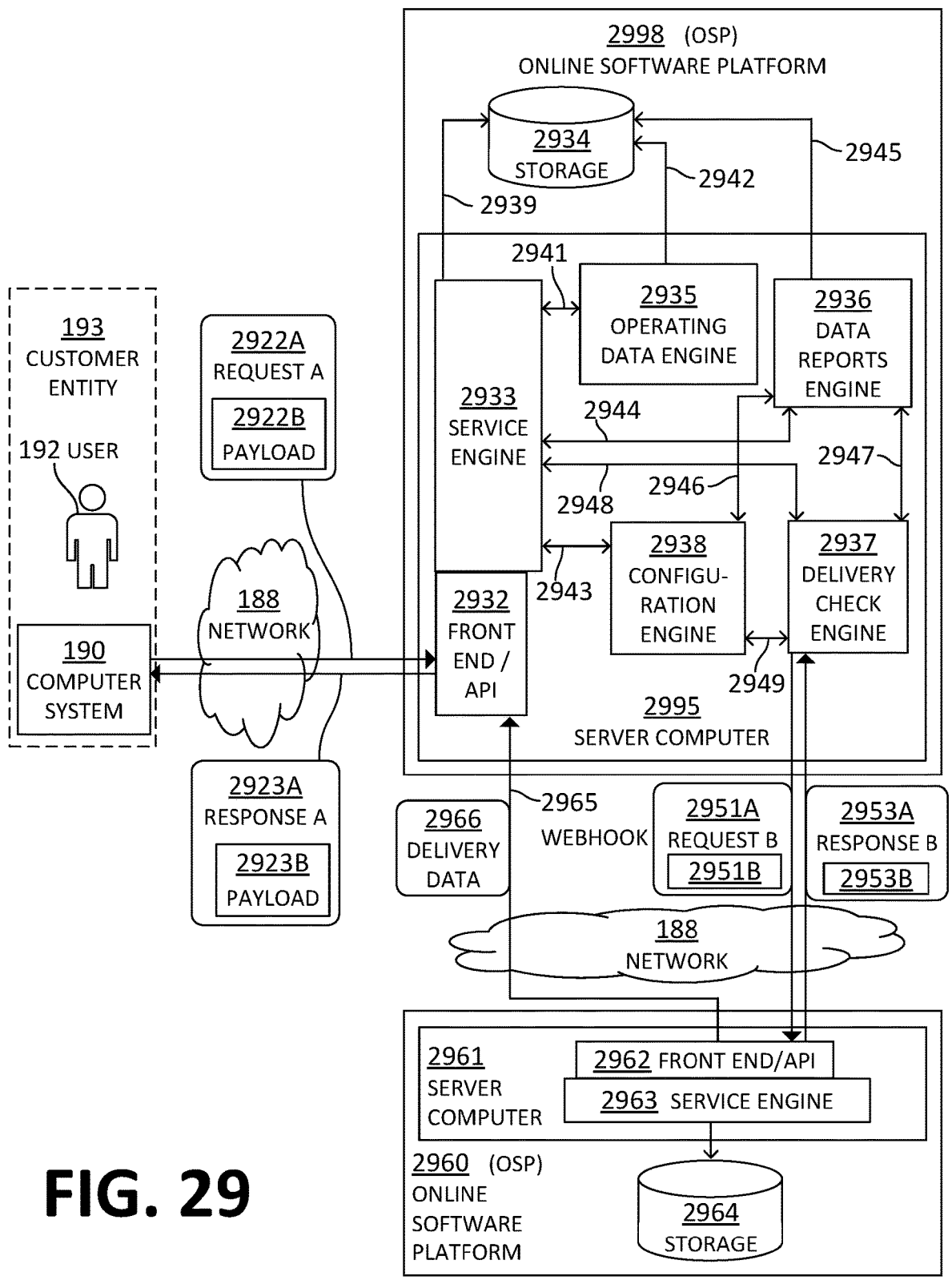
FIG. 29 is a diagram of a sample architecture for implementing embodiments.

FIG. 29 shows a sample architecture for implementation of embodiments. It will be recognized that this architecture enables an OSP to check and authenticate permissions with the client (optionally permissions of a third entity to provide data, such as for prior deliveries of data reports), then to verify, and then to report on actionable events. For instance, domains may be checked as well as online partners, along with dates and parsing what is found, for giving the user 192 a picture. It will be recognized that this architecture enables even more embodiments than described above.

Moreover, some of the operations described here may be performed synchronously (immediate request and response) or asynchronously (response provided after a lapse of time). Plus, additional configurations may allow a human to be part of the process that responds. For instance, an asynchronous response can be received via any electronic or manual means. Electronic means would be via calling an API or Webhook provided by the OSP, whereas manual means would be via a human entity providing such information through a user interface.

As before, the customer entity 193 may have a user 192, also known as an agent, and a computer system 190, optionally with configured software. The computer system 190 uses a public communications network 188 to access services provided by Online Software Platform (OSP) 2998.

A server computer 2995 may be hosted in an OSP 2998, along with a storage database 2934. The server computer 2995 implements a service engine 2933 with a front end 2932. Equivalently, instead of a front end 2932, one or more APIs could be used. The front end 2932 receives a Request A 2922A from the computer system 190. In exchange, the front end 2932 transmits a Response A 2923A back to the computer system 190. In these it will be appreciated that, for regular operation, compatibility for handshakes has been researched and established.

The Request A 2922A has a payload 2922B. FIG. 30 shows sample contents of the payload 2922B. These contents include operating data 3024, configuration data 3025, additional delivery data 3026, a delivery data request 3027, and account credentials 3058.

The Response A 2923A has a payload 2923B. FIG. 31 shows sample contents of the payload 2923B. These contents include a delivery data response 3128, which can be one of the inquiry results, and a delivery data notification 3129. These can be alternatives.

The server computer 2995 further implements a configuration engine 2938, and an operating data engine 2935 for the operating data 144, 2544. The server computer 2995 additionally implements a delivery check engine 2937 for the inquiries and the inquiry results. The server computer 2995 further implements a data reports engine 2936 for computing the aggregate resource 1379, preparing the new data report 1355, and so on.

One or more server computers 2961 may be hosted in and/or managed by an OSP 2960, along with storage 2964. The OSP 2960 may be external to the OSP 2998. The OSP 2960 may host 3rd party software providers and domains. As such, the one or more server computers 2961 may implement the functions of a specific domain, such as the Domain A 140, or of a partner entity, such as the partner entity 170, shown also in FIG. 16 and in FIG. 25. In this example, the server computer 2961 implements at least a service engine 2963 with a front end 2962.

The delivery check engine 2937 sends a Request B 2951A to the front end 2962. In exchange, the front end 2962 transmits a Response B 2953A back to the delivery check engine 2937.

The Request B 2951A has a payload 2951B. FIG. 32 shows sample contents of the payload 2951B. These contents include a delivery data request 3252, and the account credentials 3058.

The Response B 2953A has a payload 2953B. FIG. 33 shows sample contents of the payload 2953B. These contents include an acknowledgement 3355 of a request, and a delivery data response 3354.

Returning to FIG. 29, the user 192 may use the front end 2932 to configure the OSP 2998 for one or more of the domains using the configuration data 3025, to store operating data, to process data reports, and to check for prior such deliveries before processing data reports and delivering them. The configuration data 3025 can contain various types of information, including whether the primary entity 193 opts-in for automated check of such deliveries. As seen above, the user 192 may provide additional authentication configuration such as identifiers, passwords, keys, etc. The configuration engine 2938 may store such sensitive information with additional protection measures.

The user 192 may further use the front end 2932 to provide the operating data 3024 for individual or bulk relationship instances, to be processed and stored in the OSP 2998. And, to provide additional delivery data 3026 as information to be considered in data reports processing.

The user 192 may further use the front end 2932 to request delivery and/or approve consolidated data reports. For such, the OSP 2998 may provide immediately the delivery data response 3128, or indicate that the user's attention is needed via the delivery data notification 3129.

Further benefits may be provided for on-boarding of the client to the OSP. For instance, when data is collected at FIG. 3, prior copies can be collected as seen in FIG. 9, analyzed, and used to predict likely answers for subsequent on-boarding questions. These likely answers may then be proposed when the subsequent questions are indeed presented, to accelerate the on-boarding.

In this example, the front end 2932 acts only as an interface and the intelligence of handling the requests would be provided by the service engine 2933. The service engine 2933 may be implemented in various ways such as a state machine, an event-driven system, a workflow engine, and so on.

The service engine 2933 drives the functionality and interacts with the operating data engine 2935 via an interface 2941 to store and retrieve operating data for relationship instances of the customer entity 193.

The service engine 2933 additionally interacts with the configuration engine 2938 via an interface 2943, to store and update configurations. Such configurations may define whether the user is opting-in for the automated delivery check and whether the user configures to manually check and approve the consolidated data reports. The service engine 2933 further interacts with the data reports engine 2936 via an interface 2944 to trigger the processing of data reports and delivery of data reports.

A special webhook interface 2965 permits for asynchronous response. For instance, it can transfer delivery data 2966 of a prior delivery. The service engine 2933 further interacts with the delivery check engine 2937 via an interface 2948 to update additional information related to delivery data received asynchronously via the special webhook interface 2965.

Once the service engine 2933 triggers the data reports engine 2936 to start processing of data reports, the data reports engine 2936 retrieves the configuration on whether the customer entity has opted in for automatic delivery check of prior data reports and, if so, requests the delivery check engine 2937 via an interface 2947 to retrieve information on any previous full or partial deliveries/data reports.

The delivery check engine 2937 retrieves the authentication information from the configuration engine 2938 via an interface 2949, along with additional configuration data such as the external systems or domains that need to be checked for previous delivery of a data report.

The delivery check engine 2937 makes a list of one or more entities that need to be checked. Then it uses the Request B 2951A to trigger the Response B 2953A as an automated response, to check for previous such deliveries, with the front end 2962.

The delivery check engine 2937 uses the retrieved authentication information to first authenticate with the server computer 2961. After a successful authentication, the delivery check engine 2937 sends a delivery data request 3252 as the payload 2951B of the Request B 2951A, to request for previous full or partial delivery/data reports information.

The one or more server computers 2961 can process this request by retrieving the requested information and sending a Response B 2953A, which has a payload 2953B. This processing can be done immediately, in which case the payload 2953B includes a delivery data response 3354, or asynchronously, in which case the payload 2953B includes the acknowledgement 3355 and the delivery data 2966 is sent via the special webhook interface 2965 asynchronously, upon successful processing of the request.

Any delivery response that is received by the front end 2932 via the webhook interface 2965 is handled by the service engine 2933, and then sent to the delivery check engine 2937 via the interface 2948. Optionally, the service engine 2933 may decide to store the response in the storage database 2934 via the interface 2939, and inform the location of the response to the delivery check engine 2937 via the interface 2948. The storage database 2934 has an interface 2942 with the operating data engine 2935, and an interface 2945 with the data reports engine 2936. The data reports engine 2936 has an interface 2946 with the configuration engine 2938.

Upon receipt of all responses, the delivery check engine 2937 processes the information by parsing the retrieved data reports, and then it submits the information to data reports engine 2936 via the interface 2947. It may even determine amounts of resources transferred, from what is shown on the data reports themselves, and/or on records of resource transfers.

The delivery engine 2937 can cross-validate the operating data 144, 2544, with authentication and authorization provided by the OSP client, and then diagnose the status of a delivery using its technology for evaluating reportability for a relationship instance. For instance, the delivery check engine 2937 may look for a delivery to a domain for a time period, and compare it with the OSP client's operating data and client profile data, and then it can make computations to diagnose the status, and give recommend remedies.

FIG. 34 a table that gives examples of such instances. For these examples, actionable events can be:
  i) Data report delivered, timely, which was retrieved and checked by OSP.
  ii) Data report not delivered, and due (delivery deadline has not passed)—report identifies what needs to be done to deliver.
  iii) Data report not delivered, delinquent (delivery deadline passed)—report identifies steps needed to resolve/address delinquencies.
  iv) Data report delivered by another, therefore duplication detected—reports there was a duplication of instructions and what needs to be done to resolve.
  v) Data report delivered, but with missing context or with missing parts—reports what is additionally need to correct and complete the delivery.

In addition, the data reports engine 2936 may use the information to consolidate the data reports calculation, and check if the user 192 has configured for approval of consolidated data reports in the configuration engine 2938. If such a configuration exists, then the data reports engine 2936 requests the service engine 2933 to notify the user 192 for approval of consolidated data reports. The user 192 may approve the data reports or make manual adjustment and then approve the data reports. These exchanges may happen by a combination of the Request A 2922A and the Response A 2923A which, together, of course form an interface. This information shall be received by front end 2932 and sent to the data reports engine 2936 by the service engine 2933. Upon approval of consolidated data reports, the data reports engine 2936 shall proceed with the delivery of the data reports.

Figure 35:
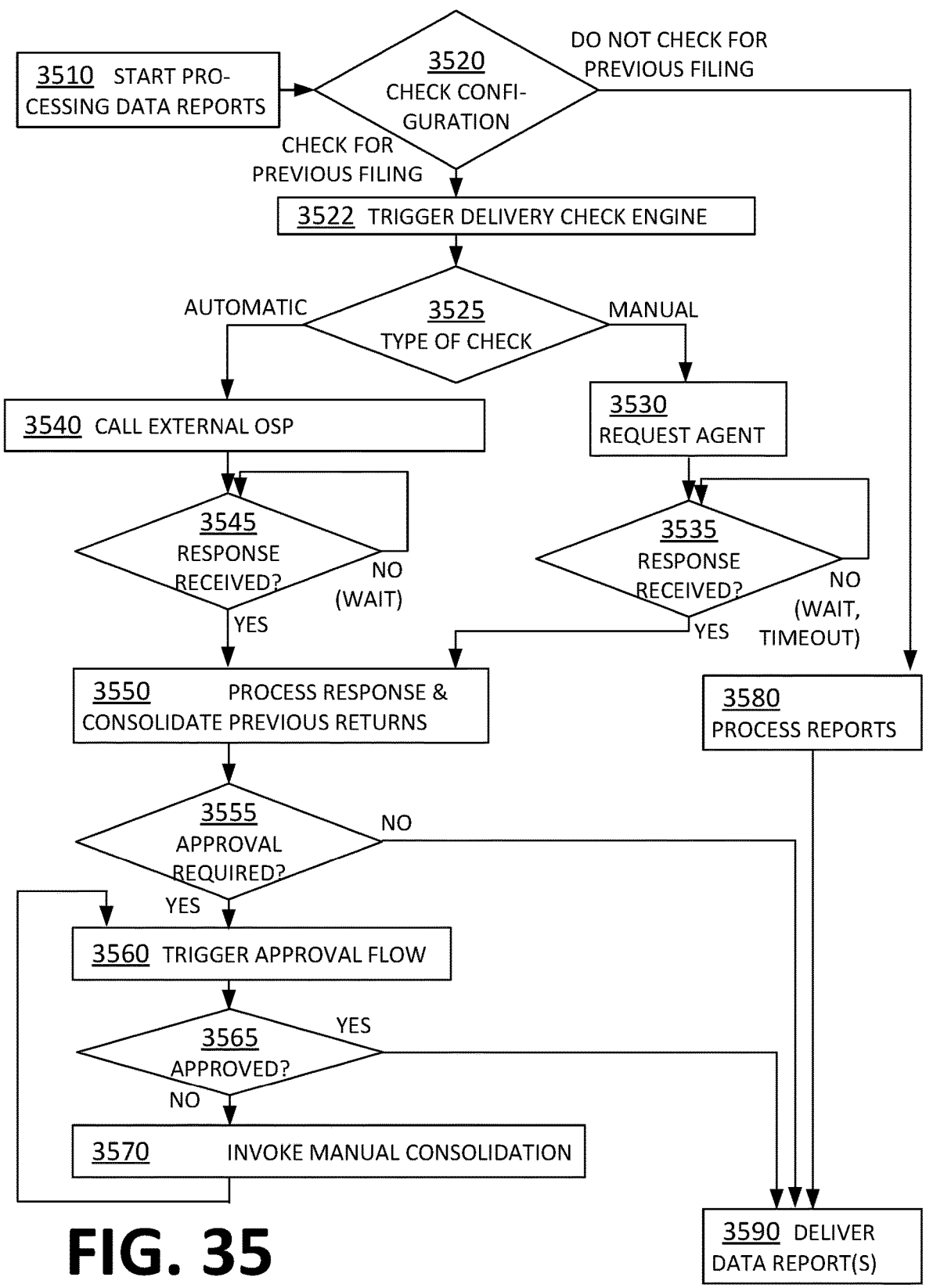
FIG. 35 is a flowchart for describing operational workflows for embodiments.

FIG. 35 is a flowchart 3500 that shows possible workflows related to what is described. The flowchart 3500 includes at least the operations 3510, 3520, 3522, 3525, 3530, 3535, 3540, 3545, 3550, 3555, 3560, 3565, 3570, 3580 and 3590. Explanatory text is written inside the boxes of these operations, along with comments outside these boxes.

Details about Computer Systems

Figure 36:
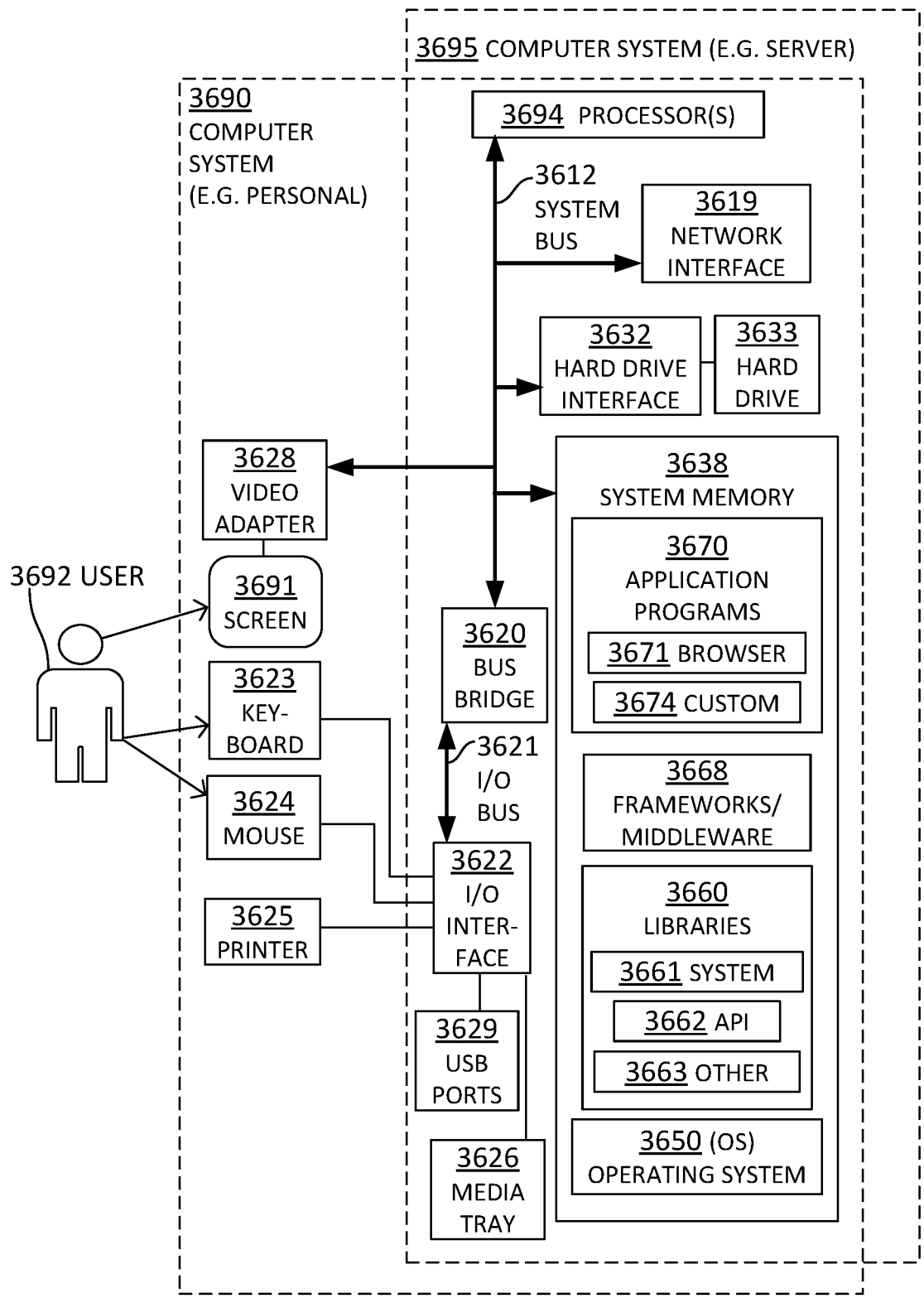
FIG. 36 is a block diagram showing additional components of sample computer systems according to embodiments, which are improvements in automated computerized systems.

FIG. 36 shows details for a sample computer system 3695 and for a sample computer system 3690. The computer system 3695 may be a server, while the computer system 3690 may be a personal device, such as a personal computer, a desktop computer, a personal computing device such as a laptop computer, a tablet computer, a mobile phone, and so on. Either type may be used for the computer system 195 and 190 of FIG. 14. Either type may be operated by a user 3692, who can be as other users described in this document.

The computer system 3695 and the computer system 3690 have similarities, which FIG. 36 exploits for purposes of economy in this document. It will be understood, however, that a component in the computer system 3695 may be implemented differently than the same component in the computer system 3690. For instance, a memory in a server may be larger than a memory in a personal computer, and so on. Similarly, custom application programs 3674 that implement embodiments may be different, and so on.

The computer system 3695 includes one or more processors 3694. The processor(s) 3694 are one or more physical circuits that manipulate physical quantities representing data values. The manipulation can be according to control signals, which can be known as commands, op codes, machine code, etc. The manipulation can produce corresponding output signals that are applied to operate a machine. As such, the one or more processors 3694 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or another type of programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable storage medium) or hardware components. The hardware components depicted in the computer system 3695, or the computer system 3690, are not intended to be exhaustive. Rather, they are representative, for highlighting essential components that can be used with embodiments.

The computer system 3695 also includes a system bus 3612 that is coupled to the processor(s) 3694. The system bus 3612 can be used by the processor(s) 3694 to control and/or communicate with other components of the computer system 3695.

The computer system 3695 additionally includes a network interface 3619 that is coupled to system bus 3612. Network interface 3619 can be used to access a communications network, such as the communications network 188. Network interface 3619 can be implemented by a hardware network interface, such as a Network Interface Card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on.

The computer system 3695 also includes various memory components. These memory components include memory components shown separately in the computer system 3695, plus cache memory within the processor(s) 3694. Accordingly, these memory components are examples of non-transitory machine-readable media. The memory components shown separately in the computer system 3695 are variously coupled, directly or indirectly, with the processor(s) 3694. The coupling in this example is via the system bus 3612.

In this context, "machine-readable storage medium" refers to a component, device or other tangible media able to store instructions and data temporarily or permanently and may include, but is not be limited to, a portable computer diskette, a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable compact disc read-only memory (CD-ROM), an optical storage device, a magnetic storage device, or any suitable combination of the foregoing. The machine that would read such a medium can be a computer system that includes the one or more processors 3694.

Instructions for performing any of the methods or functions described in this document may be stored, completely or partially, within the memory components of the computer system 3695, etc. The storing of such instructions can be such that one or more processors of a computer system can store, erase, read, or execute them. As such the instructions, when executed by the one or more processors, are designed to or programmed to cause the computer system to perform any one or more of the operations of the methods described herein.

The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, Python, etc. Accordingly, such instructions transform a general, non-programmed machine into a particular machine programmed to carry out the described and illustrated functions in the manner described.

The memory components of the computer system 3695 include a non-volatile hard drive 3633. The computer system 3695 further includes a hard drive interface 3632 that is coupled to the hard drive 3633 and to the system bus 3612.

The memory components of the computer system 3695 include a system memory 3638. The system memory 3638 includes volatile memory including, but not limited to, cache memory, registers and buffers. In embodiments, data from the hard drive 3633 populates registers of the volatile memory of the system memory 3638.

In some embodiments, the system memory 3638 has a software architecture that uses a stack of layers, with each layer providing a particular functionality. In this example the layers include, starting from the bottom, an Operating System (OS) 3650, libraries 3660, frameworks/middleware 3668 and application programs 3670, which are also known more simply as applications 3670. Other software architectures may include less, more or different layers. For example, a presentation layer may also be included. For another example, some mobile or special purpose operating systems may not provide a frameworks/middleware 3668.

The OS 3650 may manage hardware resources and provide common services. The libraries 3660 provide a common infrastructure that is used by the applications 3670 and/or other components and/or layers. The libraries 3660 provide functionality that allows other software components to perform tasks more easily than if they interfaced directly with the specific underlying functionality of the OS 3650. The libraries 3660 may include system libraries 3661, such as a C standard library. The system libraries 3661 may provide functions such as memory allocation functions, string manipulation functions, mathematical functions, and the like.

In addition, the libraries 3660 may include API libraries 3662 and other libraries 3663. The API libraries 3662 may include media libraries, such as libraries to support presentation and manipulation of various media formats such as MPREG4, H.264, MP3, AAC, AMR, JPG, and PNG. The API libraries 3662 may also include graphics libraries, for instance an OpenGL framework that may be used to render 2D and 3D in a graphic content on the screen 3691. The API libraries 3662 may further include database libraries, for instance SQLite, which may support various relational database functions. The API libraries 3662 may additionally include web libraries, for instance WebKit, which may support web browsing functionality, and also libraries for the applications 3670.

The frameworks/middleware 3668 may provide a higher-level common infrastructure that may be used by the applications 3670 and/or other software components/modules. For example, the frameworks/middleware 3668 may provide various Graphic User Interface (GUI) functions, high-level resource management, high-level location services, and so forth. The frameworks/middleware 3668 may provide a broad spectrum of other APIs that may be used by the applications 3670 and/or other software components/modules, some of which may be specific to the OS 3650 or to a platform.

The application programs 3670 are also known more simply as applications and apps. One such app is a browser 3671, which is a software that can permit the user 3692 to access other devices in the internet, for example while using a Graphic User Interface (GUI). The browser 3671 includes program modules and instructions that enable the computer system 3695 to exchange network messages with a network, for example using Hypertext Transfer Protocol (HTTP) messaging.

The application programs 3670 may include one or more of the aforementioned custom application programs 3674, made according to embodiments. These can be made so as to cause their host computer to perform operations according to embodiments. Of course, when implemented by software, operations according to embodiments may be implemented much faster than may be implemented by a human mind; for example, tens or hundreds of such operations may be performed per second according to embodiments, which is much faster than a human mind can do.

Other such applications 3670 may include a contacts application, a book reader application, a location application, a media application, a messaging application, and so on. Applications 3670 may be developed using the ANDROID™ or IOS™ Software Development Kit (SDK) by an entity other than the vendor of the particular platform, and may be mobile software running on a mobile operating system. The applications 3670 may use built-in functions of the OS 3650, of the libraries 3660, and of the frameworks/middleware 3668 to create user interfaces for the user 3692 to interact with.

The computer system 3695 moreover includes a bus bridge 3620 coupled to the system bus 3612. The computer system 3695 furthermore includes an input/output (I/O) bus 3621 coupled to the bus bridge 3620. The computer system 3695 also includes an I/O interface 3622 coupled to the I/O bus 3621.

For being accessed, the computer system 3695 also includes one or more Universal Serial Bus (USB) ports 3629. These can be coupled to the I/O interface 3622. The computer system 3695 further includes a media tray 3626, which may include storage devices such as CD-ROM drives, multi-media interfaces, and so on.

The computer system 3690 may include many components similar to those of the computer system 3695, as seen in FIG. 36. In addition, a number of the application programs may be more suitable for the computer system 3690 than for the computer system 3695.

The computer system 3690 further includes peripheral input/output (I/O) devices for being accessed by a user more routinely. As such, the computer system 3690 includes a screen 3691 and a video adapter 3628 to drive and/or support the screen 3691. The video adapter 3628 is coupled to the system bus 3612.

The computer system 3690 also includes a keyboard 3623, a mouse 3624, and a printer 3625. In this example, the keyboard 3623, the mouse 3624, and the printer 3625 are directly coupled to the I/O interface 3622. Sometimes this coupling is via the USB ports 3629.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Operational Examples—Use Cases

The above-mentioned embodiments have one or more uses. Aspects presented below may be implemented as was described above for similar aspects. Some, but not all of these aspects even have reference numerals that are similar to the above, for ease of explanation.

Uses of embodiments are for helping customers with tax compliance. In particular, businesses have tax obligations to various tax authorities of respective tax jurisdictions. It is often challenging to even determine what taxes are owed and to whom, because the underlying statutes and tax rules and guidance issued by the tax authorities are very complex. There are various types of tax, such as sales tax, use tax, excise tax, value-added tax, and issues about cross-border taxation including customs and duties, and many more. Some types of tax are industry specific. Each type of tax has its own set of rules. Additionally, statutes, tax rules, and rates change often, and new tax rules are continuously added. Compliance becomes further complicated when a taxing authority offers a temporary tax holiday, during which certain taxes are waived.

Tax jurisdictions are defined mainly by geography. Businesses have tax obligations to various tax authorities within the respective tax jurisdictions. There are various tax authorities, such as that of a group of countries, of a single country, of a state, of a county, of a municipality, of a city, of a local district such as a local transit district and so on. So, for example, when a business sells items in transactions that can be taxed by a tax authority, the business may have the tax obligations to the tax authority. These obligations include requiring the business to: a) register itself with the tax authority's taxing agency, b) set up internal processes for collecting sales tax in accordance with the sales tax rules of the tax authority, c) maintain records of the sales transactions and of the collected sales tax in the event of a subsequent audit by the taxing agency, d) periodically prepare a form ("tax return") that includes an accurate determination of the amount of the money owed to the tax authority as sales tax based on the sales transactions, e) file the tax return with the tax authority by a deadline determined by the tax authority, and f) pay ("remit") that amount of money to the tax authority. In such cases, the filing and payment frequency and deadlines are determined by the tax authority.

A challenge for businesses is that the above-mentioned software applications generally cannot provide tax information that is accurate enough for the businesses to be tax compliant with all the relevant tax authorities. The lack of accuracy may manifest itself as errors in the amounts determined to be owed as taxes to the various tax authorities, and it is plain not good to have such errors. For example, businesses that sell products and services have risks whether they over-estimate or under-estimate the sales tax due from a sale transaction. On the one hand, if a seller over-estimates the sales tax due, then the seller collects more sales tax from the buyers than was due. Of course, the seller may not keep this surplus sales tax, but instead must pay it to the tax authorities—if the seller cannot refund it to the buyers. If a buyer later learns that they paid unnecessarily more sales tax than was due, the seller risks at least harm to their reputation. Sometimes the buyer will have the option to ask the state for a refund of the excess tax by sending an explanation and the receipt, but that is often not done as it is too cumbersome for the amounts of money involved. On the other hand, if a seller under-estimates the sales tax due, then the seller collects less sales tax from the buyers, and therefore pays less sales tax to the authorities than was actually due. That is an underpayment of sales tax that will likely be discovered later, if the tax authority audits the seller. Then the seller will be required to pay the difference, plus fines and/or late fees, because ignorance of the law is not an excuse. Further, one should note that sales taxes can be considered trust-fund taxes, meaning that the management of a company may be held personally liable for the unpaid sales tax.

For sales in particular, making correct determinations for sales and use tax is even more complex, and therefore difficult. There are a number of factors that contribute to the complexity. Use cases for helping with such complex determinations are now described.

Operational examples and sample use cases are possible where the attribute of an entity in a dataset is any one of the entity's name, type of entity, a physical location such as an address, a contact information element, an affiliation, a characterization of another entity, a characterization by another entity, an association or relationship with another entity (general or specific instances), an asset of the entity, a declaration by or on behalf of the entity, and so on. Different resources may be produced in such instances, and so on.

Figure 37:
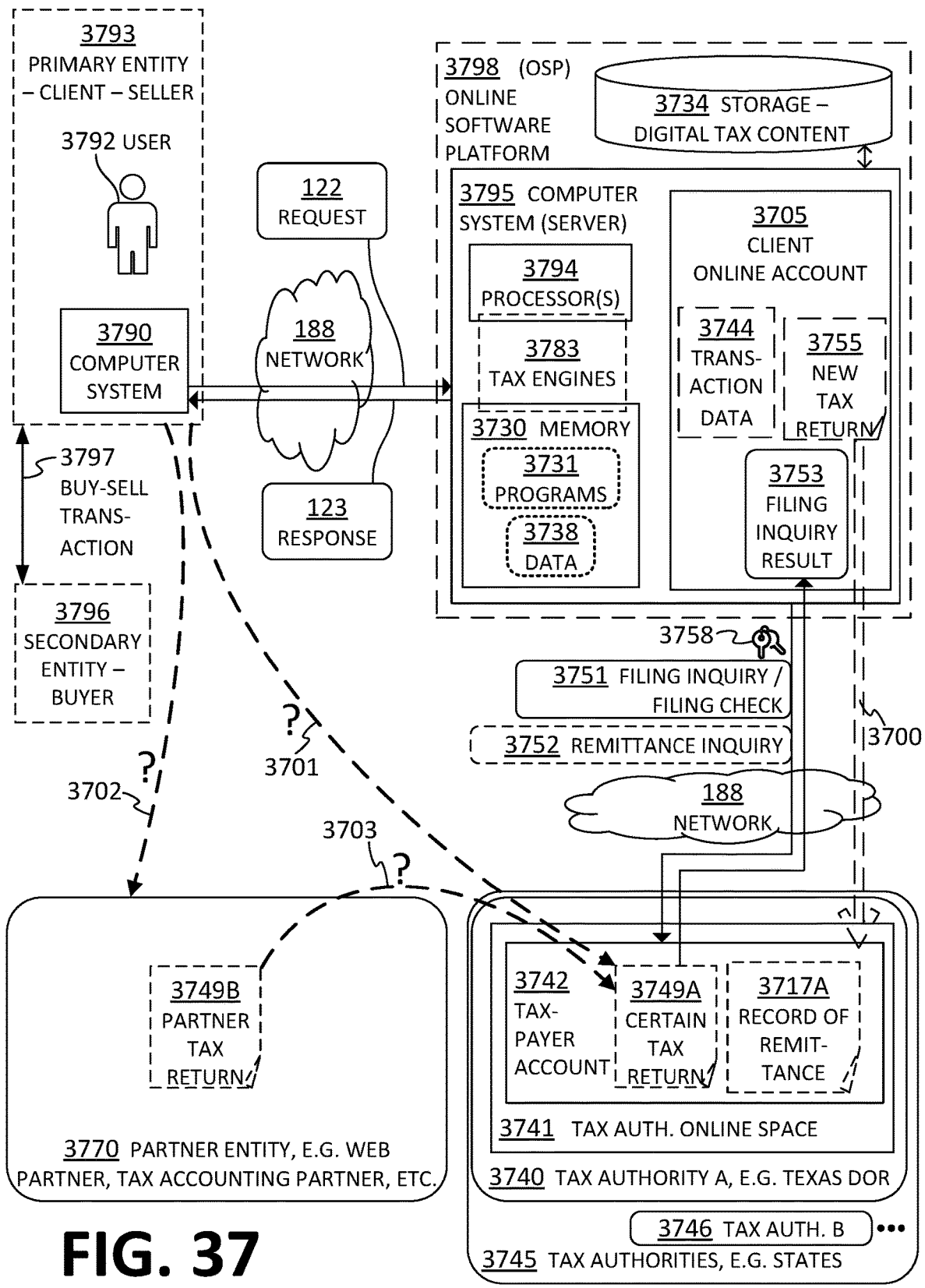
FIG. 37 is a diagram of a sample aspects for use cases of embodiments.

FIG. 37 is a diagram for an operational example, where a buy-sell transaction 3797 is a use case of the relationship instance 197 of FIG. 1. The transaction 3797 is conducted between a primary entity 3793 and a secondary entity 3796, which can be a buyer 3796. The buyer 3796 can be an organization, a person, and so on.

The primary entity 3793 can be a business, such as a seller of items, a reseller, a buyer, a service business, and so on. The entity 3793 can even be an online seller, but that is not necessary. In such instances, the user 3792 can be an employee, a contractor, or otherwise an agent of the entity 3793. The user 3792 may use a computer system 3790. Or, the user 3792 may work for a standalone seller. The computer system 3790 may have a screen, which is not shown separately. User Interfaces (UIs) may be shown on the screen, similar to what was shown for the screen 291.

The transaction 3797 is therefore a buy-sell transaction between the buyer 3796 and the seller 3793. The transaction 3797 can be for a physical item, but it could be a non-physical item such as a digital item, a specific right, and so on.

In a number of instances, the user 3792 and/or the entity 3793 use software applications to manage their business activities, such as sales, resource management, production, inventory management, delivery, billing, and so on. The user 3792 and/or the entity 3793 may further use accounting applications to manage purchase orders, sales invoices, refunds, payroll, accounts payable, accounts receivable, and so on.

Other elements of FIG. 37 can also be similar to those already described in FIG. 1, and implemented in similar ways. In particular, a sample computer system 3795 may be hosted by an OSP 3798. The computer system 3795 has one or more processors 3794 and a memory 3730. The memory 3730 stores programs 3731 and data 3738. The one or more processors 3794 and the memory 3730 thus implement tax engines 3783 in order to help with various aspects of tax compliance, such as making determinations of tax obligations, filing tax returns, preparing them, and so on.

A database storage 3734 may be accessed by the computer system 3795. The database storage 3734 could be part of the OSP 3798, or outside it. The database storage 3734 may store digital tax content, such as digital rules that implement decisions of tax authorities. The computer system 3795 may further store locally entity data, i.e. data of user 3792 and/or of entity 3793, either of which/whom may be a customer, and/or a seller or a buyer in a sales transaction. The entity data may include profile data of the customer, and transaction data from which a determination of a tax obligation is desired.

The computer system 3790 can be a client device for the computer system 3795. The user 3792 or the primary entity 3793 can use the services of the OSP 3798, and thus also be a client. The computer system 3790 may access the computer system 3795 via the communications network 188. It can do this with a handshake, exchanging requests and responses, such as the request 122 and the response 123.

The seller 3793 typically on-boards with the OSP 3798, logs into their client online account 3705 and enters their data such as contact information, their selected options for services, and so on. Examples were seen in FIG. 2, where the seller 3793 requests from the OSP 3798 to create and file tax returns, instead of the seller 3793 having to do that. Also, to check for inadvertent duplication of instructions. Then the OSP 3798 will, in such use cases, prepare the intended new tax return 3755, for instance from the transaction data 3744, and file it per the filing arrow 3700. Before that, however, the OSP 3798 will first check the tax authority online space 3741 to see whether the certain tax return 3749A has already filed.

Therefore, the computer system 3795 can be configured to perform tax-related services. Such services can be computations of individual sales and/or use tax liabilities for individual transactions 3797, preparing a tax return, plus checking for previous filing of such tax returns, whether directly with a tax authority or indirectly a partner, least there be an inadvertent duplication of instructions for such filings. Examples are now described.

In the example of FIG. 37, at the bottom left, a sample partner entity 3770 is shown. It could be a web-based partner that provides services such as online store front, accounting services, and so on. At the bottom right, a set of tax authorities 3745 is shown, which includes a plurality of tax authorities. These include at least a Tax Authority A 3740, a Tax Authority B 3746, and possibly other tax authorities as indicated by the dot-dot-dot. The Tax Authority A 3740 can be, for instance, the Department of Revenue (DOR) of a state, such as the Texas DOR. The Tax Authority A 3740 has a tax authority online space 3741 in an OSP, which can be the OSP 3798 or another OSP. The seller 3793 has a taxpayer account 3742 in the tax authority online space 3741.

In use cases, the seller 3793 engages the OSP 3798 for tax-related services. These can include for the OSP 3798 to prepare a new tax return 3755. These can also include for the OSP 3798 to file the intended new tax return 3755 with the Tax Authority A 3740, which is shown as a filing arrow 3700. As such, the OSP 3798 would be performing these actions, instead of the seller 3793 doing these actions.

Similarly to what was mentioned above, before thus filing the new tax return 3755 according to the filing arrow 3700, the OSP 3798 does not know whether such a certain tax return 3749A has been filed already. That could be either by the seller 3793 and filed per a filing arrow 3701, or by the partner entity 3770 and filed per the filing arrow 3703. The latter could be according to perhaps duplicative instructions to the partner entity 3770, according to an instruction arrow 3702, to create a partner tax return 3749B, and file it per the filing arrow 3703. Moreover, before making any remittances on behalf of the seller 3793, the OSP 3798 does not know whether such has been made already.

To prevent such duplication, the OSP 3798 may have permissions given per the checked option 251 of FIG. 2. To pursue this, the computer system 3795 may request additional permissions and credentials. These can be requested upon on-boarding, or when a service is first offered, or when the client invokes the service. An example is now described.

Figure 38:
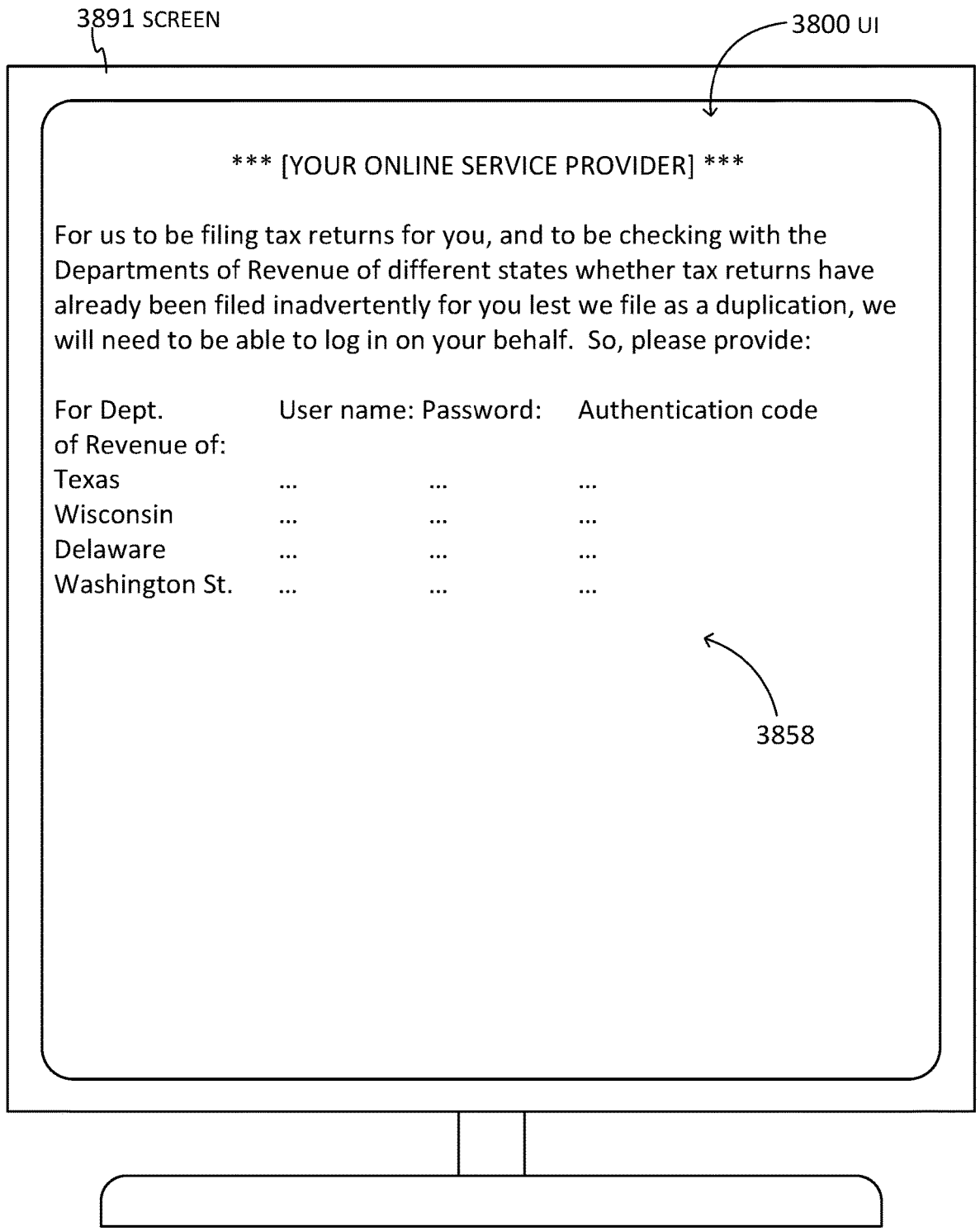
FIG. 38 shows a view of a sample User Interface (UI) for a use case of an embodiment.

FIG. 38 shows a screen 3891, which could be the screen of the computer system 3790 that is seen by the user 3792. The screen 3891 could also be screen 291. A UI 3800 issues requests 3858 for client account credentials for the applicable tax authorities that have been identified, either automatically or by the user. In this example, the applicable tax authorities are the states of Texas, Wisconsin, Delaware and Washington State. The client account credentials are input by the user 3792 responding to the requests 3858.

Returning to FIG. 37, client account credentials 3758 may be input, for instance as described with reference to FIG. 38. Or, tax-jurisdiction-identifying information may be received, which includes the client account credentials, and the OSP 3798 may parse the client account credentials 3758 from the tax-jurisdiction-identifying information. Or, the taxpayer account 3742 may be established on behalf of the seller 3793 by the OSP 3798 or by a partner, and such establishing may generate the client account credentials 3758 in the process.

The computer system 3795 may then access, using the client account credentials 3758, the taxpayer account 3742 in the tax authority online space 3741.

The computer system 3795 may cause a filing inquiry 3751 to be transmitted to the tax authority online space 3741 in a context of the accessed taxpayer account 3742. The filing inquiry 3751 is analogous to the delivery inquiry 151. The filing inquiry 3751 may inquire, in computer terms of course, as to whether or not the certain tax return 3749A has already been filed with the Tax Authority A 3740 on behalf of the seller 3793. The context would be that the certain tax return 3749A relates to the seller 3793 for whom the taxpayer account 3742 is maintained, regardless of whether or not the certain tax return 3749A itself is actually stored in the taxpayer account 3742.

In this case, the certain tax return 3749A would be relating to the transactions of the seller 3793 with those of the buyers that are associated with the Tax Authority A 3740. As such, the filing inquiry may be generated for the identified Tax Authority A 3740. While only one such certain tax return 3749A is shown in FIG. 37, there could be multiple such tax returns for different time periods. Examples are now described.

Figure 39:
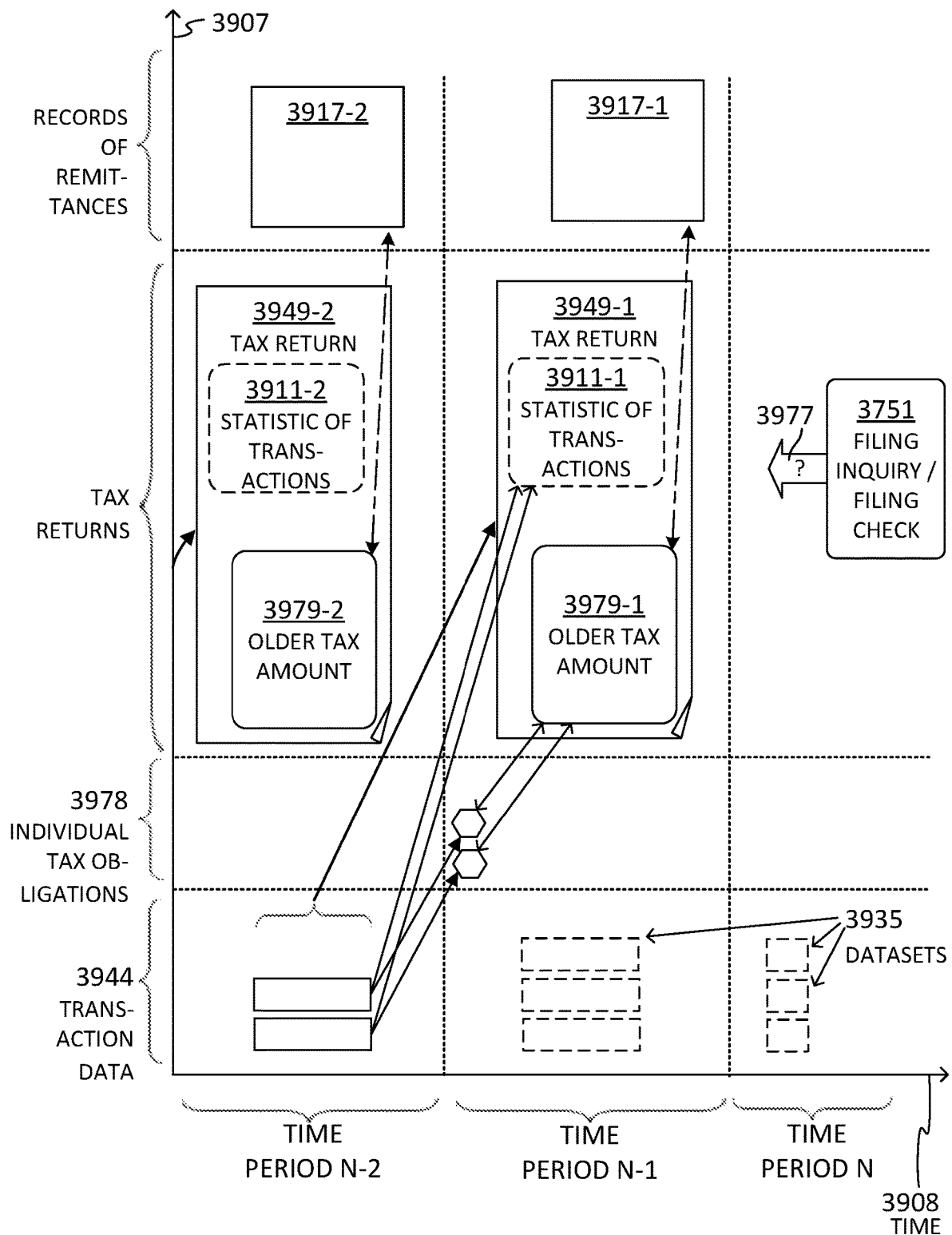
FIG. 39 shows sample tax returns that may be available in response to a filing inquiry, along with some of their relationships and some of their elements, in use cases.

FIG. 39 has a vertical element axis 3907 and a horizontal time axis 3908. The horizontal time axis 3908 shows sample consecutive time periods, for showing time relationships. A time period N can be thought of as a reference, and it could be for the present time.

FIG. 39 shows a sample tax return 3949-1 in the time period N-1, meaning one before N, and a sample tax return 3949-2 in the time period N-2, going back in time even farther. These may be inquired about by the filing inquiry 3751, according to an inquiry arrow 3977. As such, the filing inquiry 3751 can be transmitted for tax returns occurring in previous time periods.

FIG. 39 also shows sample transaction data 3944. In this particular example, these are made from assemblies of individual datasets 3935, which are shown at their time periods. In embodiments, the individual datasets 3935 themselves include a time indication as one of their parameters, from which their time period can be determined. In this example, each of the individual datasets 3935 is for a single transaction, although different configurations can be used.

The tax returns 3949-1, 3949-2 have been made from the transaction data 3944. In particular, the tax return 3949-1 may include a statistic 3911-1 of the transaction data 3944 of its previous time period. Similarly, the tax return 3949-2 may include a statistic 3911-2 of the transaction data 3944 of its previous time period. The statistic could be a sum of the sales.

The tax return 3949-1 also includes an older tax amount 3979-1 that is distinct from the statistic 3911-1. Similarly, the tax return 3949-2 also includes an older tax amount 3979-2 that is distinct from the statistic 3911-2. In embodiments, the older tax amount has been produced from the statistic, in each of these tax returns, whether or not the statistic is included in the tax returns. The name "older" for these tax amounts that are due is chosen from the perspective of the OSP 3798, to differentiate between such tax amounts that may be appearing in potential previous reports by others, from total tax due that may be computed afterwards by the computer system 3795.

FIG. 39 further shows individual tax obligations 3978, and when they were remitted, in relation to transaction data and/or the older tax amount 3979-1 in the tax return 3949-1. Of course, all may have been remitted in a single payment. FIG. 39 further shows a record 3917-1 of remittances, and another record 3917-2 of remittances.

Returning to FIG. 37, in this example the computer system 3795 further inputs, responsive to the transmitted filing inquiry 3751, a filing inquiry result 3753. The filing inquiry result 3753 is shown by an arrow as received from the tax authority online space 3741, and in particular from the certain tax return 3749A itself, as can be sometimes the case. The filing inquiry result 3753 can have forms discussed for the delivery inquiry result with reference to FIGS. 5, 6, 7, and 8.

The filing inquiry result 3753, or an aspect of it, may provide the answer to what is inquired by the filing inquiry 3751, namely whether or not a certain tax return 3749A has already been filed with the Tax Authority A 3740 on behalf of the seller 3793. Sometimes, it does not provide the answer. The computer system 3795 may be further determine whether an aspect of the filing inquiry result 3753 indicates that the certain tax return 3749A has or has not already been filed with the Tax Authority A 3740.

All of what was mentioned above for exploring for the certain tax return 3749A can apply also for the record 3717A of remittance, which is a use case of the record 117A of resource transfers. That is why a remittance inquiry 3752 can be sent, alone or as part of the filing inquiry 3751. Or, the customer's bank account can be checked, with permissions of course, for transactions where money is sent to the Tax Authority A 3740, and so on.

Figure 40:
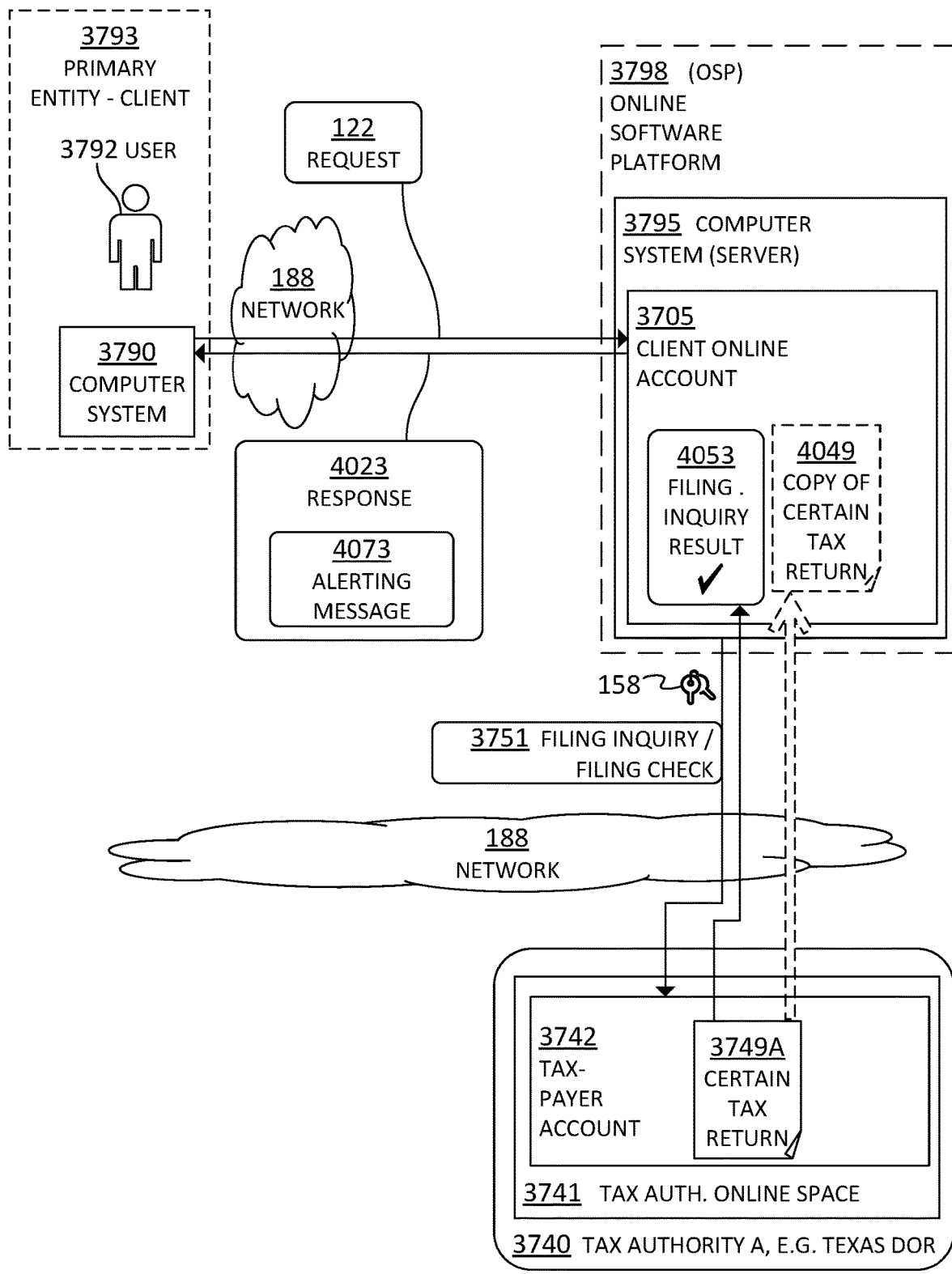
FIG. 40 is a diagram of sample aspects of a use case where a suspected certain tax return is found and reported by a filing inquiry result.

FIG. 40 is a diagram that repeats many elements of FIG. 37. However, the certain tax return 3749A that was suspected in FIG. 37, and which was presented in FIG. 37 in dashed lines, is now known to exist, from a filing inquiry result 4053. As such, the certain tax return 3749A is shown in FIG. 40 in solid lines. As part of the handshake, a response 4023 can include an alerting message 4073. A sample such message was seen in FIG. 10.

Returning to FIG. 40, the computer system 3795 may further receive a copy 4049 of the certain tax return 3749A, and place it into the client online account 3705. This way the copy 4049 can be reviewed, parsed, and even forwarded to the seller 3793. In some embodiments, the copy 4049 may be thus received as an attachment, for instance as part of the filing inquiry result 4053.

Figure 41:
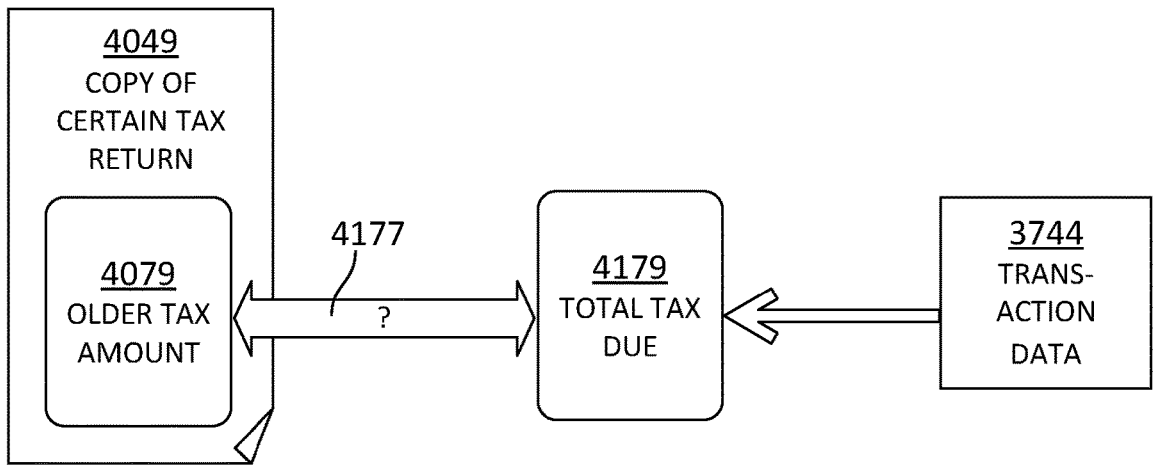
FIG. 41 is a diagram of a sample aspects of embodiments, where a previously determined total tax due amount is checked for accuracy.

FIG. 41 is a diagram of a sample aspects of embodiments. In the event that the checking of FIG. 10 is requested, the computer system 3795 may parse, from the copy 4049 of the certain tax return, an older tax amount 4079. Moreover, it may produce a total tax due 4179 from the transaction data 3744. Details of how the total tax due 4179 may be produced are provided later in this document.

The computer system 3795 may then make a comparison 4177 of the total tax due 4179 and the older tax amount 4079. The comparison 4177 may reveal a match or a lack of match of the compared quantities. The OSP 3798 may treat a lack of match as a discovered inaccuracy. Of course, before thus pronouncing someone else's result to be erroneous, the OSP 3798 may have taken very substantial measures to assure their own accuracy. Sometimes the OSP 3798 may even offer to compensate the client for their own inaccuracies. Moreover, if there is no match, the computer system 3795 may send a notice of inaccuracy to be communicated to an agent of the seller.

Figure 42:
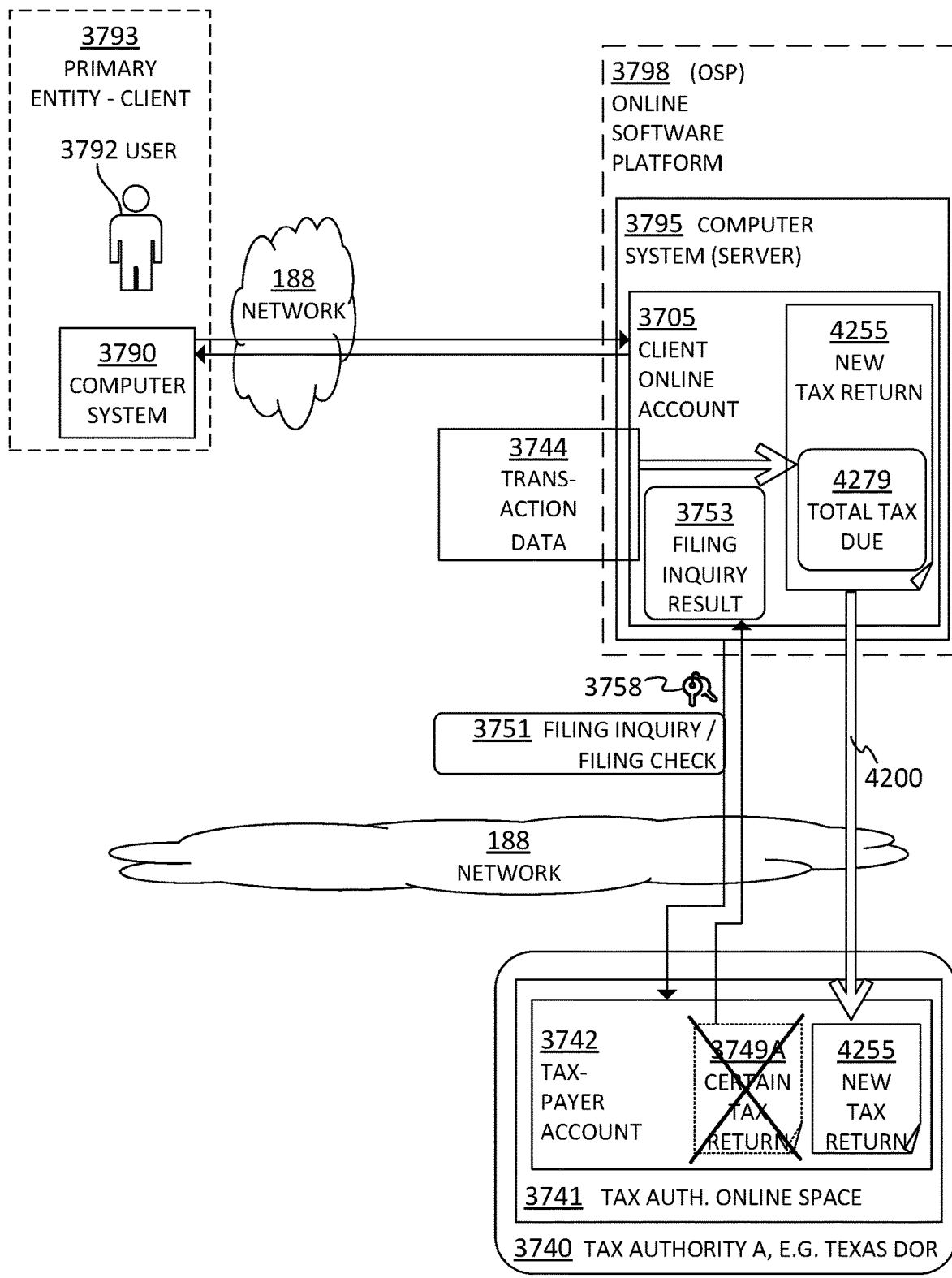
FIG. 42 is a diagram of a sample aspects of embodiments, where a new data report is delivered to a domain online space.

FIG. 42 is a diagram that repeats many elements of FIG. 37. In addition the certain tax return 3749A that was suspected in FIG. 37, and which was presented in FIG. 37 in dashed lines, is now known to not exist. As such, the certain tax return 3749A is shown in FIG. 42 as crossed out. The computer system 3795 then inputs a new tax return 4255. In the example of FIG. 42, the inputted new tax return 4255 is shown within the client online account 3705.

In fact, the computer system 3795 may generate the new tax return 4255, for inputting it. The new tax return 4255 includes the total tax due 4279. For that, the computer system 3795 produces or computes a total tax due 4279 from the transaction data 3744 of those of the transactions of the seller 3793 that are with those of the buyers that are associated with the tax jurisdiction. For the inputting of the transaction data 3744, the computer system 3795 may receive the transaction data 3744 from a remote device via a communications network.

The new tax return 4255 can then be filed via the communications network 188 with the tax authority online space 3741 in the context of the taxpayer account 3742. The filing is according to the arrow 4200, and it can be by uploading or other action.

In use cases, the total tax due 4279 is also computed. It should be noted that the computer system 3795 may be designed or programmed to produce a total tax due regardless of whether or not the certain tax return 3749A is found or not. Examples are now described.

Returning to FIG. 39, in some embodiments the transaction data 3744, 3944 include individual datasets 3935. In such embodiments, the computer system 3795 may be further designed or programmed to compute individual tax obligations from the individual datasets 3935. In such embodiments, the total tax due 4179, 4279 is produced from the individual tax obligations. Notably, these individual tax obligations could be different from the individual tax obligations 3978, and the total tax due 4279 could be different from the older tax amount 3979-1, as seen by the comparison of FIG. 41. The differences could be because the individual datasets 3935 may have been processed by an entity other than the OSP 3798, using different digital rules and/or parameter values.

Figure 43:
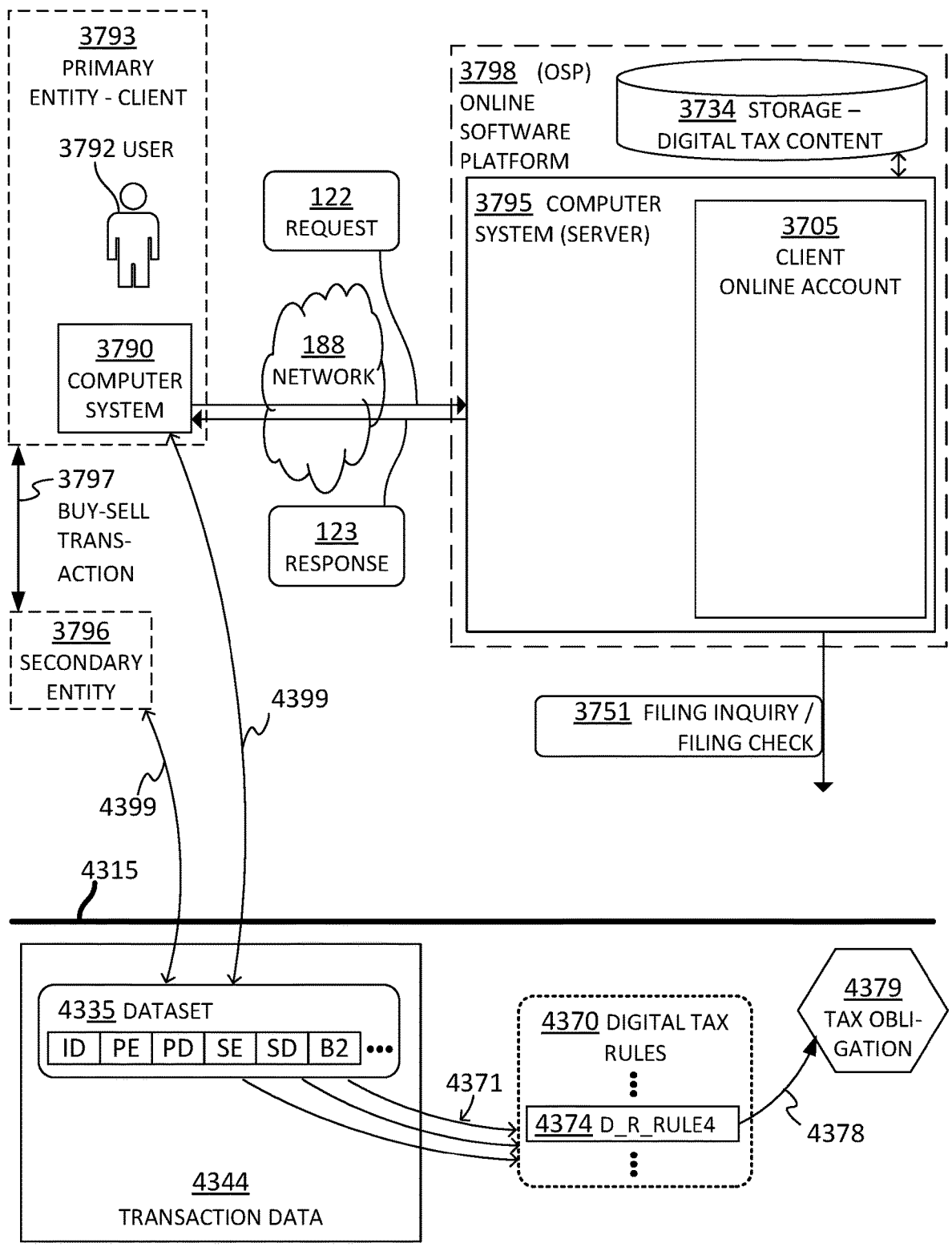
FIG. 43 is a diagram showing sample aspects for describing operational examples and use cases of embodiments for determining a tax obligation.

Also, FIG. 43 shows sample aspects of use cases. It will be recognized that FIG. 43 has similarities with FIG. 14. For instance a thick horizontal line 4315 separates FIG. 43, although not completely or rigorously. Everything above the line 4315 has been described already. Below the line 4315 are shown elements with emphasis mostly on processing of data that takes place to compute individual tax obligations, from which total tax dues and tax returns can be produced. In particular, a tax obligation 4379 often arises from the transaction 3797, such as a sales and/or use tax must be paid by either the primary entity 3793 or the secondary entity 3796. A computation of the tax obligation 4379 is a use case of producing the resource 1479.

A sample received dataset 4335 is shown below the line 4315. In this example, a dataset 4335 is part of the transaction data 4344. The dataset 4335 can be as described for the dataset 1435, and is an example of one or more of the individual datasets 3935. The dataset 4335 is created by assembling data from either one of both of the primary entity 3793, who is the seller, the secondary entity 3796, who is the buyer, plus data about what was sold.

In this example, the buyer 3796 may have used a device to create the transaction 3797. The seller 3793 and/or the buyer 3796 may be referred to as simply entities. One of these entities may have one or more attributes. Such an attribute of such an entity may be any one of its name, type of entity, a physical or geographical location such as an address, a contact information element, an affiliation, a characterization of another entity, a characterization by another entity, an association or relationship with another entity (general or specific instances), an asset of the entity, a declaration by or on behalf of the entity, a specific tax jurisdiction that the entity belongs in a context of multiple tax jurisdictions that are defined in terms of the above, and so on.

In embodiments, the computer system 3795 receives the dataset 4335, for instance by the request 122. In this example, the dataset 4335 has been received because it is desired to determine any tax obligations arising from the buy-sell transaction 3797. As such, the sample received dataset 4335 has dataset parameters with values that characterize attributes of the buy-sell transaction 3797, as indicated by a correspondence arrow 4399.

Accordingly, in this example the sample received dataset 4335 has a parameter ID with a value for an identity of the dataset 4335 and/or the transaction 3797. The dataset 4335 also has a parameter PE with a value for the name of the primary entity 3793 or the user 3792, which can be the seller making sales transactions, some perhaps online. The dataset 4335 further has an optional parameter PD with a value for relevant data of the primary entity 3793 or the user 3792, such as an address, place(s) of business, prior *nexus* determinations with various tax jurisdictions, and so on. The parameter PD is optional because it may be possible to look up its value from the parameter PE. The dataset 4335 also has a parameter SE with a value for the name of the secondary entity 3796, which can be the buyer. The dataset 4335 further has a parameter SD with a value for relevant data of the secondary entity 3796, entity-driven exemption status, and so on. In some instances, the parameter SD is optional, similarly with the parameter PD. The dataset 4335 has a parameter B2 with a numerical value for the sale price of the item sold. The dataset 4335 may further have additional dataset parameters, as indicated by the dot-dot-dot in the right side of the dataset 4335. These parameters may characterize further attributes, such as what item was sold, for example by a Stock Keeping Unit (SKU), how many units of the item were sold in the transaction 3797, a date and possibly also time of the transaction 3797, and so on.

In embodiments, the computer system 3795 may identify, responsive to the characterized attribute, a tax jurisdiction for the dataset, and thus a tax authority. This identifying may be performed by one or more associations of the characterized attribute with tax jurisdictions, properties of tax jurisdictions, rules of tax authorities, lists of what tax authorities include, and so on. Some times the characterized attribute may even be the name of a tax jurisdiction, such as a component of a mailing address. The identified tax jurisdiction may be associated with the certain entity, which can be the seller 3793 or the buyer 3796.

In particular, the computer system 3795 may further input tax-jurisdiction-identifying information, similarly to what was described above for domain-identifying information. Then the computer system 3795 may identify, from the tax-jurisdiction-identifying information, a tax jurisdiction from a plurality of tax jurisdictions, each of which has a tax authority.

The digital tax rules 4370 are digital in that they are implemented for use by software, similarly with the rules 1470. The digital tax rules 4370 can be created so as to accommodate legal tax rules that the set 3745 of different tax authorities 3740, 3746, . . . promulgate to apply within the boundaries of their tax jurisdictions. In the example of FIG. 43, only one sample digital tax rule is shown explicitly, namely rule T_RULE4 4374. In this diagram, all other such rules are indicated by the vertical dot-dot-dots.

Then the computer system 3795 may select a certain one of the digital tax rules 4370. In this example, the rule T_RULE4 4374 is thus selected. The selection of this particular rule is indicated also by the fact that an arrow 4378 begins from that rule. The arrow 4378 is similar to the arrow 1478.

The computer system 3795 may thus select the certain rule T_RULE4 4374 responsive to one or more of the dataset values of the dataset parameters of the dataset 4335. The impact of the dataset 4335 in the selection is indicated by at least some of the arrows 4371, similarly with the arrows 1471. For example, it can be recognized that a condition of the digital tax rule T_RULE4 4374 is met by one or more of the values of the dataset parameters of the dataset 4335. For instance, it can be further determined that, at the time of the sale, the buyer 3796 is located within the boundaries of a tax jurisdiction, that the seller 3793 has *nexus* with that tax jurisdiction, and that there is no tax holiday.

As such, the computer system 3795 may produce the tax obligation 4379, which is akin to producing the resource 1479 of FIG. 14. The tax obligation 4379 can be produced by the computer system 3795 applying the certain digital tax rule T_RULE4 4374, as indicated by the arrow 4378. The impact of the dataset 4335 in producing the tax obligation 4379 is indicated by at least one of the arrows 4371. In this example, the identified certain digital tax rule T_RULE4 4374 may specify that a sales tax is due, that the amount is to be determined by a multiplication of the sale price of the value of the parameter B2 by a specific rate, the tax return form that needs to be prepared and filed, a date by which it needs to be filed, and so on. Then a notification can be sent for the individual tax obligation 4379, if desired.

Checking the Partner Entity after Checking with the Tax Authority

Figure 44:
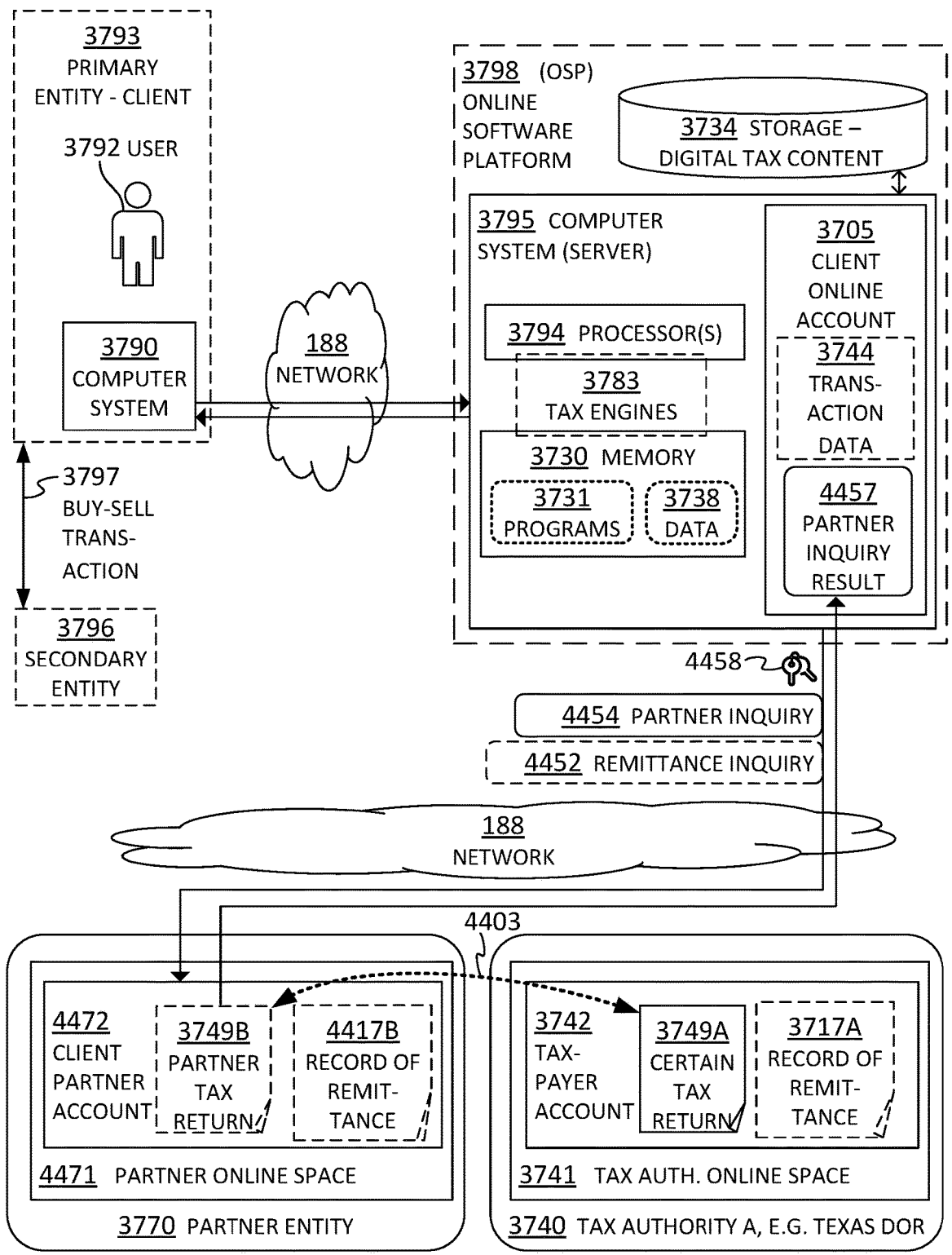
FIG. 44 is a diagram of a sample aspects of use cases of embodiments.

FIG. 44 is a diagram that repeats many elements of FIG. 37, and is for cases where the certain tax return 3749A is now known to exist and is therefore shown in solid lines, just like with FIG. 40. In this case, the OSP 3798 wants to explore whether a partner tax return 3749B has been created on behalf of the seller 3793 by the partner entity 3770. The OSP 3798 may infer that, if such has been created, it may be the one that is already filed, or intended to be filed, per a filing arrow 4403.

The OSP 3798 has learned about the partner entity 3770, which has a partner online space 4471 in an OSP, which could be the same as the OSP 3798 or different. The seller 3793 has a client partner account 4472 in the partner online space 4471. The partner tax return 3749B will be searched for in the client partner account 4472. Together with it, there may be a record 4417B of remittances.

For this exploring, the computer system 3795 may input partner information about the partner entity 3770, which includes partner account credentials 4458 for the client partner account 4472. The computer system 3795 may access, the client partner account 4472 using the partner account credentials 4458. In conjunction with accessing, the computer system 3795 may cause a partner inquiry 4454 to be transmitted to the partner online space 4471 in a context of the client partner account 4472. The partner inquiry 4454 may inquire as to whether or not a partner tax return has been created on behalf of the seller 3793, regardless of tax authority. A general inference may be drawn that, if such a partner tax return has been created, it would be for the purpose of filing it with any of the set of tax authorities 3745, which could result in duplication of instructions for tax filings.

In some embodiments, the partner inquiry 4454 inquires as to whether or not a partner tax return 3749B has been created on behalf of the seller 3793, the partner tax return 3749B relating to the transactions of the seller 3793 with those of the buyers that are associated with the identified Tax Authority A 3740. A more specific inference may be drawn that, if such a partner tax return has been created, it would be for the purpose of filing it specifically with the Tax Authority A 3740, and therefore such a partner tax return would be the partner tax return 3749B. Again, such would result in duplication of filing instructions, and specifically duplication when the new tax return 3755 would be filed, as requested, per the filing arrow 3700.

In FIG. 44, in conjunction with the partner inquiry 4454, or later, the computer system 3795 may further cause a remittance inquiry 4452 to be also communicated, for identifying the record 4417B.

Then the computer system 3795 may input, responsive to the transmitted partner inquiry 4454, a partner inquiry result 4457. Again, the partner inquiry result 4457 is shown by an arrow as received from the partner online space 4471, and in particular from the partner tax return 3749B itself, as can be sometimes the case.

The computer system 3795 can process an aspect of the partner inquiry result 4457 to determine whether the partner tax return 3749B has or has not been created. Then it may send a partner report message accordingly. Everything written above about processing an aspect of a partner inquiry result also applies.

If the partner tax return 3749B has been found, more can be implemented. For instance, a copy of the partner tax return 3749B can be received, and even placed into the client online account 3705.

In some instances, it is clear that a document that is found is indeed the partner tax return 3749B. In other instances, that is not so clear, and validation is first performed, to confirm that they are actually the sought for the partner tax return 3749B, the record 4417B of remittances, and other such documents. Examples are now described.

Figure 45:
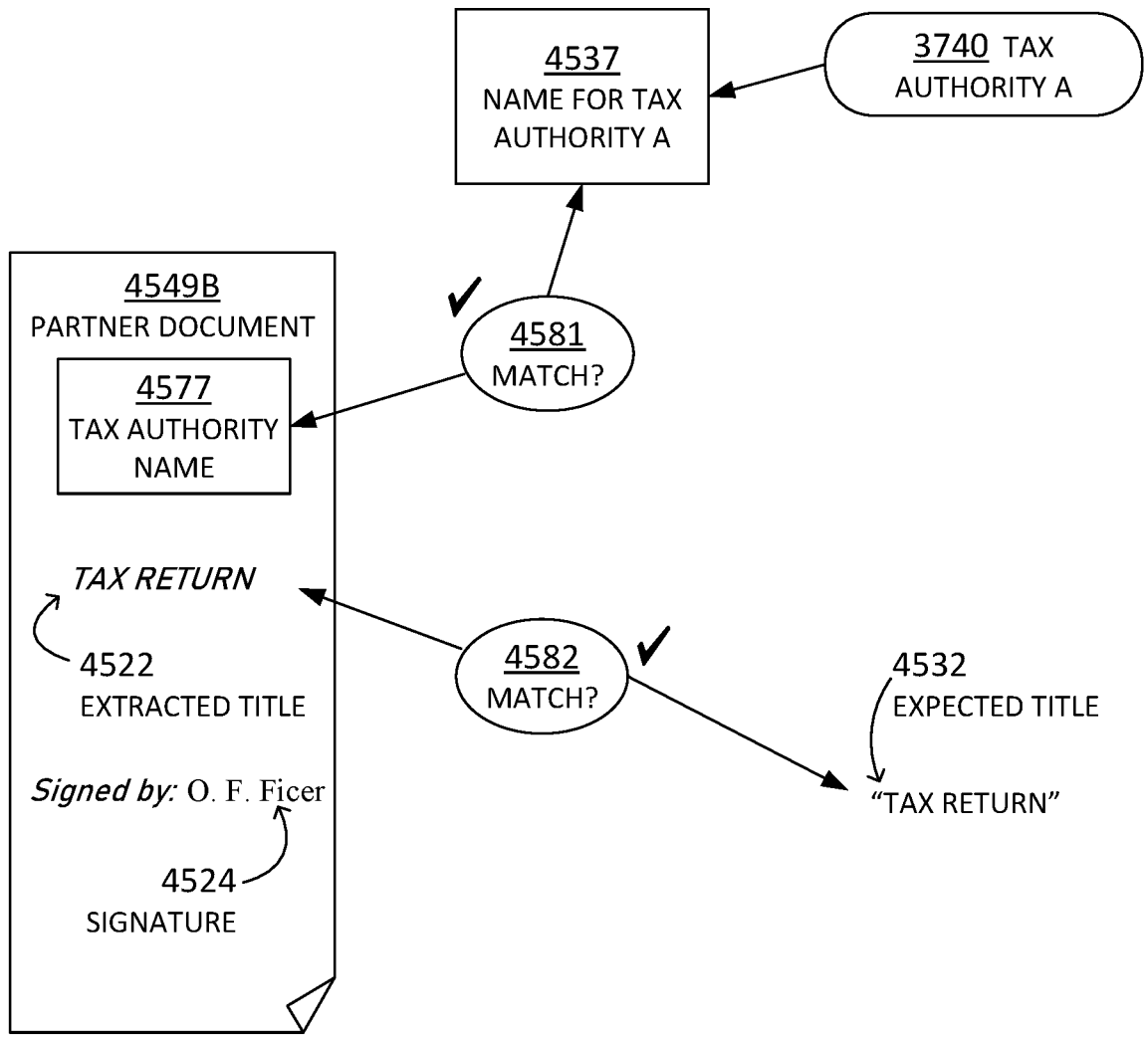
FIG. 45 is a diagram of sample confirmation criteria in use cases of embodiments.

FIG. 45 shows a sample partner document 4549B, which could be a candidate for being the partner tax return 3749B of FIG. 37. It can be tested with a number of different confirmation criteria until high enough confidence is attained. As an example of high enough confidence, if any one criterion fails, then the document fails to be the candidate.

In this example, the partner document 4549B has a tax authority name 4577, a title 4522, and a signature 4524.

The computer system 3795 may test for the tax authority name. For instance, it may input a name 4537 for the identified Tax Authority A 3740. It should be kept in mind that something, such as a tax authority itself, is not necessarily the same thing as its name, which is a string of characters.

The testing may include parsing the candidate partner document 4549B so as to extract the tax authority name 4577. A confirmation criterion 4581 can then be whether or not the extracted tax authority name 4577 is the inputted name 4537 for the identified tax authority.

The computer system 3795 may test for the document title. For instance, it may input an expected title 4532 of the partner tax return.

In the example of FIG. 45, the expected title 4532 is the character string "TAX RETURN". The testing may include parsing the candidate partner document 4549B so as to extract a title 4522. A title may appear typically near the top of the candidate partner document 4549B, similarly with the tax authority name, and further parsing may need to take place. In this example, the extracted title 4522 is also "TAX RETURN". A confirmation criterion 4582 can then be whether or not the extracted title 4522 is the expected title 4532.

In embodiments, similarly but without showing in FIG. 45, the confirmation criterion can be whether the signature 4524 is included, or a date is found and is in a proper range.

Figure 46:
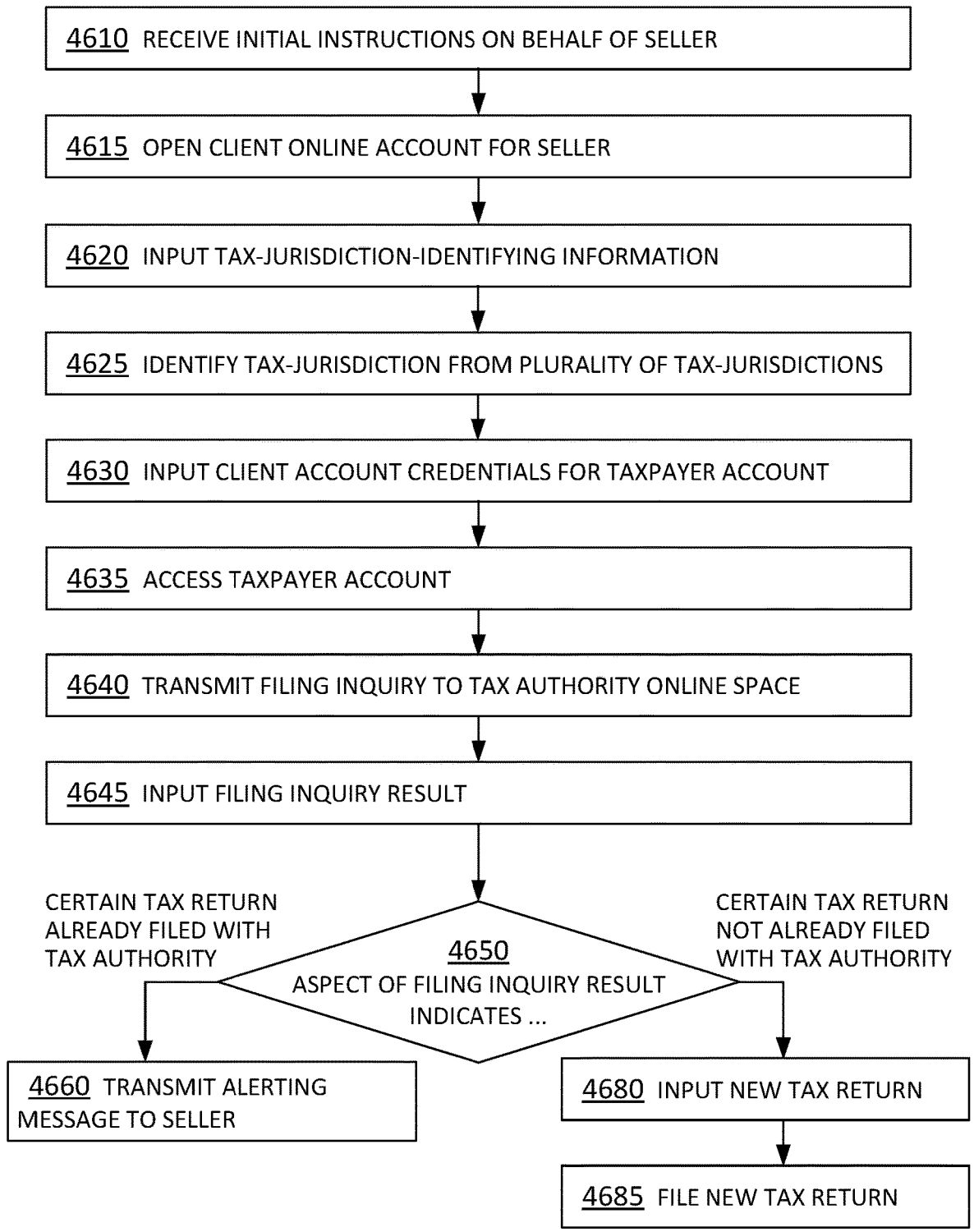
FIG. 46 is a flowchart for illustrating operational examples and use case of embodiments.

FIG. 46 shows a flowchart 4600 for describing methods according to embodiments. The flowchart 4600 includes operations 4610, 4615, 4620, 4625, 4630, 4635, 4640, 4645, 4650, 4660, 4680 and 4685, which are use cases of similar operations of the flowchart 2400. Explanatory text is written inside the boxes of the operations of the flowchart 4600, along with comments outside these boxes.

Checking the Partner Entity Before Checking the Tax Authority

Figure 47:
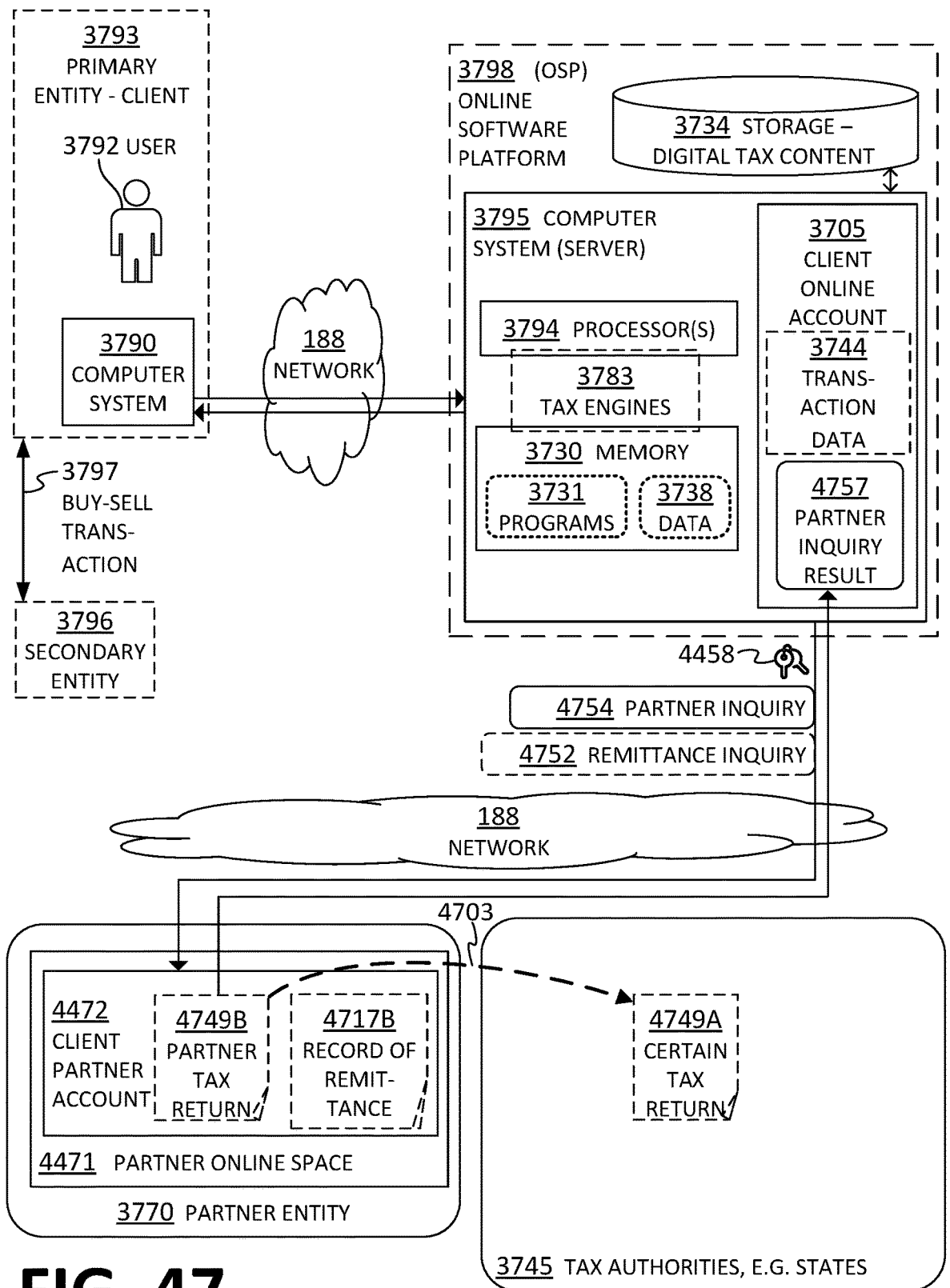
FIG. 47 is a diagram of a sample aspects of use cases of embodiments.

FIG. 47 is a diagram that repeats many elements of FIG. 37 and FIG. 44, and is for cases where it is not known whether certain tax return 4749A exists, and such is therefore shown in dashed lines. In this case, before querying the tax authority, the OSP 3798 explores first whether a partner tax return 4749B has been created on behalf of the seller 3793 by the partner entity 3770. The OSP 3798 may infer that, if such has been created, it may be intended to be filed, or already filed, per a filing arrow 4703.

The computer system 3795 may access, using the partner account credentials 4458, the client partner account 4472. The computer system 3795 may then cause a partner inquiry 4754 to be transmitted to the partner online space 4471 in a context of the client partner account 4472. The partner inquiry 4754 may inquire as to whether or not a partner tax return 4749B has been created on behalf of the seller 3793. As such, the partner tax return 4749B may relate to at least some of the transactions, but not necessarily those relating to the Tax Authority A 3740. In some embodiments, however, the partner tax return 4749B does relate to the transactions of the seller 3793 with those of the buyers that are associated with the Tax Authority A 3740. In such instances, the computer system 3795 may further input tax-jurisdiction-identifying information, and identify, from the tax-jurisdiction-identifying information, a tax authority from a plurality of tax authorities.

The computer system 3795 may then input, responsive to the transmitted partner inquiry 4754, a partner inquiry result 4757. The computer system 3795 may further determine whether an aspect of the partner inquiry result 4757 indicates that the partner tax return 4749B has or has not been created. Then the computer system 3795 may send a partner report message to an agent of the seller 3793, such as the user 3792, accordingly. The computer system 3795 may further receive a copy of the partner tax return 4749B, place it into the online account 3705, and so on.

And, again, the partner inquiry result may include an identified document that is a candidate for being the partner tax return 4749B, which may be further tested per confirmation criteria, and so on.

All of what was written above can be further used to query about any remittances. For instance, a separate remittance inquiry 4752 can be transmitted about any record 4717B of any remittances.

The operations described with reference to FIG. 47 may be performed automatically upon on-boarding. In some instances, the client maybe asked whether they are to happen.

Figure 48:
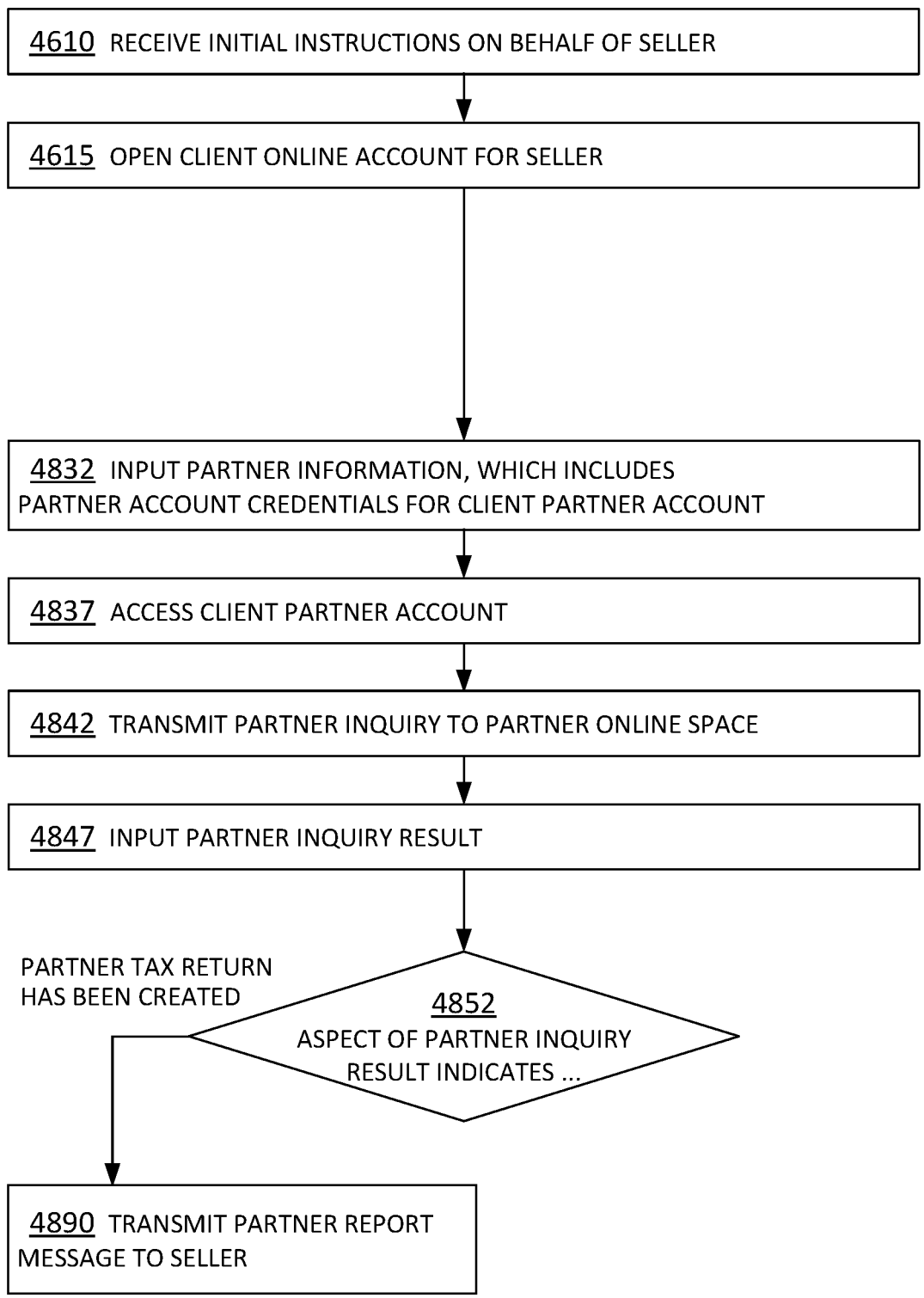
FIG. 48 is a flowchart for illustrating operational examples and use case of embodiments.

FIG. 48 shows a flowchart 4800 for describing methods according to embodiments. The flowchart 4800 includes operations 4610, 4615, 4832, 4837, 4842, 4847, 4852, and 4890, which are use cases of similar operations of the flowchart 2800. Explanatory text is written inside the boxes of the operations of the flowchart 4800, along with comments outside these boxes.

Sample Embodiments for Implementation of Use Cases

Figure 49:
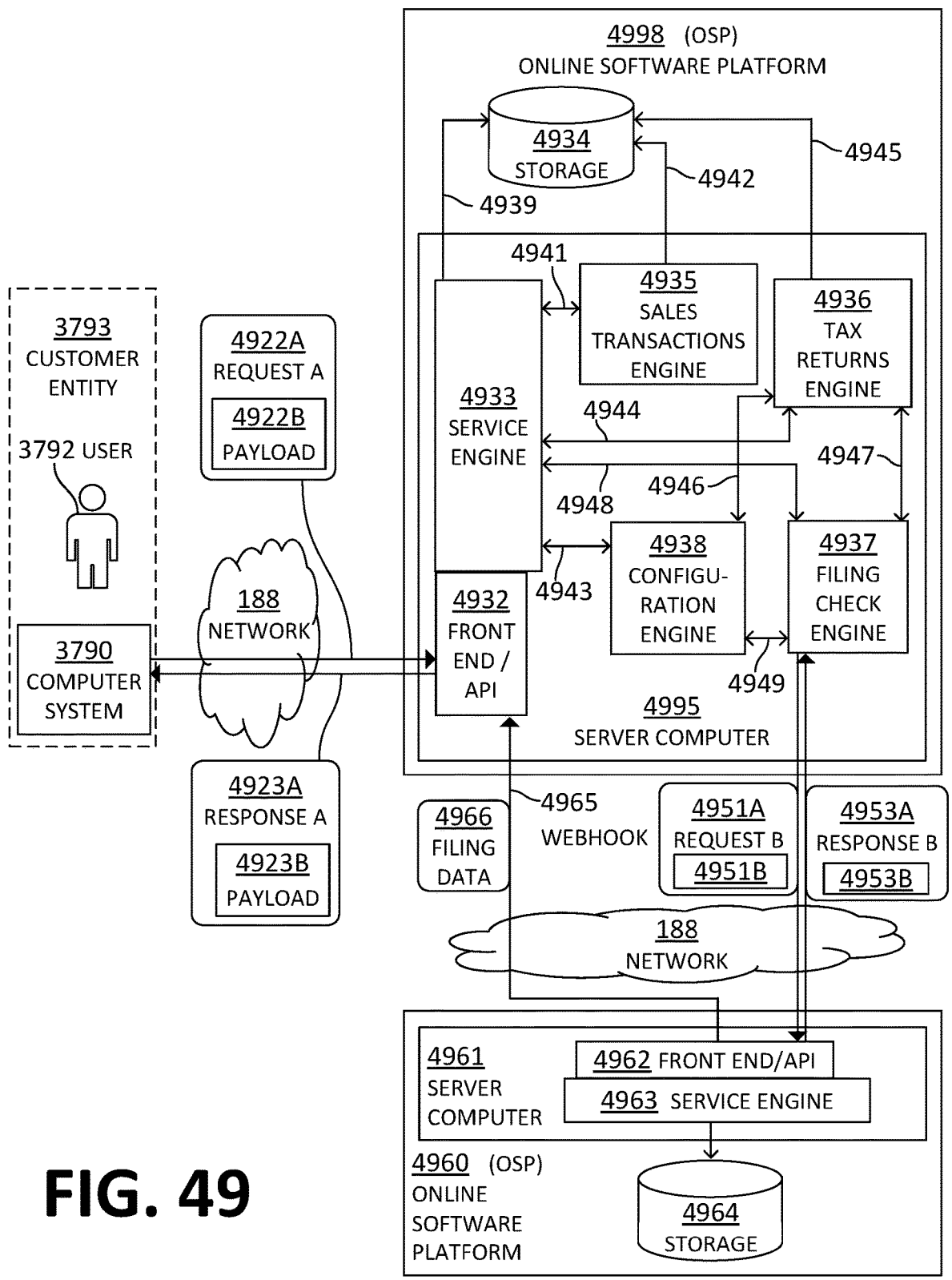
FIG. 49 is a diagram of operational examples in use cases of embodiments.

FIG. 49 shows a sample architecture for implementation of use cases of embodiments. As before, the customer entity 3793 may have a user 3792, also known as agent, and a computer system 3790, optionally with configured software.

The computer system 3790 uses a public communications network 188 to access services provided by Online Software Platform (OSP) 4998.

A server computer 4995 may be hosted in an OSP 4998, along with a storage database 4934. The server computer 4995 implements a service engine 4933 with a front end or API 4932. Equivalently, instead of a front end 4932, one or more APIs could be used. The front end 4932 receives a Request A 4922A from the computer system 3790. In exchange, the front end 4932 transmits a Response A 4923A back to the computer system 3790. In these it will be appreciated that, for regular operation, compatibility for handshakes has been established.

The Request A 4922A has a payload 4922B. FIG. 50 shows sample contents of the payload 4922B. These contents include transaction data 5024, configuration data 5025, additional filing data 5026, a filing data request 5027, and account credentials 5058.

The Response A 4923A has a payload 4923B. FIG. 51 shows sample contents of the payload 4923B. These contents include a filing data response 5128, which can be one of the inquiry results, and a filing data notification 5129. These can be alternatives.

The server computer 4995 further implements a configuration engine 4938, and a sales transactions engine 4935 for the transaction data. The server computer 4995 additionally implements a filing check engine 4937 for the inquiries and the inquiry results. The server computer 4995 further implements a tax returns engine 4936.

One or more server computers 4961 may be hosted in and/or managed by an OSP 4960, along with storage database 4964. The OSP 4960 may be external to the OSP 4998. The OSP 4960 may host 3rd party software providers and tax authorities. As such, the one or more server computers computer 4961 may implement the functions of a specific tax jurisdiction, or of a partner entity. In this example, the server computer 4961 implements at least a service engine 4963 with a front end 4962.

The filing check engine 4937 sends a Request B 4951A to the front end 4962. In exchange, the front end 4962 transmits a Response B 4953A back to the filing check engine 4937.

The Request B 4951A has a payload 4951B. FIG. 52 shows sample contents of the payload 4951B. These contents include a filing data request 5252, and the account credentials 5058.

The Response B 4953A has a payload 4953B. FIG. 53 shows sample contents of the payload 4953B. These contents include an acknowledgement 5355 of a request, and a filing data response 5354.

Returning to FIG. 49, the user 3792 may use the front end 4932 to configure the OSP 4998 for tax jurisdictions, to store transactions, to process returns, and to check for prior such filings before processing returns and filing them. The configuration data 5025 can contain various types of information, including whether the customer entity 3793 opts-in for automated filing check. As seen above, the user 3792 may provide additional authentication configuration such as identifiers, passwords, keys, etc. The configuration engine 4938 may store such sensitive information with additional protection measures.

The user 3792 may further use the front end 4932 to provide the transaction data 5024, individual or bulk, to be processed and stored in the OSP 4998. And, to provide additional filing data 5026 as information to be considered in returns processing.

The user 3792 may further use the front end 4932 to request filing, and/or approve consolidated returns. For such, the OSP 4998 may provide immediately the filing data response 5128, or indicate that the user's attention is needed via the filing data notification 5129.

Further benefits may be provided for on-boarding of the tax client to the OSP. For instance, when data is collected at FIG. 3, prior copies can be collected as seen in FIG. 9, analyzed, and used to predict likely answers for subsequent on-boarding questions. These likely answers may then be proposed when the subsequent questions are indeed presented, to accelerate the on-boarding.

In this example, the service engine 4933 drives the functionality and interacts with the sales transactions engine 4935 via an interface 4941 to store and retrieve the data of transactions made by the customer entity 3793.

The service engine 4933 additionally interacts with the configuration engine 4938 via an interface 4943 to store and update configurations such as whether the user is opting-in for the automated filing check and whether user configures to manually check and approve the consolidated tax returns. The service engine 4933 further interacts with the tax returns engine 4936 via an interface 4944 to trigger the processing of returns and filing of returns.

A special webhook interface 4965 permits for asynchronous response. For instance, it can transfer filing data 4966 of a prior filing. The service engine 4933 further interacts with the filing check engine 4937 via an interface 4948 to update additional information related to filing data received asynchronously via the special webhook interface 4965.

Once the service engine 4933 triggers the tax returns engine 4936 to start processing of returns, the tax returns engine 4936 retrieves the configuration on whether the customer entity has opted in for automatic filing check and, if so, requests the filing check engine 4937 via an interface 4947 to retrieve information on any previous full or partial filings/returns.

The filing check engine 4937 retrieves the authentication information from the configuration engine 4938 via an interface 4949, along with additional configuration data such as the external systems or tax authorities that need to be checked for previous filing of a tax return.

The filing check engine 4937 makes a list of one or more entities that need to be checked. Then it uses the Request B 4951A to trigger the Response B 4953A as an automated response, to check for previous such filing(s), with the front end 4962.

The filing check engine 4937 uses the retrieved authentication information to first authenticate with server computer 4961. After a successful authentication, the filing check engine 4937 sends a filing data request 5252 as the payload 4951B of the Request B 4951A to request for previous full or partial filing/returns information.

The one or more server computers 4961 can process this request by retrieving the requested information and sending a Response B 4953A, which has a payload 4953B. This processing can be done immediately, in which case the payload 4953B includes a filing data response 5354, or asynchronously, in which case the payload 4953B includes the acknowledgement 5355 and the filing data 4966 is sent via the special webhook interface 4965 asynchronously, upon successful processing of the request.

Any filing response received by the front end 4932 via the webhook interface 4965 is handled by the service engine 4933, and then sent to the filing check engine 4937 via the interface 4948. Optionally, the service engine 4933 may decide to store the response in the storage database 4934 via the interface 4939, and inform the location of the response to the filing check engine 4937 via the interface 4948. The storage database 4934 has an interface 4942 with the sales transactions engine 4935, and an interface 4945 with the tax returns engine 4936. The tax returns engine 4936 has an interface 4946 with the configuration engine 4938.

Upon receipt of all responses, the filing check engine 4937 processes the information by parsing the retrieved tax returns, and then it submits the information to the tax returns engine 4936 via the interface 4947. It may even determine amounts of taxes paid, from what is shown on the tax returns themselves, and/or on records of payments.

The filing engine 4937 can cross-validate the transaction data 3744 with authentication and authorization provided by the OSP client, and then diagnose the status of a filing using its technology for evaluating reportability and remittance liable party for a transaction. For instance, the filing check engine 4937 may look for a filing to a tax jurisdiction for a time period, and compare it with the OSP client's transactions and tax profile data, and then it can make computations to diagnose the status, and give recommend remedies.

FIG. 54 is a table that gives examples of such instances. For these examples, actionable events can be:
 i) Tax return filed, timely, which was retrieved and checked by OSP.
 ii) Tax return not filed, and due (filing deadline has not passed)—report identifies what needs to be done to file.
 iii) Tax return not filed, delinquent (filing deadline passed)—report identifies steps needed to resolve/address delinquencies.
 iv) Tax return filed by another, therefore duplication detected—reports there was a duplication of instructions and what needs to be done to resolve.
 v) Tax return filed, but with missing context or with missing parts—reports what is additionally need to correct and complete the filing.

In addition, the tax returns engine 4936 may use the information to consolidate the returns calculation, and check if the user 3792 has configured for approval of consolidated returns in the configuration engine 4938. If such a configuration exists, then the tax returns engine 4936 requests the service engine 4933 to notify the user 3792 for approval of consolidated returns. The user 3792 may approve the tax returns or make manual adjustment, and then approve the returns. These exchanges may happen by a combination of the Request A 4922A and the Response A 4923A which, together, of course form an interface. This information shall be received by front end 4932 and sent to the tax returns engine 4936 by the service engine 4933. Upon approval of consolidated returns, the tax returns engine 4936 shall proceed with the filing of the returns.

Figure 55:
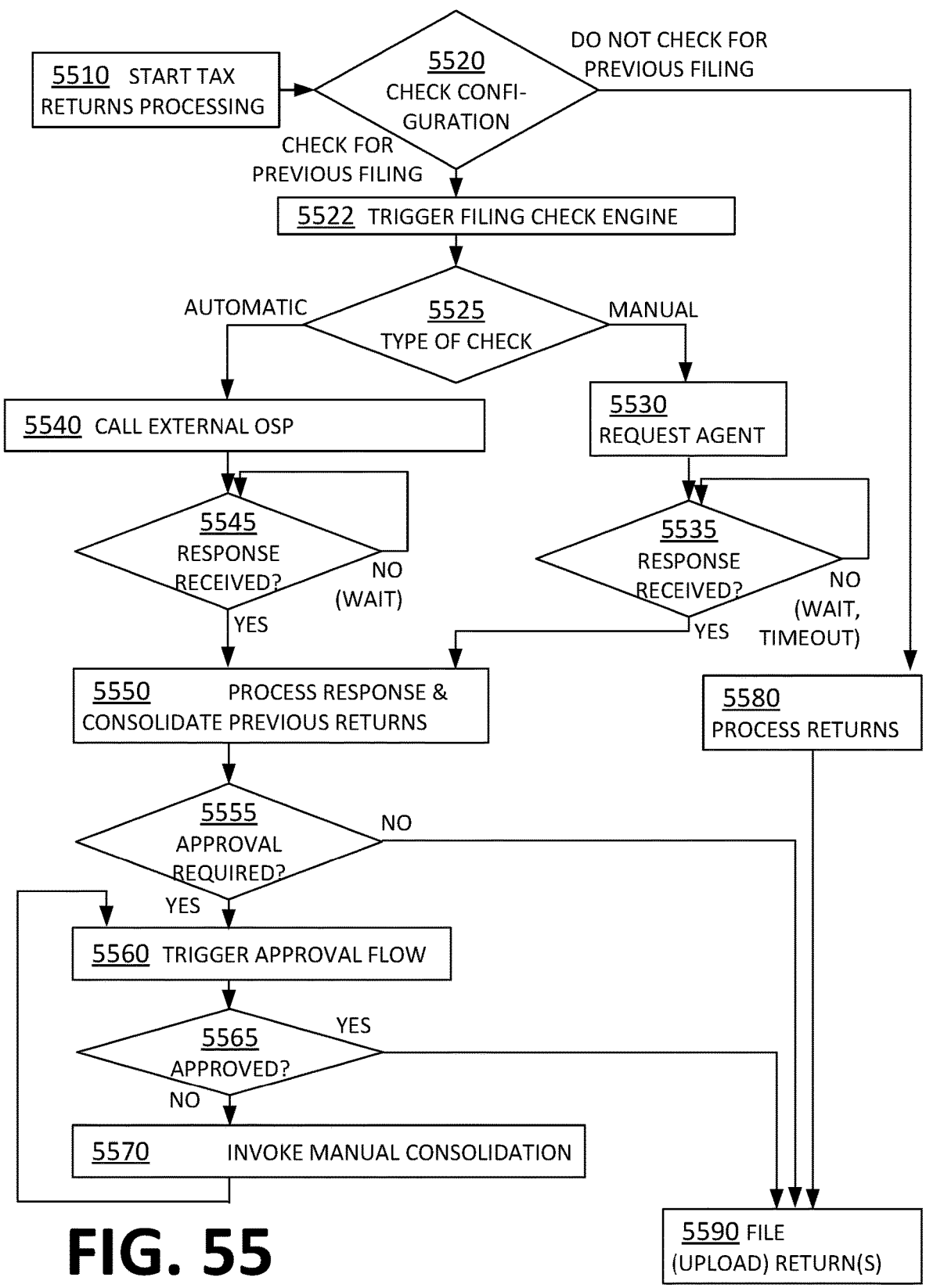
FIG. 55 is a flowchart for describing operational workflows in use cases of embodiments.

FIG. 55 is a flowchart 5500 that shows possible workflows related to what is described. The flowchart 5500 includes at least the operations 5510, 5520, 5522, 5525, 5530, 5535, 5540, 5545, 5550, 5555, 5560, 5565, 5570, 5580 and 5590. Explanatory text is written inside the boxes of these operations, along with comments outside these boxes.

In the methods described above, each operation can be performed as an affirmative act or operation of doing, or causing to happen, what is written that can take place. Such doing or causing to happen can be by the whole system or device, or just one or more components of it. It will be recognized that the methods and the operations may be implemented in a number of ways, including using systems, devices and implementations described above. In addition, the order of operations is not constrained to what is shown, and different orders may be possible according to different embodiments. Examples of such alternate orderings may include overlapping, interleaved, interrupted, reordered, incremental, preparatory, supplemental, simultaneous, reverse, or other variant orderings, unless context dictates otherwise. Moreover, in certain embodiments, new operations may be added, or individual operations may be modified or deleted. The added operations can be, for example, from what is mentioned while primarily describing a different system, apparatus, device or method.

For each of the operations of the flowcharts described in this document, additional operations may be further performed as described above.

At least one of the methods of this description, when implemented by a computer, can be performed at the rate of at least 10 times per second.

A person skilled in the art will be able to practice the present invention in view of this description, which is to be taken as a whole. Details have been included to provide a thorough understanding. In other instances, well-known aspects have not been described, in order to not obscure unnecessarily this description.

The technique of three dots in the drawings: The drawings associated with this document may show three dots drawn in sequence, and in any orientation. This document may refer to a shown set of such three dots as "dot-dot-dot". Where shown next to an element, this set of three dots is used to indicate possible additional such elements while omitting drawing them, which helps unclutter the drawings. This technique for the drawings is analogous to the ellipsis used in writing. In particular, an ellipsis is a punctuation mark that consists of three dots or periods ( . . . ), and is used to indicate possibly more of what it follows, perhaps in sequence, while omitting writing the possibly more.

Some technologies or techniques described in this document may be known. Even then, however, it does not necessarily follow that it is known to apply such technologies or techniques as described in this document, or for the purposes described in this document.

This description includes one or more examples, but this fact does not limit how the invention may be practiced. Indeed, examples, instances, versions or embodiments of the invention may be practiced according to what is described, or yet differently, and also in conjunction with other present or future technologies. Other such embodiments include combinations and sub-combinations of features described herein, including for example, embodiments that are equivalent to the following: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the features incorporated in such combinations and sub-combinations.

In general, the present disclosure reflects preferred embodiments of the invention. The attentive reader will note, however, that some aspects of the disclosed embodiments extend beyond the scope of the claims. To the respect that the disclosed embodiments indeed extend beyond the scope of the claims, the disclosed embodiments are to be considered supplementary background information and do not constitute definitions of the claimed invention.

In this document, the phrases "constructed to", "adapted to" and/or "configured to" denote one or more actual states of construction, adaptation and/or configuration that is fundamentally tied to physical characteristics of the element or feature preceding these phrases and, as such, reach well beyond merely describing an intended use. Any such elements or features can be implemented in a number of ways, as will be apparent to a person skilled in the art after reviewing the present disclosure, beyond any examples shown in this document.

Incorporation by reference: References and citations to other documents, such as patents, patent applications, patent publications, journals, books, papers, web contents, have been made throughout this disclosure. All such documents are hereby incorporated herein by reference in their entirety for all purposes.

Parent patent applications: Any and all parent, grandparent, great-grandparent, etc. patent applications, whether mentioned in this document or in an Application Data Sheet ("ADS") of this patent application, are hereby incorporated by reference herein as originally disclosed, including any priority claims made in those applications and any material incorporated by reference, to the extent such subject matter is not inconsistent herewith.

Reference numerals: In this description a single reference numeral may be used consistently to denote a single item, aspect, component, or process. Moreover, a further effort may have been made in the preparation of this description to use similar though not identical reference numerals to denote other versions or embodiments of an item, aspect, element, component or process that are identical, or at least similar or related. Where made, such a further effort was not required, but was nevertheless made gratuitously so as to facilitate comprehension by the reader. Even where made in this document, such a further effort might not have been made completely consistently for all of the versions or embodiments that are made possible by this description. Accordingly, the description controls in defining an item, aspect, element, component or process, rather than its reference numeral. Any similarity in reference numerals may be used to infer a similarity in the text, but not to confuse aspects where the text or other context indicates otherwise.

The claims of this document define certain combinations and subcombinations of elements, features and acts or operations, which are regarded as novel and non-obvious. The claims also include elements, features and acts or operations that are equivalent to what is explicitly mentioned. Additional claims for other such combinations and subcombinations may be presented in this or a related document. These claims are intended to encompass within their scope all changes and modifications that are within the true spirit and scope of the subject matter described herein. The terms used herein, including in the claims, are generally intended as "open" terms. For example, the term "including" should be interpreted as "including but not limited to," the term "having" should be interpreted as "having at least," etc. If a specific number is ascribed to a claim recitation, this number is a minimum but not a maximum unless stated otherwise. For example, where a claim recites "a" component or "an" item, it means that the claim can have one or more of this component or this item.

In construing the claims of this document, the inventor(s) invoke 35 U.S.C. § 112(f) only when the words "means for" or "steps for" are expressly used in the claims. Accordingly, if these words are not used in a claim, then that claim is not intended to be construed by the inventor(s) in accordance with 35 U.S.C. § 112(f).

The claimed invention is:

1. A computer system, including at least:
one or more processors; and
a non-transitory computer-readable storage medium having stored thereon instructions which, when executed by the one or more processors, are designed to result in operations including at least:
receiving, by the computer system from a remote device via a communications network, initial instructions on behalf of a primary entity, the computer system hosted by an Online Software Platform (OSP);
opening, by the computer system and responsive to the initial instructions, in the OSP a client online account for the primary entity;
inputting, by the computer system, domain-identifying information;
identifying, by the computer system and from the domain-identifying information, a domain from a plurality of domains, the domain having a domain online space in an OSP, the primary entity having a client domain account in the domain online space, the primary entity having had relationship instances with secondary entities associated with the domain;
inputting, by the computer system, client account credentials for the client domain account;
accessing, by the computer system using the client account credentials and via a communications network, the client domain account in the domain online space;
causing, by the computer system, a delivery inquiry to be transmitted to the domain online space in a context of the accessed client domain account, the delivery inquiry inquiring as to whether or not a certain data report has already been delivered to the domain on behalf of the primary entity, the certain data report relating to the relationship instances of the primary entity with those of the secondary entities that are associated with the domain;
inputting, by the computer system and responsive to the delivery inquiry, a delivery inquiry result;
determining, by the computer system, whether an aspect of the delivery inquiry result indicates that the certain data report has or has not already been delivered to the domain; and
causing, by the computer system and responsive to determining that an aspect of the delivery inquiry result indicates that the certain data report has already been delivered to the domain, an alerting message to be transmitted to an agent of the primary entity, the alerting message reporting on the delivery inquiry result,
else causing, by the computer system and responsive to determining that the delivery inquiry result indicates that the certain data report has not already been delivered to the domain:
a new data report to be inputted, and
the new data report to become delivered via a communications network to the domain online space in the context of the client domain account.

2. The computer system of claim 1, in which:
the domain-identifying information includes operating data from the relationship instances of the primary entity with those of the secondary entities that are associated with the domain, and
the domain is identified from the operating data.

3. The computer system of claim 1, in which:
the delivery inquiry is generated from the identified domain.

4. The computer system of claim 1, in which:
the delivery inquiry is caused to be transmitted at a time that belongs in a first time period, and the certain data report relates to the relationship instances of the primary entity with the secondary entities associated with the domain during a second time period, which occurs immediately before the first time period.

5. The computer system of claim 1, in which:
the aspect of the delivery inquiry result expressly indicates that the certain data report has already been delivered to the domain.

6. The computer system of claim 1, in which:
the aspect of the delivery inquiry result expressly indicates that the certain data report has not already been delivered to the domain.

7. The computer system of claim 1, in which:
the delivery inquiry result includes a listing which indicates that the certain data report has not already been delivered to the domain.

8. The computer system of claim 1, in which:
the certain data report is stored in the domain online space in the context of the accessed client domain account as a data report file,
the data report file has a certain filename, and
the delivery inquiry has a feature that requests for the certain data report by a query filename that invokes the certain filename.

9. The computer system of claim 8, in which:
the certain data report is stored in the client domain account.

10. The computer system of claim 8, in which:
the certain filename is set according to a convention.

11. The computer system of claim 8, in which:
the query filename is looked up from filenames known to be used by the domain in the domain online space.

12. The computer system of claim 1, in which:
the delivery inquiry result includes a listing of filenames of documents that are candidates to be the certain data report, and
the aspect of the delivery inquiry result is a filename of one of the documents.

13. The computer system of claim 1, in which the operations further include:
receiving, by the computer system, a copy of the certain data report responsive to the aspect of the delivery inquiry result indicating that the certain data report has already been delivered to the domain; and
placing, by the computer system, the received copy of the certain data report into the client online account.

14. The computer system of claim 1, in which:
the domain-identifying information includes operating data from the relationship instances of the primary entity with those of the secondary entities that are associated with the domain, and
the operations further include:
receiving, by the computer system, a copy of the certain data report responsive to the aspect of the delivery inquiry result indicating that the certain data report has already been delivered to the domain;
parsing, by the computer system, from the copy, an older resource;
inputting, by the computer system, the operating data;
producing, by the computer system, an aggregate resource from the operating data of those of the relationship instances of the primary entity that are with those of the secondary entities that are associated with the domain;
making, by the computer system, a comparison of the aggregate resource and the older resource; and causing, by the computer system and responsive to the comparison indicating a lack of match, a notice of inaccuracy to be communicated to an agent of the primary entity.

15. The computer system of claim 14, in which the operations further include:
receiving, by the computer system from a remote device via a communications network, the operating data, for the inputting of the operating data.

16. The computer system of claim 14, in which:
the operating data includes individual datasets,
the operations further include: producing, by the computer system, individual resources from the individual datasets, and
the aggregate resource is produced from the individual resources.

17. The computer system of claim 16, in which:
a certain one of the individual datasets has dataset parameters, at least some of the dataset parameters having respective dataset values, and
the operations further include:
accessing, by the computer system, stored digital resource rules; and
selecting, by the computer system and responsive to one or more of the dataset values, a certain one of the accessed digital resource rules, and
the individual resource for the certain one of the individual datasets is produced by the computer system applying the certain digital resource rule to at least one of the dataset values.

18. The computer system of claim 17, in which:
at least one of the dataset parameters has a numerical base value, and
applying the certain digital resource rule includes multiplying the numerical base value with a number indicated by the certain digital resource rule.

19. The computer system of claim 1, in which:
the domain-identifying information includes operating data from the relationship instances of the primary entity with those of the secondary entities that are associated with the domain, and
the operations further include:
inputting, by the computer system, the operating data;
producing, by the computer system, an aggregate resource from the operating data of those of the relationship instances of the primary entity that are with those of the secondary entities that are associated with the domain; and
generating, by the computer system, the new data report prior to inputting the new data report, the new data report including the aggregate resource.

20. The computer system of claim 19, in which the operations further include:
receiving, by the computer system from a remote device via a communications network, the operating data, for the inputting of the operating data.

21. The computer system of claim 19, in which:
the operating data includes individual datasets,
the operations further include: producing, by the computer system, individual resources from the individual datasets, and
the aggregate resource is produced from the individual resources.

22. The computer system of claim 21, in which:
a certain one of the individual datasets has dataset parameters, at least some of the dataset parameters having respective dataset values, and the operations further include:
: accessing, by the computer system, stored digital resource rules; and
: selecting, by the computer system and responsive to one or more of the dataset values, a certain one of the accessed digital resource rules, and
: the individual resource for the certain one of the individual datasets is produced by the computer system applying the certain digital resource rule to at least one of the dataset values.

23. The computer system of claim 22, in which:
: at least one of the dataset parameters has a numerical base value, and
: applying the certain digital resource rule includes multiplying the numerical base value with a number indicated by the certain digital resource rule.

24. The computer system of claim 1, in which the operations further include:
: inputting, by the computer system, partner information about a partner entity that has previously exchanged data with the primary entity, the partner entity having a partner online space in an OSP, the primary entity having a client partner account in the partner online space, the partner information including partner account credentials for the client partner account;
: accessing, by the computer system using the partner account credentials and via a communications network, the client partner account in the partner online space;
: causing, by the computer system, a partner inquiry to be transmitted to the partner online space in a context of the client partner account, the partner inquiry inquiring as to whether or not a partner data report has been created on behalf of the primary entity, the partner data report relating to at least some of the relationship instances;
: inputting, by the computer system and responsive to the partner inquiry, a partner inquiry result;
: determining, by the computer system, whether an aspect of the partner inquiry result indicates that the partner data report has or has not been created; and
: causing, by the computer system and responsive to the aspect of the partner inquiry result indicating that the partner data report has been created, a partner report message to be communicated to an agent of the primary entity, the partner report message reporting on the aspect of the partner inquiry result.

* * * * *